(12) United States Patent
Smith

(10) Patent No.: US 8,770,941 B2
(45) Date of Patent: Jul. 8, 2014

(54) BLADE ORIENTATION OF AN IMPELLER OR PROPELLER

(76) Inventor: Mike Richard John Smith, Surrey (CA)

(*) Notice: Subject to any disclaimer, the term of this patent is extended or adjusted under 35 U.S.C. 154(b) by 413 days.

(21) Appl. No.: 13/319,620

(22) PCT Filed: Jun. 30, 2010

(86) PCT No.: PCT/CA2010/001068
§ 371 (c)(1),
(2), (4) Date: Nov. 9, 2011

(87) PCT Pub. No.: WO2011/003196
PCT Pub. Date: Jan. 13, 2011

(65) Prior Publication Data
US 2012/0093660 A1     Apr. 19, 2012

(30) Foreign Application Priority Data
Jul. 6, 2009 (CA) .................................... 2675044

(51) Int. Cl.
*B64C 11/18*     (2006.01)
(52) U.S. Cl.
USPC ................. 416/223 R; 416/204 R; 416/230; 416/234; 416/213 R; 416/241 R
(58) Field of Classification Search
USPC ........... 416/223 R, 241 R, 204 R, 213 R, 234
See application file for complete search history.

(56) References Cited

U.S. PATENT DOCUMENTS

| | | | |
|---|---|---|---|
| 2,047,847 A * | 7/1936 | Ambjornson | 416/243 |
| 2,667,936 A * | 2/1954 | Clark | 416/234 |
| 3,367,423 A * | 2/1968 | Van Ranst | 416/213 R |
| 3,867,062 A | 2/1975 | Troller | |
| 4,135,858 A | 1/1979 | Entat | |
| 5,158,434 A | 10/1992 | Weetman | |
| 5,352,093 A * | 10/1994 | Hannon et al. | 416/234 |
| 7,025,642 B1 | 4/2006 | Baylor | |
| 7,029,229 B2 | 4/2006 | Iwase | |

* cited by examiner

*Primary Examiner* — Ninh H Nguyen
(74) *Attorney, Agent, or Firm* — Ryan W. Dupuis; Kyle R. Satterthwaite; Ade & Company, Inc.

(57) ABSTRACT

Efficient impeller or propeller wherein at least one blade in a set of blades on a hub of said impeller is oriented with respect to the tilted plane rotated clockwise or counter clockwise in an axis perpendicular to the longitudinal axis of said impeller. At least one blade in a set of blades of the multi-set impeller may have the same or different sizes or the same or different tilted plane angle compared to at least one blade of the adjacent set or the blade of one set may have the same or different angle as viewed from the second end of the impeller from a reference plane along the longitudinal axis of the impeller compared to the angle of at least one blade of the adjacent set. The invention also includes: blade arrangement for multi-set impeller, inner hub length variations, and hub shapes for better efficiency and utility.

32 Claims, 30 Drawing Sheets

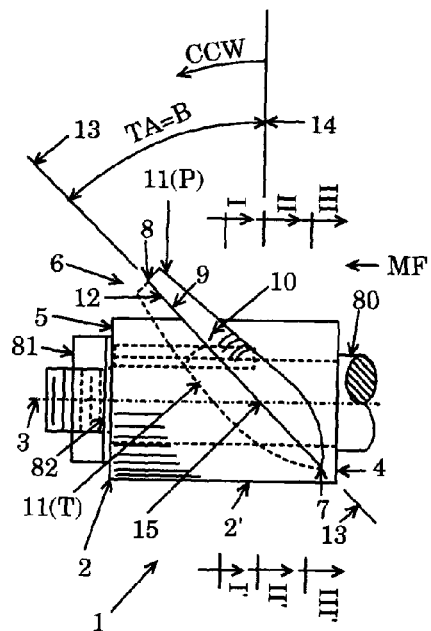
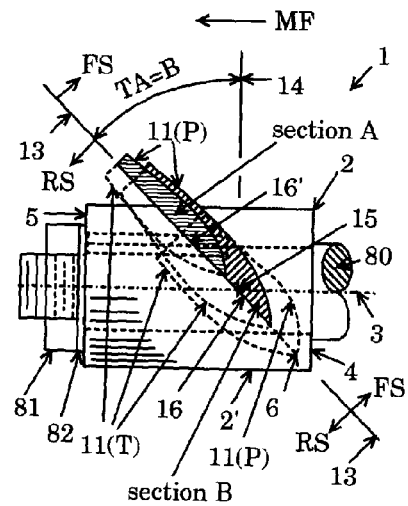
Figure 28
Figure 29
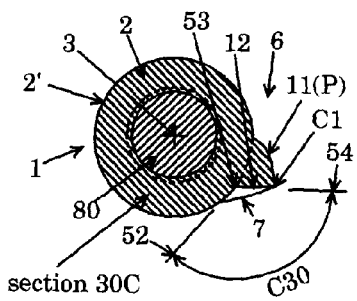
Figure 30
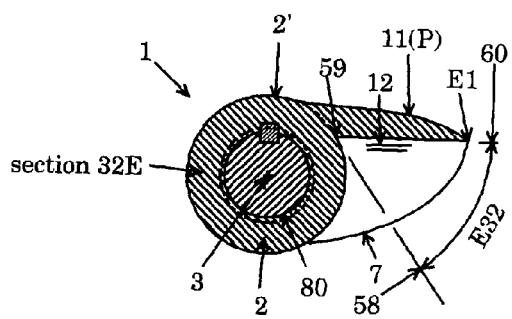
Figure 32
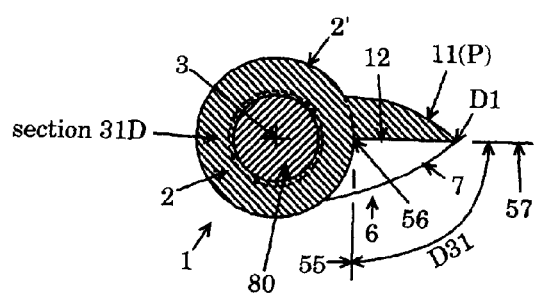
Figure 31

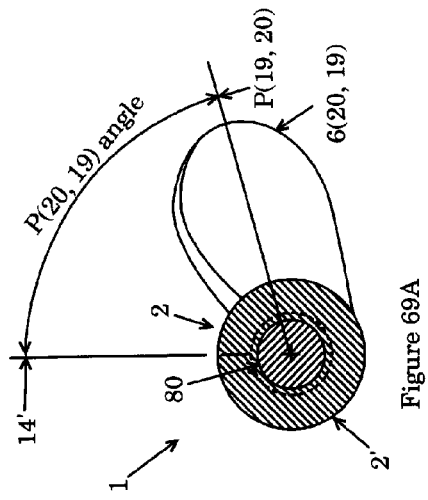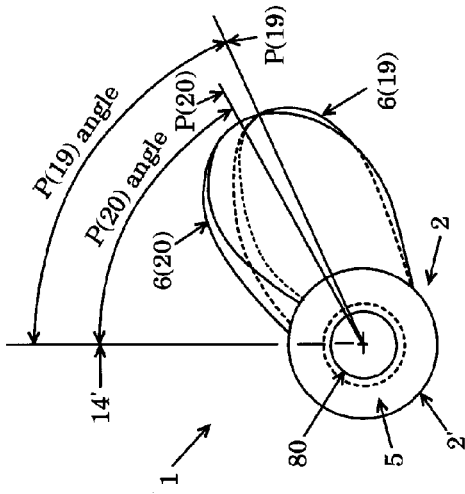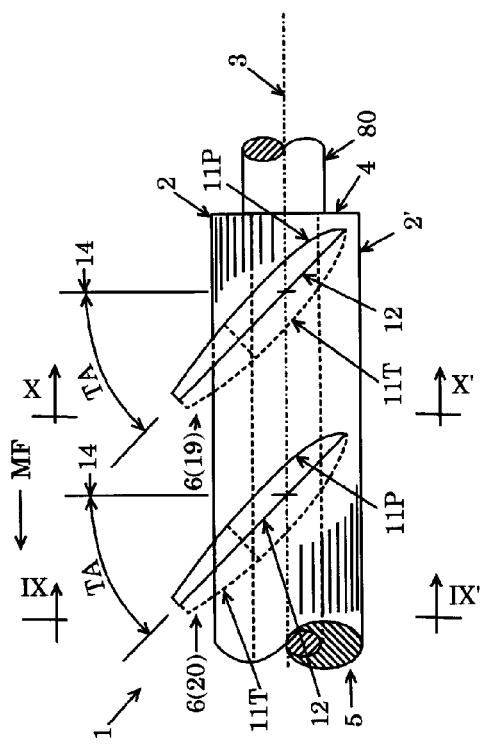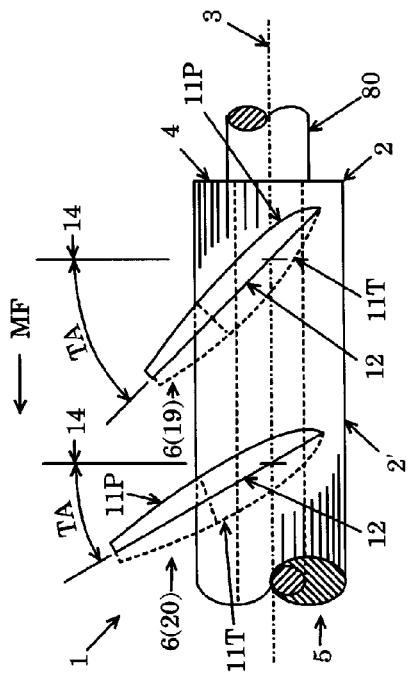

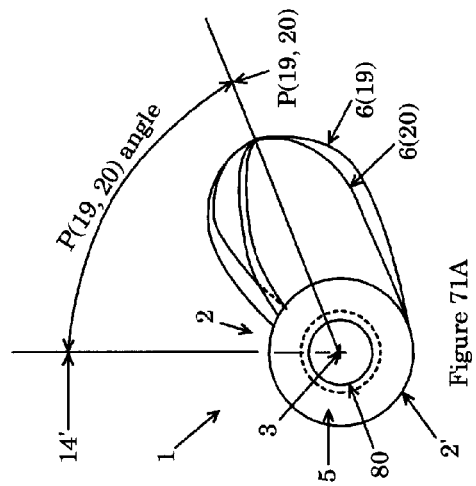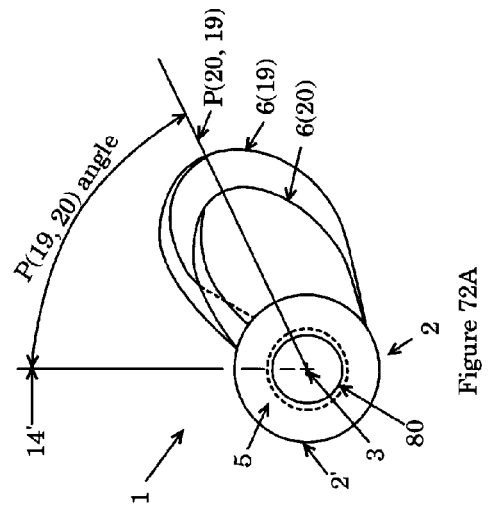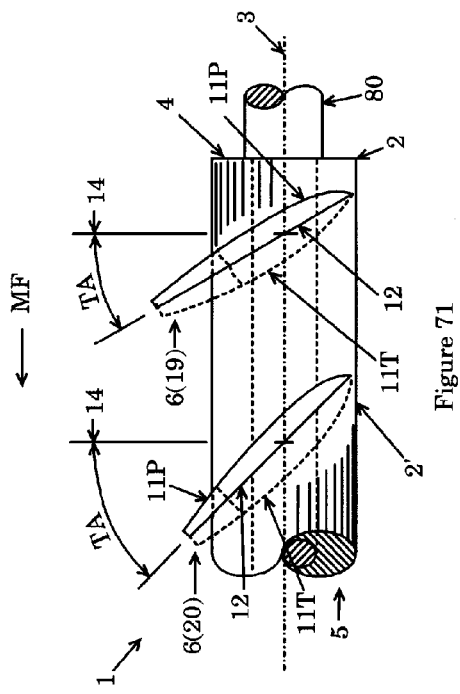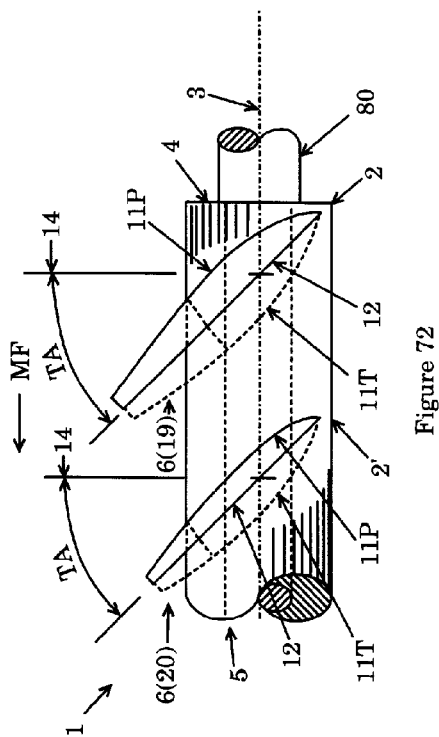

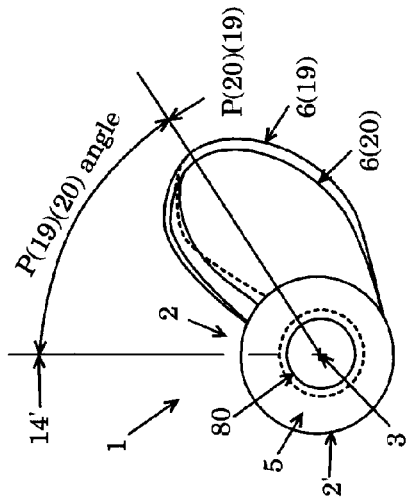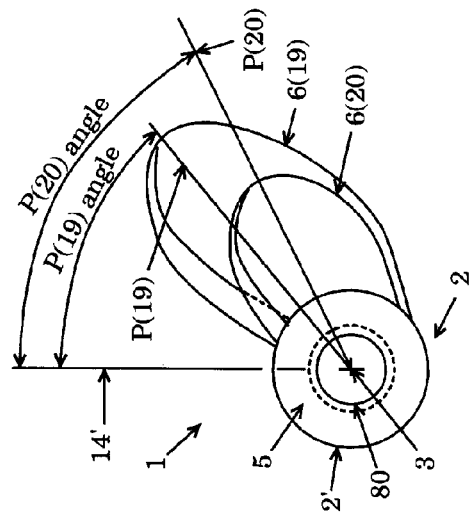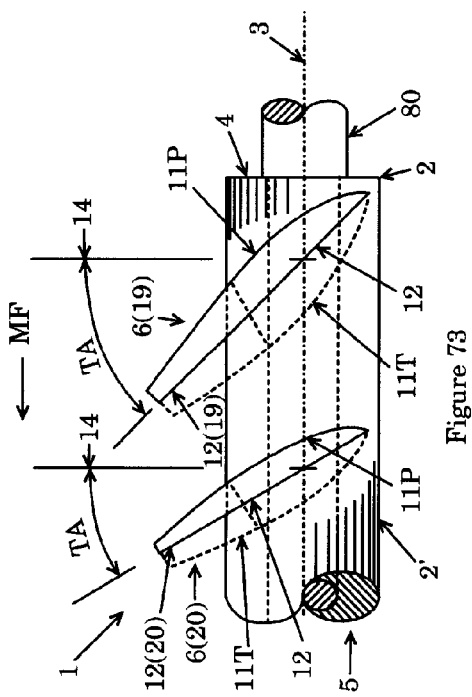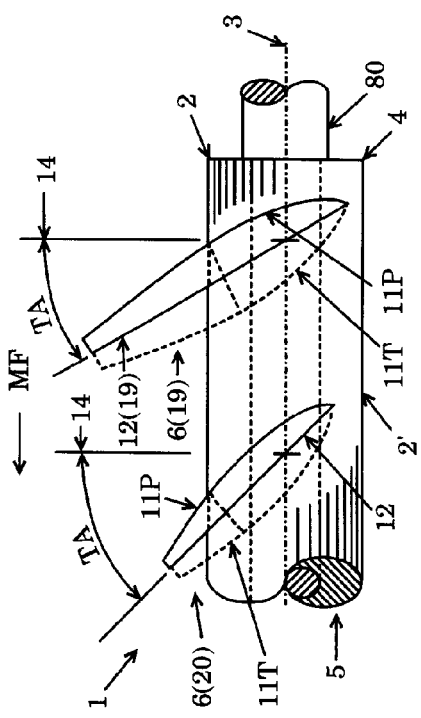

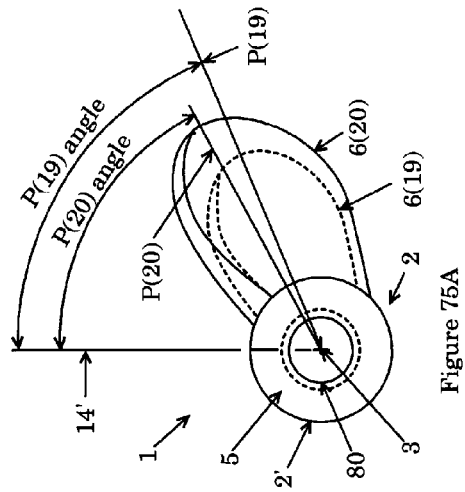
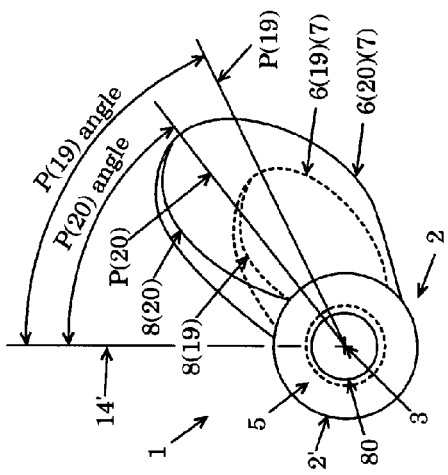
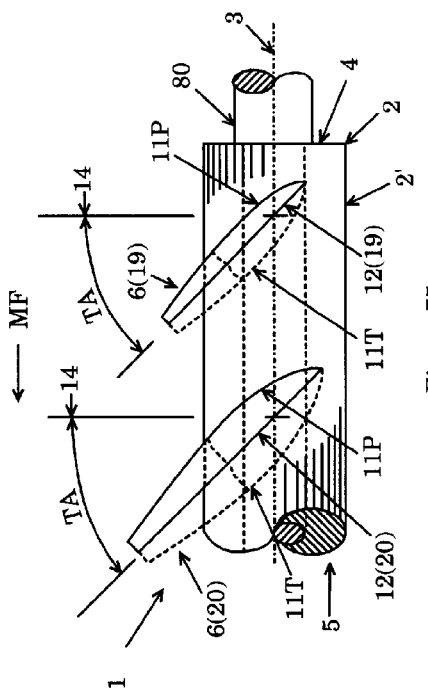
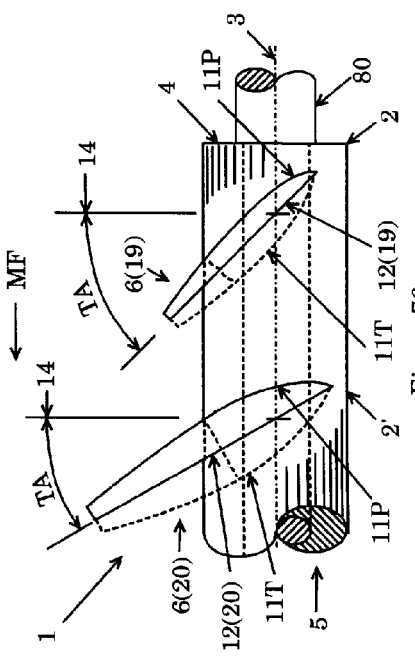

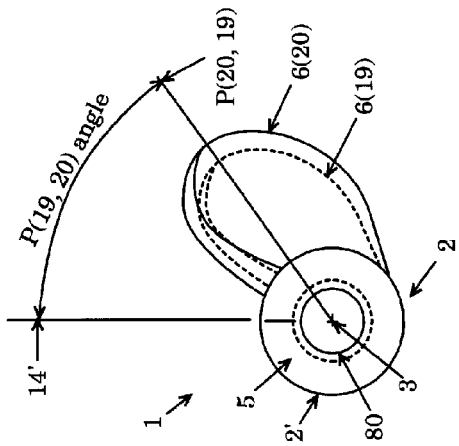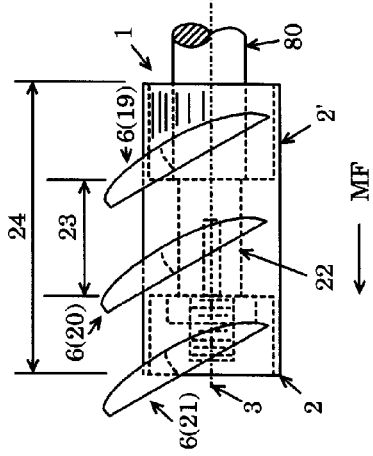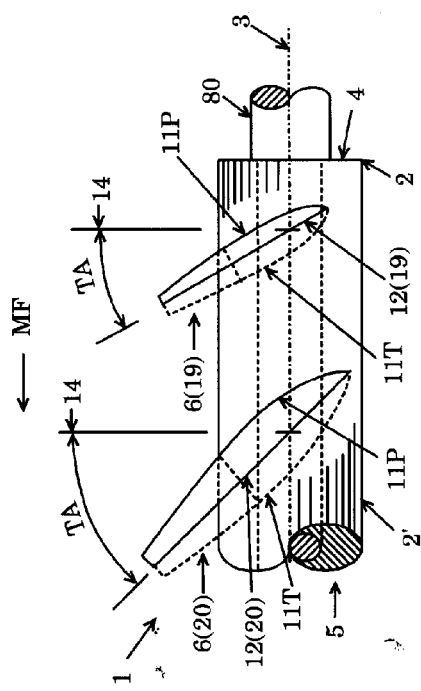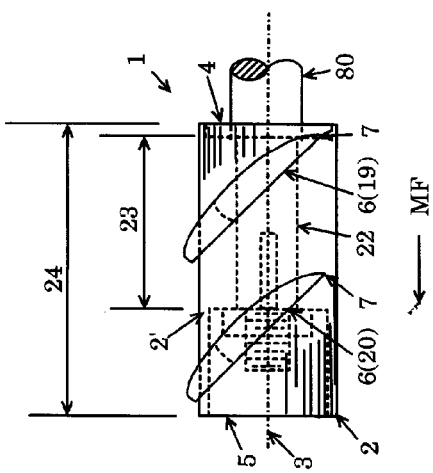

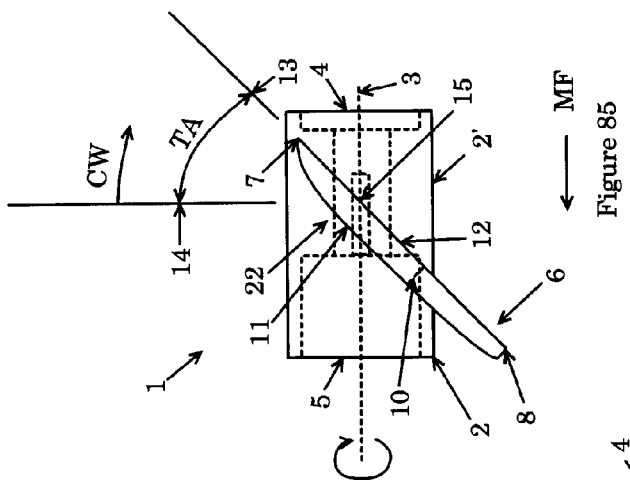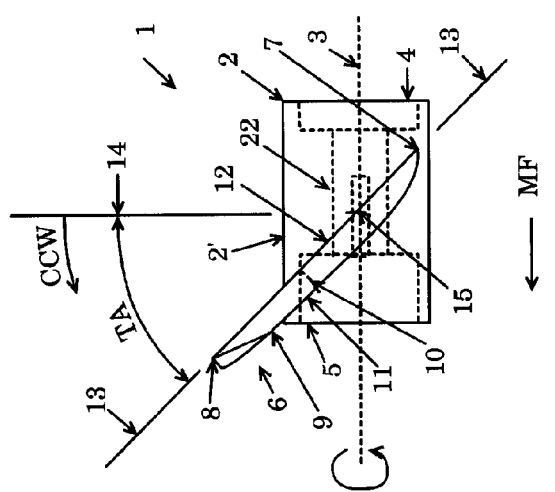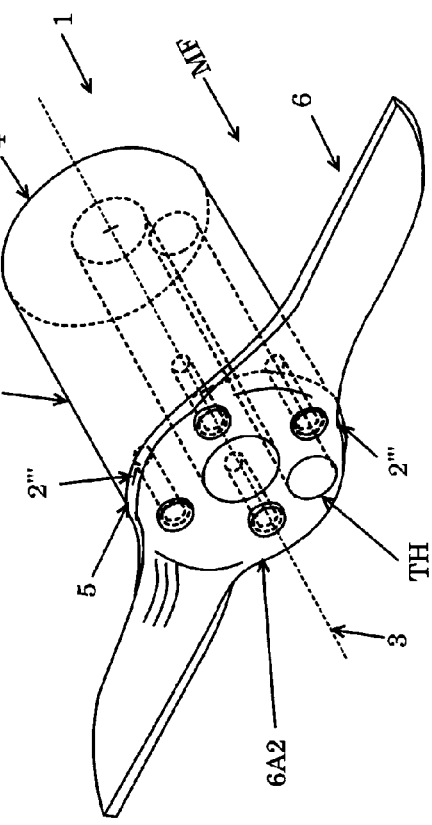
Figure 85
Figure 86
Figure 84

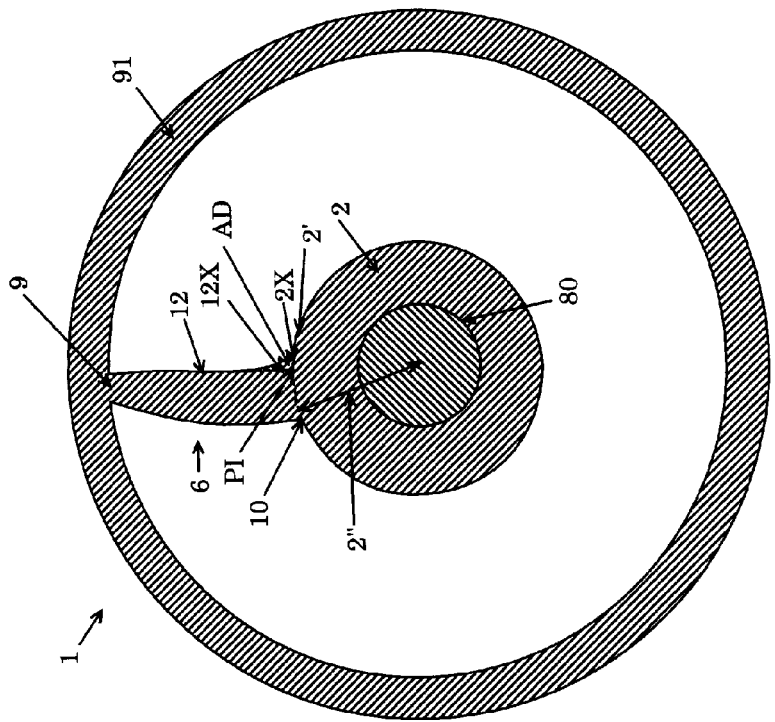
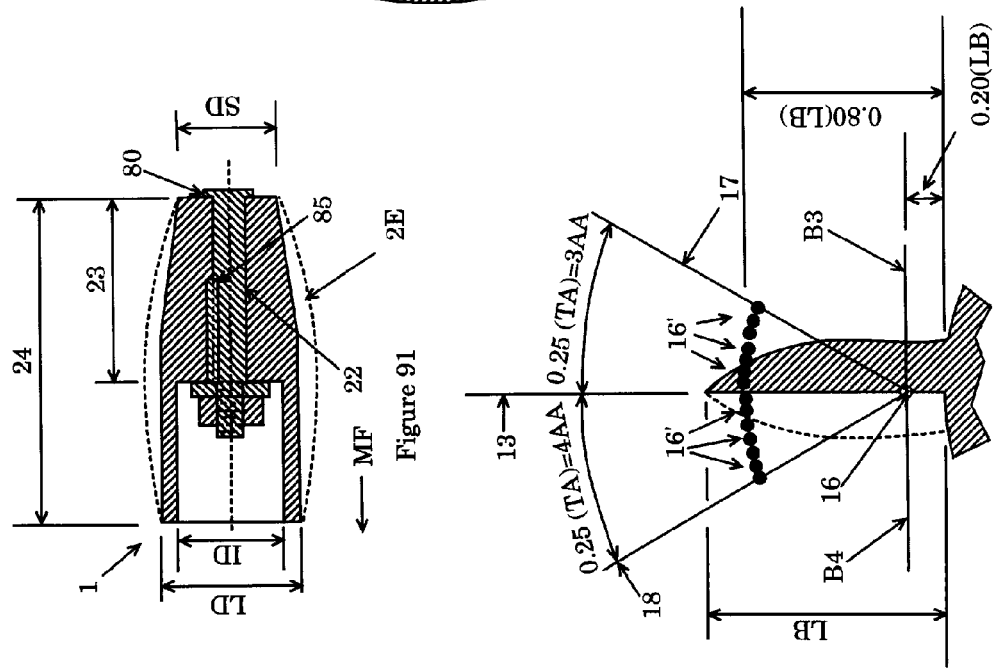
Figure 91
Figure 92
Figure 93

BLADE ORIENTATION OF AN IMPELLER OR PROPELLER

BACKGROUND OF THE INVENTION

The present invention relates to a more efficient impeller or propeller and impeller or propeller related systems for: watercrafts, weapon systems, air vehicles, drones, hydro-electric plants, pumps, mixing and agitation plants, compressors, and wind farms.

The prior art impeller for: watercrafts, weapon systems, air vehicles, drones, pumps, agitation systems or mixing plants, hydro-electric plants, compressors, and wind farms are not so efficient because each blade in the set of blades has blade lines with (in the present invention the blade line is a straight line that connects the leading edge and the trailing edge of an specific radial section of a blade) acute angles measured perpendicularly from the plane of rotation intersecting the blade base which is similar to the blade lines acute angles of the blade radial sections of the screw type impeller. The screw type impeller blade on the hub is constructed on the principle of the Archimedes' screw propeller which blades are oriented in an outdated technology. The screw type impeller or the Archimedes' screw propeller has at least one blade or more blades with distinctive twist and multiple unit high pressure face wherein each unit likely and mostly facing: rearward, sideward, and a certain radius on the plane of rotation. The blade distinctive twist may not be so obvious in some instances but when the blade line angle of the radial section of the blade adjacent to the hub is substantially greater than the blade line angle of the radial section of the blade adjacent to the tip, then the said blade likely has the distinctive twist wherein both angles are acute angles measured from the plane of rotation. The distinctive twist of a blade has a good side since the blade with the said twist similar to that of a screw impeller blade twist is considered to be low stressed when the prior art impeller is rotated on the longitudinal axis of the said impeller in a medium or fluid but the said distinctive twist produces a blade with a radial section adjacent to the tip with a blade line angle which approaches the angle of a plane perpendicular to the longitudinal axis of the said impeller and as a result the said prior art impeller blade force on most or all of the high pressure face unit areas of said high pressure blade faces sideways, rearward, and rotationally which is a blade orientation that waste considerable amount of energy during rotation on the longitudinal axis of the impeller in a medium or fluid because the blade also perform unnecessary work. The prior art impeller with the distinctive blade twist, when rotated on the longitudinal axis of the said impeller for motion in a medium or fluid, the blade high pressure face has multiple unit area to do the work and each or most of the unit area exerts a unit force F exerted by the motor turns into three component forces: force Fx, force Fy, and force Fz. Force Fx is the component force of force F directed to the side, Fy is component force of force F directed rotationally or in a radial direction, and force Fz is the component force of force F directed rearward. The movement of the medium or fluid to the side which is caused by the blade is evident to those skilled in the art by viewing the screw type impeller from the side while slowly rotating the said impeller on the longitudinal axis, large area of the blade working face is visible which means portion of the impeller rotational energy is used by the blade in pushing the fluid or medium sideways which is quite inefficient since moving the medium or fluid sideways does not move the impeller forward but surely makes the medium or fluid turbulent. Force Fx therefore decreases the value of force Fy and force Fz thus making the old system with less usable power for the forward propulsion which proves the prior art impeller is a relatively inefficient device. The prior art impeller used in hydro-electric turbines and wind turbines is inefficient too since the prior art blade orientation systematically makes the working medium or fluid force on the blade high pressure face to push the blades, hub, and shaft so much which causes more friction and slows down the rotation of the hub as opposed to utilizing the force for rotating the hub or impeller. Friction is the force that resists motion and wastes energy. The prior art impeller with the distinctive blade twist also makes the entire blade with larger frontal area as viewed along a straight line that connects the leading edge and the trailing edge of a blade radial section adjacent to the hub of the prior art impeller. The said larger frontal area of the prior art impeller is less efficient since the blade with distinctive twist encounters more resistance or drag when the prior art impeller is rotated on the longitudinal axis of the said impeller for forward motion when used in a motor driven system or when the said impeller is rotated in medium or fluid driven system. The blade with distinctive twist likewise is less efficient since the blade screw design with odd orientation and deceptive appearance is less aggressive since the said blade do not have features to displace or move large volume of medium or fluid during rotation on the longitudinal axis of said impeller and at the low pressure face area of same blade, less space is generated which means more medium or fluid is present which resist forward movement of the blade and consequently resist forward movement of the said impeller. In mixing or agitator systems the said distinctive blade twist moves the material in a multi-directional way which slows down the circulation of the medium, so the prior art impeller in an agitator plants or mixing plants is less efficient.

Based on the above mentioned facts, we therefore conclude that the orientation of each blade in a set of blades of the prior art impeller with screw blade type orientation (sometimes referred to as the Archimedean propeller or impeller) and the prior art slightly modified form of screw impeller blade is inefficient. The prior art impeller blade orientation has never been abandoned because the said impeller blade has good centrifugal stability but the inherent problems of the said prior impeller blade remains. There are some modifications to the early form of the prior art impeller blade but with all the improvements, the efficiency of the prior art impeller blade has not improved substantially to be considered a breakthrough. In Figure III of U.S. Pat. No. 1,123,202 to Amnelius shows the prior art impeller with blade line acute angle of radial section adjacent to the tip with respect to the plane of rotation intersecting the said blade base has a general trend of angles which approaches the angle of the plane perpendicular to the longitudinal axis of the impeller and similar to the screw impeller blade orientation which is not very efficient and needs improvement. The screw type of impeller blade orientation and the modified form of the screw impeller blade orientation are the most popular and widely used impeller blade orientation in use nowadays is good for moving materials from one place to another location with the adapted casing but thoroughly examining the blade operation with respect to the medium or investigating the medium or fluid effect on the blade of an impeller, the screw type blade orientation is not good for all other purposes we have known and that includes the prior art impeller system.

SUMMARY OF THE PRESENT INVENTION

It is therefore the object of the present invention to provide a more efficient impeller by orienting the blade lines angles of the radial sections of at least one blade or more blades in each set of blades of the impeller to make the blade work more efficiently and make the related blade configurations as well as hub modifications for better workability and efficiency.

I have found that the disadvantages inherent to the prior art impeller maybe overcome by changing the orientation of the blade line angle relating to the impeller blade radial section. In the present invention, the impeller may mean propeller or rotor or bow thruster wheel or turbine wheel. Changing the orientation of the blade lines acute angles with regard to the blade radial sections, the impeller blade maybe unfamiliar to those who design or manufacture impellers but the present invention impeller blade orientation is designed to push the medium or fluid intensely in a good direction with more space on the low pressure face area to allow the blade to move forward with ease and substantially lessen or eliminate the pushing of the medium or fluid to the side during impeller operation with other motion advantage like leading edge to trailing edge line of sight view with less frontal face area which makes the blade with less drag during rotation on the longitudinal axis of said impeller which contributes to the efficiency of the present invention impeller. The present invention blade orientation then makes the pressure on the working face greatly increased by displacing or moving substantial volume of medium or fluid during rotation on the longitudinal axis of the said impeller while the pressure on the low pressure face is decreased since the medium is cleared by the leading edge of the blade and due to the present invention blade orientation or design, the said low pressure face becomes distant from the medium and therefore less medium is present to resist the forward movement of the impeller so that the difference in pressure between the high pressure face and the low pressure face is substantial thus providing more lift for the present invention impeller blade with less area of low pressure face exposed to the medium or fluid and with less frontal area as seen from the leading edge to trailing edge view of a blade are clear indications that the present invention impeller is more efficient. The changes which makes the present invention impeller more efficient is by making at least one blade on the hub with blade lines angles of the blade radial sections of the said blade oriented in the tilted plane configuration or in the specific deviation from the tilted plane configuration. In the tilted plane configuration, the blade line of section A and the blade line of section B of at least one present invention impeller blade in a set of blades lie on the tilted plane (In the present invention when the blade line of section A and the blade line of section B is on a plane the root or the tip of the blade may or may not be on the said plane). In the specific deviation from the tilted plane configuration at least one impeller blade in a set of blades has a blade line of section B on the tilted plane while the blade line of section A of the same blade is off and adjacent to the tilted plane with specific limits or intersects the tilted plane with specific limits or the blade line of section A has the same perpendicular distance from the tilted plane with specific limits and wherein the blade line of section B in the present invention is always on the tilted plane with angle B or angle TA. Looking at the matter in more detailed perspective, in the specific deviation from tilted plane configuration the impeller blade has the blade line of section B on the tilted plane with angle TA or angle B since angle TA and angle B have the same value, and the impeller blade line (blade line may have to be extended for angle measurements) angle A of section A of the same blade (angle A, angle B and angle TA are measured perpendicularly from the vertical plane as shown in selected drawings) is between tilted plane angle TA and twenty-five percent more than the value of blade line angle B of section B or the impeller blade line angle A of section A is between tilted plane angle TA and twenty-five percent less than the value of blade line angle B of section B and the said blade line of section A is between the first boundary plane of said tilted plane and the second boundary plane of said tilted plane or the blade line angle A of section A is equal to the tilted plane angle TA wherein the said equal to the tilted plane angle TA blade line of section A is off the said tilted plane and between the said tilted plane and the first boundary plane of said tilted plane or the said blade line of section A with angle A of equal to angle TA is between the said tilted plane and the second boundary plane of the said tilted plane or on the first boundary plane of said tilted plane or on the second boundary plane of said tilted plane. The first boundary plane is a plane rotated from the tilted plane with the blade line of section B as the axis of rotation and rotated in the direction of the third plane to a dihedral angle of twenty-five percent the value of the tilted plane angle TA while the second boundary plane is a plane rotated from the tilted plane with the blade line of section B as the axis of rotation and rotated in the direction of the fourth plane to a dihedral angle of twenty-five percent the value of the tilted plane angle TA.

The first vertical plane intersecting the horizontally positioned longitudinal axis of the present invention impeller perpendicularly between the first end and the second end of the hub or adjacent to the hub, with plane X of same orientation as the first vertical plane and when plane X is rotated on a horizontal axis known as the first axis of rotation and rotated twenty degrees or seventy-eight degrees or between twenty degrees and seventy-eight degrees clockwise or counter-clockwise becomes tilted plane with acute angle TA measured perpendicularly from the first vertical plane as shown in selected drawings wherein the said first axis of rotation is perpendicular to the longitudinal axis of the said impeller or hub. In the tilted plane configuration or in the specific deviation from the tilted plane configuration, the blade line angle A, blade line angle B, and tilted plane angle TA are acute angles measured perpendicularly from the first vertical plane.

The present invention impeller blade oriented in the tilted plane configuration or in the specific deviation from the tilted plane configuration produces a blade or blades with high pressure face which encounter limited forces, force Fz parallel to the longitudinal axis of the impeller or hub and the rotational forces Fy and since the blade working surfaces offer no receptive part for sideward forces or possessing minimal high pressure face for sideward forces Fx, the force Fx is zero or minimal so the power saved can be used in rotating the present invention with more power. When force Fx decreases, force Fy and force Fz increases so there are more power available to move the present invention impeller farther which makes the motor driven impeller more efficient, with similar efficiency in the case of the medium or fluid driven system since the medium acting on the present invention impeller blade are in a more precise direction for work which makes the said impeller more efficient. Section A and section B and the adjacent radial sections of the impeller blade are interpolated to have an impeller blade with good structural integrity and smooth blade surfaces. The root end or adjacent to the root end of the blade may have the same radial section shapes as section B but maybe adapted to have other section shapes.

In the present invention, the present invention impeller which are to be used in: agitator and mixing systems, watercrafts, weapon systems, hydro-electric turbines, air vehicles, pumps, drones, compressors, and wind turbines, could be produced with single set of blades on the hub or with multi-set configuration to have a multi-set present invention impeller which have more than one set of blades on a hub. One or more blade in a set of blades of the present invention impeller maybe oriented permanently to the hub which blade line angles are non-adjustable with respect to the first vertical plane, but one or more blade maybe fixed or detachable and the tilted plane of the blade maybe adjusted by fastening the blade with a different angle TA for wind turbines (as the blade maybe bolted to flanges on the hub and rotated to have other value of tilted plane angle or secured with other suitable methods and rotated to have other value of tilted plane angle) or in some cases the present invention impeller or propeller for wind turbines may have a mechanism for collective tilted plane angle change wherein the blades are rotated simultaneously on their own axis wherein said axis intersects the longitudinal axis of the impeller and the system are designed to reduce the force on the turbine rotor when in a high wind velocity environment or in a not in operation mode or to reduce or increase the torque generated by the rotor and wherein the mechanism in adjusting the tilted plane change is known but at least one blade of the impeller or propeller could be oriented in the tilted plane configuration or oriented in the specific deviation from the tilted plane configuration.

The present invention impeller in the multi-set configuration may have the preceding set and the next set or the first set, the second set and the third set wherein each blade in a set may have the same size or different size or with same angle TA or with different angle TA or the location line P angle of a blade in one set compared to a blade of the adjacent set maybe the same or a blade of one set is with different angle location line P angle compared to the location line P angle of a blade of the adjacent set measured from the same reference plane which lies along the longitudinal axis of the said impeller. Location line P is a straight line which intersects the tip or tip midpoint of a blade of the present invention impeller and intersects the longitudinal axis of the said impeller perpendicularly. The hub inner section of the present invention multi-set impeller is adapted to have a short inner section length to fit on the regular impeller shaft for single set of old style impeller or has a long hub inner section length adapted for the prior art impeller shaft but the present invention impeller for watercrafts may have inner section hub length of between forty and sixty percent the hub maximum length to adapt to the length of the shaft designed for single set of impeller but may have a standard and known hub length used in the prior art impellers. Any two adjacent set of the multi-set present invention impeller either have non-intrusive type or intrusive type of blade configuration. For impeller with no exhaust through the hub, the hub of the impeller may be adapted to allow larger space or cavity of the hub adjacent to the second end at the area adjacent to the impeller shaft for installation of the nut and other accessories to the impeller shaft which are designed for an impeller with single set of blades. The blades of the present invention impeller on a single hub is either on a single set impeller or on a multi-set present invention impeller or on two or more present invention impeller on one impeller shaft in which all the blades are oriented for rotational direction of either right hand rotation or left hand rotation. The present invention shaft may be made longer than the conventional shaft length to allow impellers on a single shaft. An impeller shaft with two or more impeller, each impeller may have a different number of blades in a set of blades but for smooth impeller operation the number of blades in each set of blades of the impeller is to be the same. The medium flow for the present invention impeller is from the area adjacent to the first end section of the hub to the general direction of the second end section area of the hub or from inlet to outlet of the impeller housing. The present invention impeller has housing or casing when used in turbines or compressors or jet drives for watercrafts or vehicles or a system with impeller which require some housing. The impeller which blade is oriented in the tilted plane configuration or oriented in the specific deviation from the tilted plane configuration is not an Archimedean propeller or impeller so the present invention impeller is not designed for moving materials from a low elevation to a high elevation in a long casing.

Other objects and advantages and various features of novelty and invention will be pointed out or will occur to those skilled in the art from reading the following specification in conjunction with the accompanying drawings.

BRIEF DESCRIPTION OF THE DRAWINGS

The brief descriptions of the drawings are made as short as possible but some of the descriptions are a bit long to be informative.

FIG. 28 illustrates the side elevation view of the impeller shown in FIG. 26. FIG. 29 illustrates the impeller hub with blade section view of section B on section line V-V' cut by arc B in FIG. 27 and the blade section view of section A on section line IV-IV' of the same blade cut by arc A in FIG. 27 showing the blade line of section A and the blade line of section B in the tilted plane configuration. FIG. 30 illustrates the section view of the impeller blade and hub cut by section line III-III' of the impeller in FIG. 28. FIG. 31 illustrates the section view of the impeller blade and hub cut by section line II-II' of the impeller in FIG. 28. FIG. 32 illustrates the section view of the impeller blade and hub cut by section line I-I' of the impeller in FIG. 28.

FIG. 36 shows the blade line of section A and the blade line of section B oriented in the tilted plane configuration.

FIGS. 69 and 69A illustrates the second embodiment of the present invention wherein a blade in the preceding set and a blade in the next set are with similar tilted plane angle TA and similar size. FIGS. 70 and 70A illustrates the first modification of the second embodiment of the present invention wherein a blade in the preceding set has greater tilted plane angle TA than the tilted plane angle TA of a blade in the next set and wherein both blades have the same size.

FIGS. 71 and 71A illustrates the second modification of the second embodiment of the present invention wherein the blade in the preceding set has smaller angle TA than a blade angle TA in the next set and wherein both of the said blades have the same size.

FIGS. 72 and 72A illustrates the third embodiment of the present invention wherein a blade in the preceding set is greater in size than the size of a blade in the next set and both of the said blades are with same angle TA.

FIGS. 73 and 73A illustrates the first modification of the third embodiment of the present invention wherein a blade in the preceding set has greater tilted plane angle TA than a blade tilted plane angle TA in the next set and the said blade in the preceding set is greater in size than the said blade in the next set. FIGS. 74 and 74A illustrates the second modification of the third embodiment of the present invention wherein the a blade in the preceding set has less tilted plane angle TA than the said blade in the next set tilted plane angle TA and the size of the said blade in the preceding set is greater than the size of the said blade in the next set.

FIGS. 75 and 75A illustrates the fourth embodiment of the present invention wherein a blade in the preceding set is smaller in size than the size of a blade in the next set and both said blades with same tilted plane angle TA. FIGS. 76 and 76A illustrates the first modification of the fourth embodiment of the present invention wherein a blade in the preceding set is smaller in size than the size of a blade in the next set and the said blade in the preceding set has greater tilted plane angle TA than the tilted plane angle TA of the said blade in the next set.

FIGS. 77 and 77A illustrates the second modification of the fourth embodiment of the present invention wherein a blade in the preceding set has smaller tilted plane angle TA than a blade tilted plane angle TA in the next set with the said blade in the preceding set is smaller in size than the size of the said blade in the said next set.

FIG. 78 illustrates the fifth embodiment of the present invention wherein the two adjacent set of blade with non-intrusive configuration with hub inner section length within the limits of the present invention. FIG. 79 illustrates the sixth embodiment of the present invention with three adjacent set of blade with non-intrusive configuration with hub inner section length within the limits of the present invention.

FIG. 84 illustrates a right hand rotation turbine and showing the general blade orientation for hydro-electric plants or wind turbines. FIG. 85 illustrates a left hand rotation turbine wheel and showing the general blade orientation of the turbine wheel for hydro-electric plant turbine and for wind farms in electric generation plants.

FIG. 86 illustrates the eleventh embodiment of the present invention wherein the present invention impeller with second blade assembly attached to the second end of the hub.

FIG. 89 also shows the hub with the modified curved annular sections.

FIG. 91 shows the section view on line I-I' in FIG. 90 and shows further details of the hub.

FIG. 92 shows the section view of the blade and hub and the possible locations of blade line of section A with respect to blade line of section B.

FIG. 93 illustrates the present invention impeller with thin slice of said impeller with rim cut by two vertical planes and closely adjacent to the first vertical plane as viewed from the second end of the impeller.

DESCRIPTIONS OF THE DRAWINGS

Figure 1:
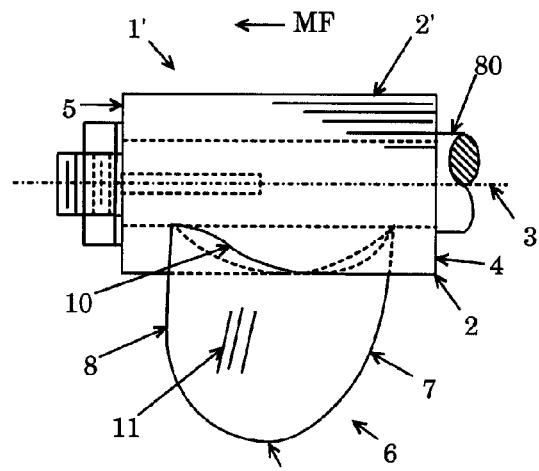
FIG. 1 illustrates the top view of the prior art impeller with modified screw type configuration.

The present invention impeller (1) in the drawings described below may have parts or related lines or planes indicated by numbers, letters, or words or a combination of two or more numbers, letters, and words for clear understanding of the contents and scope of the present invention. The present invention impeller (1) with hub (2), first end (4), longitudinal axis (3), second end (5), one blade (6) or more blades extending from the hub (2) or extending from the blade (6) assembly hub (6A1 or 6A2), wherein the blade (6) or blades are grouped by one set of blades or more set of blades on a hub (2) and the said blades may not be spaced equally around the hub (2) or blade assembly (6A1 or 6A2) but for less vibration the blades are suggested to be spaced equally around the hub (2) or spaced equally around the assembly hub (6A1 or 6A2) with each blade (6) of the present invention impeller includes: a leading edge (7), trailing edge (8), tip (9) or tip (9) midpoint, and said tip (9) when wide may or may not be connected to the circular rim (91) wherein the said circular rim (91) is coaxial with the hub (2), root (10), low pressure face (11 or 11' or 11(T) or 11 (P)), and high pressure face (12). The blade (6) leading edge (7) may either be sharp or rounded or slightly blunt to reduce the resistance of the blade (6) when the impeller is rotated on the longitudinal axis (3) of said impeller by the working medium or working fluid or motor. The present invention impeller (1) blade (6) second end (5) view shape as shown with the leading edge (7), the trailing edge (8), and the tip (9) are outwardly curved for illustration purposes and the second end (5) view shape of the blade (6) are known but maybe of other known shape and the external shapes of the radial sections of the present invention impeller (1) blade (6) shown as section A and section B in the drawings are known or disclosed to be a public domain. The scope of the present invention partly deals with the specific orientation of one blade (6) or more blades in a set of blades on the hub (2) or on the blade assembly (6A1 or 6A2) of the present invention impeller (1) specifically the orientation of a blade (6) in a set of blades wherein the said blade (6) with blade (6) line (16) of section B with specific location and angle with respect to the hub (2), longitudinal axis (3), the first vertical plane (14), and the tilted plane (13) and the specific location and angle of the blade (6) line (16') (maybe extended for angle measurements) of section A with respect to the longitudinal axis (3) of the hub (2), the first vertical plane (14), the hub (2), and the tilted plane (13) of the present invention impeller 1 to have a good efficiency. The blade (6) line (16) of section B is a straight line which connects the leading edge (7) and the trailing edge (8) of the section B while the blade (6) line (16') of section A is a straight line which connects the leading edge (7) and trailing edge (8) of the section A. When the trailing edge (8) is wide the point of the trailing edge (8) intersecting the high pressure face (12) is the point where the blade (6) line (16) of section B intersects or the blade (6) line (16') of section A intersects. Likewise when the leading edge (7) is wide the point of the leading edge (7) intersecting the high pressure face (12) is the point where blade (6) line (16) of section B intersects or the blade (6) line (16') of section A intersects. Section B is the radial section of the blade (6) adjacent to the hub (2) cut by arc B wherein arc B is an arc of a circle which center on the longitudinal axis (3) of the present invention impeller (1) and wherein arc B cut the blade (6) adjacent to the hub (2) at twenty percent the radial length (LB) of the present invention impeller (1) blade (6) while section A is the radial section of the same blade (6) adjacent to the tip (9) of the said blade (6) cut by arc A wherein arc A is an arc of a circle which center on the longitudinal axis (3) of the present invention impeller (1) and wherein arc A cut the same blade (6) at eighty percent of the said blade (6) radial length (LB) from the blade (6) base or from the radius of the hub (2) adjacent to the blade (6) base and said arc A cut the same blade (6) adjacent to the tip (9) or tip (9) midpoint. Radial length (LB) is the perpendicular distance of the tip (9) or tip (9) midpoint of the blade (6) from the longitudinal axis (3) of the impeller or hub (2) less the perpendicular distance of the hub (2) external side surface (2') (the external side surface (2') is an area adjacent to the root (10) of the blade (6) where the hub (2) has not blend with the blade (6) or off the addendum (AD) area) from the longitudinal axis (3) of the present invention impeller (1).

In the present invention, the root (10) of each blade (6) of the present invention impeller (1) is attached to the hub (2), by welding or other suitable methods known or the blade (6) is integral part of the hub (2) except for large wind turbine wherein the blade maybe fixed or detachable with semi-fixed orientation or in a collective tilted plane change. The present invention impeller (1) blade (6) or blades maybe press formed or cast or forged and welded to the hub (2) external side surface (2') or simply attached to the hub by other prior art means. One or more blade assembly (6A1 or 6A2) with two or more blade (6) or blades attached with screw 83 on the hub 2 and welded to the hub 2 or just welded or brazed on the first end (4) or second end (5) of the hub (2) without screw (83) which may include welding or brazing the root (10) of the said blade (6) to the external side surface (2') of the hub (2). The blade (6) or blades are integral part of the hub (2) when the present invention impeller (1) is cast or forged or formed, and maybe made with: fibers and resins or composites or one metal or more metals (alloy), or made with other suitable materials. The present invention impeller (1) with blade (6) to hub (2) orientation wherein at least one blade (6) of the minimum number of two blades on a hub (2) of the present invention impeller (1) is oriented in the tilted plane configuration or in the specific deviation from the tilted plane configuration. In the tilted plane configuration, the blade (6) line (16) of section B with angle B is on the tilted plane (13) with acute angle TA while the blade (6) line (16') of section A with angle A of the same blade (6) is on the same tilted plane (13) with angle A which is the same as angle TA. In the specific deviation from the tilted plane configuration the blade (6) line (16) of section B with angle B is on the tilted plane (13) with acute angle TA (angle TA and angle B has the same angle) while the blade (6) line (16') of section A of the same blade (6) is: [a] off the tilted plane (13) but has the same angle as the tilted plane (13) angle TA and lies on a plane parallel to the tilted plane (13) within the first boundary plane (17) of said tilted plane and the second boundary plane (18) of said tilted plane (13) or on the first boundary plane (17) of said tilted plane (13) or on the second boundary plane (18) of said tilted plane (13) or [b] the blade (6) line (16') of section A is adjacent to the tilted plane (13) or intersects the tilted plane (13) with an acute angle A of between angle TA and twenty-five percent more than the value of tilted plane (13) angle TA or the blade (6) line (16') of section A with angle A of between angle TA and twenty-five percent less the value of blade (6) line (16) angle B of section B of the said blade (6) wherein the said blade (6) line (16') of section A is between the first boundary plane (17) of said tilted plane (13) and the second boundary plane (18) of said tilted plane (13) and the said blade (6) will still be efficient. All the radial sections of the blade (6) in the present invention are interpolated to have a stable structural integrity and smooth surfaces for the blade (6) and the blade (6) section B shape or other adapted shapes maybe adapted as the radial section shape of the blade (6) root (10) radial section. The present invention impeller (1) maybe designed wherein the blade (6) leading edge (7) is somewhat blunt or a bit blunt.

The first vertical plane (14) between the first end (4) and second end (5) of the hub (2) or adjacent to the hub (2) intersecting the longitudinal axis (3) of the hub (2) perpendicularly with another plane (X) with same orientation and when said another plane (X) is partly rotated from the first vertical plane (14) on the first axis of rotation (15) becomes tilted plane (13) with acute angle TA measured perpendicularly from the said first vertical plane (14) wherein the partial rotation from said vertical plane (14) is predetermined which must be twenty degrees or seventy-eight degrees or between twenty and seventy-eight degrees and said another plane (X) or the tilted plane (13) is rotated either clockwise or counter-clockwise. The first axis of rotation (15) of the tilted plane (13) intersects the longitudinal axis (3) of the present invention impeller (1) perpendicularly and said first vertical plane (14) must have a chosen location so the blade (6) will be on the hub (2). The present invention impeller (1) blade (6) line (16') of section A and the blade (6) line (16) of section B of the same blade (6) are referred to the tilted plane (13) wherein the tilted plane (13) with acute angle TA from the first vertical plane (14) is twenty degrees or seventy-eight degrees or between twenty degrees and seventy-eight degrees measured perpendicularly from the first vertical plane (14) similarly shown in selected drawings of the present invention.

The first axis of rotation (15) is horizontal and looking along the first axis of rotation (15) of the tilted plane (13) of a horizontally positioned present invention impeller (1), the medium flow (MF) or fluid flow is from the general direction of the first end (4) to the second end (5) of the hub (2) or from inlet to outlet of the impeller housing. The tilted plane (13) rotated counter-clockwise (CCW) twenty degrees or seventy-eight degrees or between twenty degrees and seventy-eight degrees is the tilted plane (13) used for reference in the orientation of the blade (6) line (16') of section A and the blade (6) line (16) of section B of the same blade (6) for at least one blade (6) or more blades in a set of blades on a hub (2) for right hand rotation present invention impeller, whereas the tilted plane (13) rotated clockwise (CW) twenty degrees or seventy-eight degrees or between twenty degrees and seventy-eight degrees is the tilted plane (13) used for reference in the orientation of the blade (6) line (16') of section A and the blade (6) line (16) of section B of the same blade (6) for at least one blade (6) or more blades in a set of blades on the said hub (2) for the left hand rotation present invention impeller (1) when the said medium flow (MF) is from first end to the second end (5) of the impeller. Since the blades are to be attached on the hub (2), the first axis of rotation (15) is to be located between the hub (2) first end (4) and second end (5) or on the first end (4) or on the second end (5) or closely adjacent to the hub (2). Each blade (6) in a set may have a different angle TA or of different sizes or shapes but for best results, the orientation, size, and shape of all the blades in a set of blades of the present invention impeller (1) are to be substantially the same.

Slight variation in the design of the blades of the present invention impeller (1) can occur during manufacture or other variation of the tilted plane configuration maybe made wherein the efficiency would have not changed considerably so the first embodiment of the present invention includes the specific deviation from the tilted plane configuration. The specific deviation from the tilted plane configuration refers to the changes in the angle of the blade (6) line (16') angle A of section A of the radial section of the blade (6) with respect to the blade (6) line (16) angle B of section B of the same blade (6) wherein said blade (6) line (16) of section B is on the tilted plane (13) with angle TA and since the blade (6) line (16) of section B lies on the tilted plane (13), the blade (6) line (16) angle B of section B from the vertical plane (14) therefore is equal to angle TA of the tilted plane (13). The blade (6) line (16) of section B with angle B is used for reference in the orientation of the blade (6) line (16') of section A with angle A of the same blade (6) so finding the value of angle B and location of the blade (6) line (16) of section B is to be established. The blade (6) line (16) angle B of section B can be calculated with a given or predetermined value of angle TA which is between twenty and seventy-eight degrees or twenty degrees or seventy-eight degrees wherein angle TA is the acute angle of the tilted plane (13) from the first vertical plane (14) and said acute angle of the tilted plane (13) is equal to angle B of section B measured perpendicularly from the first vertical plane (14) similarly shown in selected drawings in the present invention. In the specific deviation from the tilted plane configuration the blade (6) line (16') of section A could be equal to angle TA but said blade (6) line (16') angle A of section A of equal angle to angle TA is off the tilted plane (13) and the said blade (6) line (16') of section A must be between the first boundary plane (17) of said tilted plane (13) and the second boundary plane (18) of said tilted plane (13) or on the first boundary plane (17) of said tiled plane (13) or on the second boundary plane (18) of said tilted plane (13) or the blade (6) line (16') of section A with angle A is between angle TA of the tilted plane (13) and twenty-five percent more or less the value of the tilted plane (13) angle TA and the said blade (6) line (16') of section A is between the first boundary plane (17) of said tilted plane (13) and the second boundary plane (18) of said tilted plane (13) and blade (6) line (16') of section A in this case may or may not intersect the tilted plane (13). The first boundary plane (17) of said tilted plane (13) is originally on the tilted plane (13) and said first boundary plane (17) of said tilted plane (13) is rotated from the tilted plane (13) in the direction of the third plane (B3) wherein the axis of rotation of the first boundary plane (17) of said tilted plane (13) is the blade (6) line (16) of section B which is also referred to (for explanation purposes) as the second axis of rotation (15'). The rotation angle of the first boundary plane (17) of a tilted plane (13) from the tilted plane (13) is twenty-five percent of the given or predetermined value of the tilted plane (13) angle TA. The first boundary plane (17) of a tilted plane (13) is a plane with the third acute angle (3AA) from the tilted plane (13) wherein the said third acute angle (3AA) is measured perpendicularly from the said tilted plane (13). The second boundary plane (18) of a tilted plane (13) is originally on the tilted plane (13) and the said second boundary plane (18) is rotated from the tilted plane (13) in the direction of the fourth plane (B4) wherein the axis of rotation of the second boundary plane (18) is the blade (6) line (16) of section B which is also the second axis of rotation (15') wherein angle of rotation the second boundary plane (18) of a tilted plane (13) from the tilted plane (13) is twenty-five percent of the given or predetermined value of the tilted plane (13) angle TA. The second boundary plane (18) of a tilted plane (13) is a plane with a fourth acute angle (4AA) from the tilted plane (13) wherein said fourth acute angle (4AA) is measured perpendicularly from the tilted plane (13). The third plane (B3) and the fourth plane (B4) are part of plane B when plane B is bisected by the tilted plane (13) wherein plane B intersects the tilted plane (13) perpendicularly and lies along the blade (6) line (16) of section B. The acute angle between the first boundary plane (17) and the second boundary plane (18) is fifty percent of the given or predetermined angle TA of the tilted plane (13). The angle TA is the acute angle between the first vertical plane (14) and the tilted plane (13), measured perpendicularly from the first vertical plane (14) (similarly shown in selected drawings) of the present invention impeller (1) and said first vertical plane (14) perpendicularly intersects the longitudinal axis (3) of the present invention impeller (1) or perpendicularly intersects the longitudinal axis (3) of the present invention impeller (1) hub (2).

The tilted plane configuration or the specific deviation from the titled plane configuration saves power which makes the present invention impeller (1) ideal for a larger area for each blade (6) high pressure face (12) for the present invention impeller (1). The present invention impeller (1) has one or more set of blades on the same hub (2) or the more present invention impeller (1) on a single shaft wherein the single set, or the multiple set blades of the present invention impeller (1) with each set with two or more blades wherein at least one blade (6) in a set of blades is either oriented or could be oriented in the tilted plane configuration or the specific deviation from the tilted plane configuration. On one present invention impeller (1) may include the first set (19'), the second set (20'), and the third set (21'), or with another set of blades wherein each blade (6) in a set of blades preferably of the same size and with the same tilted plane (13) angle TA. All the blades of the present invention impeller (1) or the impellers on a single shaft are designed to rotate specifically for the left hand or right hand rotation. Other blades which substantial area are off the swing area (when the impeller is rotated on the longitudinal axis of the impeller without forward motion) of one of the blade in consideration are considered to be in another set. The present invention impeller (1) which has more than one set of blades is a multi-set present invention impeller (1) wherein two adjacent set of blades of the impeller, at least one blade (6) of one set compared to at least one blade (6) of different set either has the same different angle TA or different angle TA or with similar blade (6) size or different blade (6) size or with the same or different angle P measured from a reference plane along the longitudinal axis (3) of the impeller. The present invention impeller (1) with more than one set of blades attached on a hub (2) is a multi-set impeller which may have a hub (2) inner section (22) length (23) modified to fit the existing impeller shaft (80) with short space of hub (2) inner section (22) length (23) adapted for a single set of blades for the rotatable impeller shaft (80) but the present invention impeller (1) may have a conventional length of hub (2) inner section (22) length (23) for installation on the rotatable impeller shaft (80) with longer impeller shaft (80) length for the adapted impeller. The hub (2) inner section (22) is adapted for fastening the present invention impeller (1) to the rotatable impeller shaft (80) wherein the hub (2) may not or maybe adapted for a passage of exhaust gases from the engine. The hub (2) without a passage of exhaust gases may have an adapted hub (2) to allow the multi-set present invention impeller (1) to be used on the impeller shaft (80) designed for a single set of impeller blades to allow space for tools for fastening or unfastening the end nut (81) with lock (82) of the present invention impeller (1) to or from the rotatable impeller shaft (80) but the present invention impeller (1) hub (2) may have other suitable shape and adapted to the impeller shaft (80). The present invention includes impeller or propeller or turbine runner for: aircrafts (excluding the helicopter large rotor), drones, pumps, agitator or mixing systems, weapon systems, compressors, hydro-electric plants, wind farms and manned or unmanned watercrafts (includes submarines, amphibious vehicles, personal water vehicles, and deep submergence vehicles) though the present invention impeller (1) or turbine runner for jet engine in high temperature environment are not suggested to be used due to the creep of the blade which may eventually change the blade original shape to another shape with unwanted results.

For a thinner blade (6) for present invention impeller (1), the blade (6) substantial high pressure face (12) area center is to be located adjacent to or on the first axis of rotation (15) of the tilted plane (13) since blade (6) with area center far from the first axis of rotation (15) of the tilted plane (13) is likely to be subjected to a higher centrifugal stress than a blade (6) with area center close to the first axis of rotation (15) of the tilted plane (13). The scope of present invention, however, is not limited to the high pressure (12) area center adjacent to or on the first axis of rotation (15) but includes blade (6) high pressure face (12) area center farther away from the first axis of rotation (15) within limits of the present invention.

The impeller with blade (6) which is oriented in the tilted plane configuration or oriented in the specific deviation from the tilted plane configuration is a present invention impeller (1) for motor driven system or medium driven system which works best as medium speed impeller or a low rotation impeller, but the present invention impeller (1) can be adapted for high rotation impeller by making the leading edges (7) and trailing edges (8) of the blade (6) not too far from the first axis of rotation (15) of the tilted plane (13) or the leading edge (7) and trailing edge (8) located farther from the first axis of rotation (15) but the blade (6) or blades are made thicker and best made of ample strength materials to be structurally safe from the tensile stress or the shear stress generated during rotation wherein the thicker blade (6) likely a bit heavier than the prior art impeller (1') of the same size since the blade (6) of the present invention impeller (1) maybe subjected to high structural stress specially when the blade (6) tilted plane (13) angle TA for orientation of the blade (6) is about forty-five degrees or close to forty-five degrees but angle TA of about forty-five degrees is suggested for high performance impeller systems because when the tilted plane (13) angle TA is forty-five degrees or about forty-five degrees in the orientation of the blade (6) in the tilted plane configuration or in the deviation from the tilted plane configuration the said blade (6) displaces Mt of medium or fluid volume during rotation on the longitudinal axis (3) of the impeller which is one factor for an impeller good efficiency for motor driven system while in medium or fluid driven system the said blade (6) generate of greater amount rotational force which means greater efficiency for the present invention impeller (1) and also generate great amount of stress for the blade (6) of said impeller. In the present invention the suggested tilted plane (13) angle TA for the orientation of a blade (6) to an impeller hub for motor driven system are the lower angles of tilted plane (13) angle TA and the suggested angles for the orientation of a blade (6) to the impeller hub of medium or fluid driven system are the higher angle of tilted plane (13) angle TA but bear in mind that too much tilted plane (13) angle TA for the orientation of a blade to the impeller hub for motor driven system (more than forty-five degrees) the stress of the blade increases with less efficiency and too low tilted plane (13) angle TA for the orientation of a blade to the impeller hub for medium driven system (less than forty-five degrees) the stress of the blade increases with less efficiency. The scope of the present invention includes tilted plane (13) angle TA rotated clockwise (CW) or counter-clockwise (CCW) twenty degrees or seventy-eight degrees or between twenty degrees and seventy-eight degrees since angle B or tilted plane (13) angle TA of forty-five degrees or greater than forty-five degrees maybe used in the orientation of the blade (6) in the medium or fluid driven system and maybe used in the motor driven systems. The tilted plane (13) angle TA for a blade (6) for medium or fluid driven system may be forty-five degrees or more than forty-five degrees since less than forty-five degrees angle TA slows down the medium or creates turbulent flow and generates more friction on the bearing supporting the rotatable impeller shaft (80) which are not beneficial to the said medium or fluid driven system but less than forty-five degrees tilted plane (13) angle TA maybe used in the orientation of a blade (6) to the impeller hub (2) in the medium driven system. The tilted plane (13) with acute angle TA from the first vertical plane (14) of less than twenty degrees and more than seventy-eight degrees from the first vertical plane (14) for the orientation of a blade (6) to the impeller hub in the present invention is not included in the scope of the present invention. The present invention impeller (1) has a suitable housing when used as jet drive impeller or propeller for watercrafts, weapon systems, or pumps or turbines for the generation of electricity but the scope of the present invention does not include fan for cooling and does not include the impeller or propeller specifically described and claimed in Canada Patent number CA 421074, Canada Patent number CA 423495, U.S. Pat. Nos. 1,733,251, 1,733,251, and in U.S. Pat. No. 7,025, 642 B1. As known the present invention impeller (1) is attached to the rotatable impeller shaft (80) by the end nut (81) with lock (82), and the impeller shaft (80) is adapted to fit and to rotate with the impeller hub (2) or with the key (85) and may have the known thrust washer (92). The blade (6) line (16) of section B and the blade (6) line (16') of section A of the same blade (6) of the prior art impeller (1') with the same blade profile with other blade characteristics which falls within the scope of the present invention and previously claimed in prior art impellers or propellers are excluded and not claimed in the present invention.

In the present invention, the tilted plane (13) used to orient a blade (6) on the hub (2) of the present invention impeller (1) is bisected by the second vertical plane (14') to have a far portion (FP) and the close portion (CP). The far portion (FP) and the close portion (CP) are part of the tilted plane (13) when the said tilted plane (13) is cut by the second vertical plane (14') wherein said second vertical plane (14') intersects the first axis of rotation (14) perpendicularly and said second vertical plane (14') lies along the longitudinal axis (3) of the present invention impeller (1). The close portion (CP) and the far portion (FP) of the tilted plane (13) are to be known since at the close portion (CP), the blade (6) line (16') of section A and the blade (6) line (16) of section B are generally located wherein said close portion (CP) the majority of a blade parts are located though the blade (6) have parts in the far portion (FP) and the first axis of rotation (15) part on the close portion (CP) maybe used as reference in the present invention impeller (1) blade (6) orientation.

Figure 2:
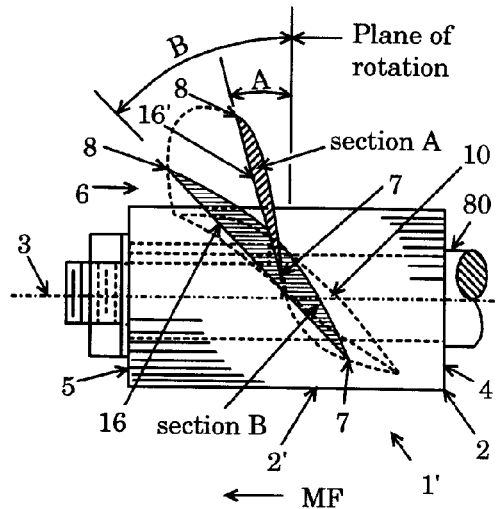
FIG. 2 illustrates the section view of a blade shown as section A on line IV-IV' cut by arc A in FIG. 4 and the section view of the same blade shown as section B on line V-V' cut by arc B in FIG. 4.
Figure 3:
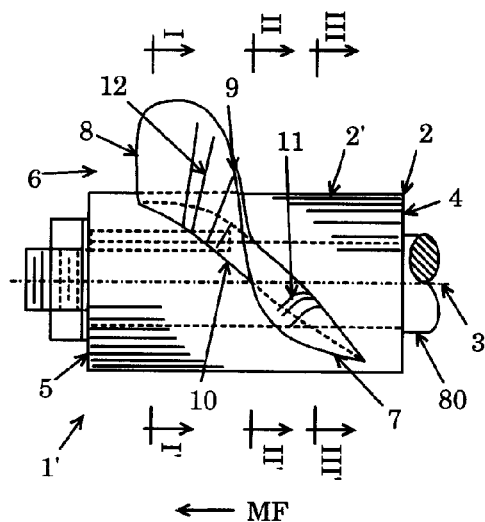
FIG. 3 illustrates the side elevation view of the impeller in FIG. 1.

FIG. 1, FIG. 2, FIG. 3. FIG. 4, FIG. 5, FIG. 6, and FIG. 7 shows the prior art impeller 1' when indicated with hub 2, hub 2 external side surface 2', longitudinal axis 3, first end 4, second end 5, blade 6 with outwardly curved leading edge 7, outwardly curved trailing edge 8, root 10, tip 9 or tip 9 midpoint. The impeller shaft 80, low pressure face 11, and high pressure face 12 are shown whenever possible.

FIG. 1 illustrates the top view of a right hand rotation prior art impeller 1' with slightly modified configuration wherein the blade 6 is attached on a substantially cylindrical hub 2 with through holes for the impeller shaft 80. The medium flow MF or fluid flow of the prior art impeller 1' is from the general area of the first end 4 to the general area of the second end 5 of the said impeller or from inlet to outlet of the impeller housing. Shown are the prior art impeller 1' parts for illustration purposes to show relationship of the impeller parts in the drawings.

FIG. 2 illustrates the prior art impeller 1' with related parts shown in FIG. 1. In FIG. 2 shows the blade 6 line 16' of section A wherein said blade 6 line 16' of section A is a straight line which connects the leading edge 7 and trailing edge 8 of section A and shows the blade 6 line 16 of section B wherein the blade 6 line 16 of section B is a straight line which connects the leading edge 7 and trailing edge 8 of section B. The blade 6 line 16 angle B of section B is substantially greater than the blade 6 line 16' angle A of section A, (angle A and angle B is measured perpendicularly from the plane of rotation intersecting the longitudinal axis 3 of the prior art impeller 1' at the blade 6 base shown in FIG. 2) because the prior art impeller 1' is a slightly modified screw type configuration impeller with substantial blade twist. Section A is the radial section of the blade 6 adjacent to the tip 9 or tip 9 midpoint cut by arc A (see FIG. 4) while section B is the radial section of the blade 6 adjacent to the hub 2 cut by arc B (see FIG. 4) wherein we find the blade 6 line 16' angle A of section A approaches the angle of the plane of rotation of the prior art impeller 1' which by design makes the blade 6 with distinctive twist, a characteristic of an Archimedean propeller or impeller.

FIG. 3 is the side elevation view of the impeller shown in FIG. 1 showing the prior art impeller 1' blade 6 attached to the hub 2 wherein the blade 6 high pressure face 12 is partly directed sideward (facing the direction of the viewer) which means portion of the force to rotate this prior art impeller 1' is used in pushing the fluid or medium sideways in addition to moving the medium or fluid rotationally and rearward, when the axis of rotation is the longitudinal axis 3 of the said impeller. The prior art impeller 1' blade 6 high pressure face 12 therefore has a component force to counter the resistance in rotating the said impeller in the medium or fluid and has a component force to move the said impeller forward and has a component force to push the medium or fluid sideways, wherein the pushing of the medium or fluid sideways uses some energy which contributes to the inefficiency of the prior art impeller 1'.

Figure 4:
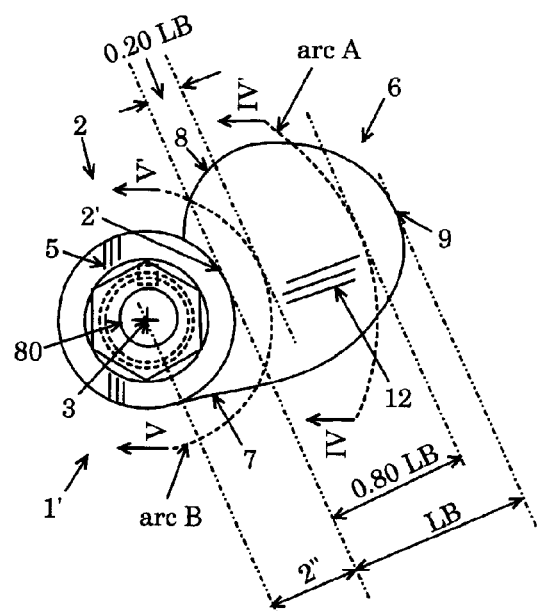
FIG. 4 illustrates the second end view of the impeller in FIG. 3.

FIG. 4 illustrates the second end 5 view of the prior art impeller 1' in FIG. 3. In FIG. 4 shows the blade 6 attached to the hub 2 and showing section view line V-V' cut by arc B wherein arc B is an arc of a circle which center on the longitudinal axis 3 of the said impeller and said arc B cut a radial section of the blade 6 adjacent to the hub 2 as section B wherein arc B cut the said blade 6 at twenty percent the blade 6 radial length LB from the hub 2 external side surface 2' and showing the section view on line IV-IV' cut by arc A wherein arc A is an arc of a circle which center on the longitudinal axis 3 of the said impeller and said arc A cut a radial section of the same blade 6 adjacent to the tip 9 or tip 9 midpoint at eighty percent the blade 6 radial length LB from the hub 2 external side surface 2'. The tip 9 or tip 9 midpoint is the farthest part of the blade 6 from the longitudinal axis 3 of the prior art impeller 1' wherein the tip 9 midpoint is midway of the wide blade 6 tip 9. Radial length LB is the perpendicular distance of the tip 9 or tip 9 midpoint from the longitudinal axis 3 of the prior art impeller 1' less the radius of the hub 2 external side surface 2' adjacent to the root 10 of the said blade 6 from the longitudinal axis 3 of the prior art impeller 1' shown in FIG. 4.

Figure 5:
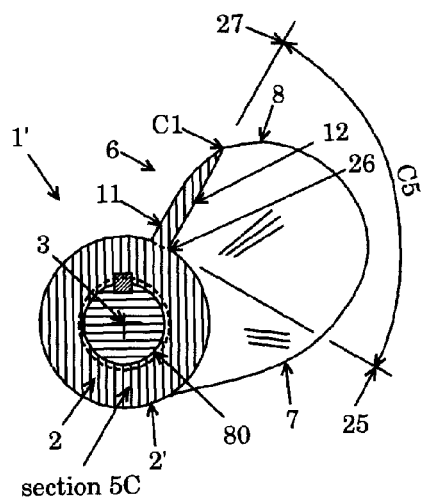
FIG. 5 illustrates the section view of the impeller blade and hub cut by section line I-I' of the impeller in FIG. 3.

FIG. 5 illustrates the section view of the prior art impeller 1' taken on line I-I' in FIG. 3. In FIG. 5 section 5C shows line 27 which is an extension of a straight line intersecting point 26 and point C 1 wherein point C 1 is the intersection of the high pressure face 12 and the low pressure face 11 of section 5C and wherein point 26 is the intersection of the hub 2 external side surface 2' and the high pressure face 12 at the blade 6 base of section 5C, and line 25 is the tangential line of the hub 2 external side surface 2' of section 5C at point 26 wherein we find angle C5, the angle between line 25 and line 27 which are to intersect at point 26 is about ninety degrees.

Figure 6:
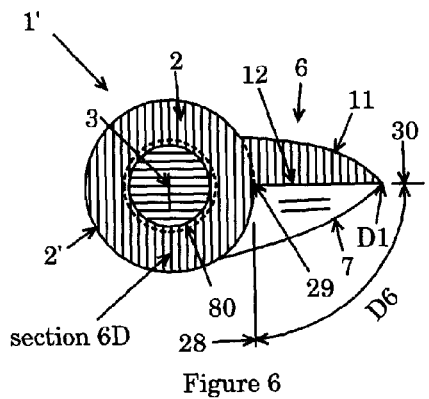
FIG. 6 shows the section view of the impeller blade and hub cut by section line II-IF of the impeller in FIG. 3.

FIG. 6 illustrates the section view taken on section line II-II' of the prior art impeller 1' yin FIG. 3. In FIG. 6 section 6D shows line 30 which is the extension of a straight line passing through point D1 and point 29 and shows line 28, the tangential line of the hub 2 external side surface 2' of section 6D at point 29 wherein point 29 is the intersection of the hub 2 external side surface 2' and the high pressure face 12 of section 6D, and wherein DI is the intersection of the high pressure face 12 and the low pressure face 11 or the intersection of the high pressure face 12 and the leading edge 7 of section 6D which also shows that angle D6, the small angle between line 28 and line 30 which are to intersect at point 29 is about ninety degrees.

Figure 7:
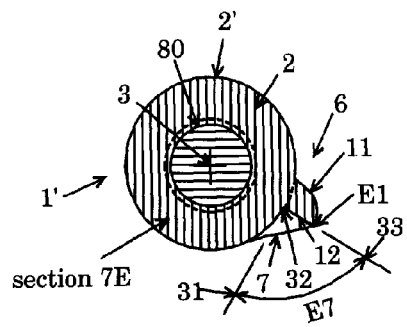
FIG. 7 shows the section view of the impeller blade and hub cut by section line III-III' of the impeller in FIG. 3.

FIG. 7 illustrates the section view taken on section line of the prior art impeller 1' in FIG. 3. In FIG. 7 section 7E shows line 33 the extension of a straight line intersecting point 32 and point E1 wherein point 32 is the intersection of the hub 2 external side surface 2' and the high pressure face 12 of section 7E and line 31 is the tangential line of the hub 2 external side surface 2' of section 7E at point 32 showing the small angle E7 between line 31 and line 33 is about ninety degrees. Point E1 is the intersection of the high pressure face 12 and the low pressure face 11 of section 7E and point 32 is the intersection of line 31 and line 33.

FIG. 8, FIG. 9, FIG. 10, FIG. 11, FIG. 12, FIG. 13, and FIG. 14 illustrates the modified prior art impeller 1' with through holes for the impeller shaft 80. The prior art impeller 1' when indicated has blade 6 with outwardly curved leading edge 7, outwardly curved trailing edge 8, outwardly curved tip 9, and root 10 wherein the said root 10 is attached to the hub 2 and shows the prior art impeller 1' first end 4, hub 2 external side surface 2', second end 5, longitudinal axis 3, and the blade 6 when indicated may show the low pressure face 11 and the high pressure face 12.

Figure 8:
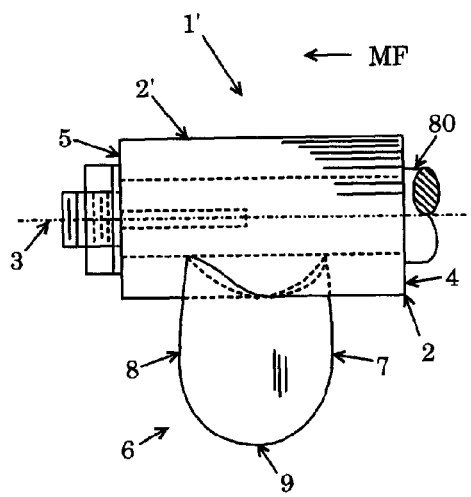
FIG. 8 illustrates the top view of another prior art impeller with slightly modified screw type configuration.

FIG. 8 illustrates the top view of the right hand rotation prior art impeller 1' with modified screw type configuration. FIG. 8 shows the cylindrical type hub 2 with through holes for the impeller shaft 80 and shows the medium flow MF is from the first end 4 to the second end 5 of the hub 2 or from inlet to outlet of the impeller housing or casing. The impeller shaft 80, the blade 6 low pressure face 11, and the blade 6 high pressure face 12 are shown in the drawings whenever possible.

Figure 9:
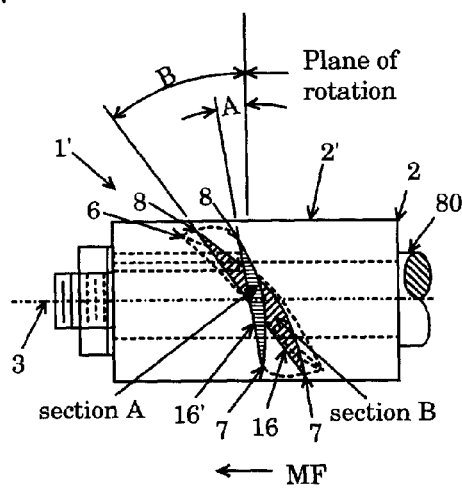
FIG. 9 illustrates the section view of a blade shown as section A on line IV-IV' cut by arc A in FIG. 11 and section view of the same blade shown as section B on line V-V' cut by arc B in FIG. 11.
Figure 10:
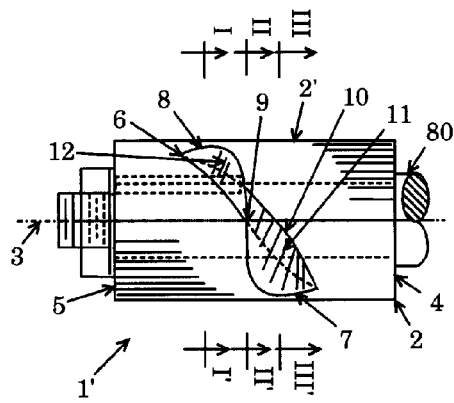
FIG. 10 illustrates the side elevation view of the impeller in FIG. 8.

FIG. 9 illustrates the prior art impeller 1' with related parts shown in FIG. 10. FIG. 9 shows section A with a blade 6 line 16' angle A which is formed by a straight line which connects the leading edge 7 and trailing edge 8 of section A and showing section B with a blade 6 line 16 angle B of section B wherein the blade 6 line 16 of section B is formed by a straight line which connects the leading edge 7 and trailing edge 8 of section B of the same blade 6 of the prior art impeller 1'. The blade 6 line 16 angle B of section B is substantially greater than the blade 6 line 16' angle A of section A measured perpendicularly from the plane of rotation of the prior art impeller 1' which is similar to the Archimedes' screw type impeller which is inefficient. Section A is the radial section of the blade 6 of the prior art impeller 1' cut by arc A and viewed on line IV-IV' in FIG. 11 while section B is the radial section of the blade 6 of the said impeller cut by arc B and viewed on line V-V' in FIG. 11.

FIG. 10 illustrates the side elevation view of the prior art impeller 1' shown in FIG. 8. FIG. 10 shows the related parts of the prior art impeller 1' wherein we find the high pressure face 12 of the blade 6 adapted for sideward movement of the medium or fluid since substantial area of said high pressure face 12 is visible which is an indication the said impeller blade move the medium or fluid sideways which is inefficient. The prior art impeller 1' of this type uses considerable energy for rotation in the medium or fluid because the blade 6 orientation similar to the prior art screw type blade 6 orientation since said blade 6 orientation allows the medium or fluid to cause a greater resistance for the impeller rotation and in the process more energy is used.

Figure 11:
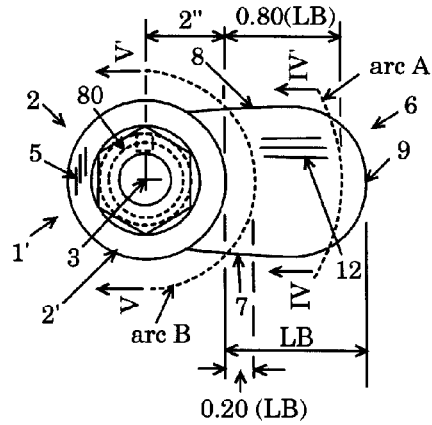
FIG. 11 is the second end view of the impeller in FIG. 10.

FIG. 11 illustrates the second end 5 view of the prior art impeller 1' in FIG. 10. In FIG. 11 shows the blade with an: outwardly curved leading edge 7, outwardly curved trailing edge 8, and outwardly curved tip 9 and shows arc A cut a radial section of the blade 6 as section A while arc B cut a radial section of the blade 6 as section B. Arc A and arc B are arc of circles called sectors which center on the longitudinal axis 3 of the prior art impeller 1'. Arc A cut the blade 6 adjacent to the tip 9 or tip 9 midpoint at eighty percent of the blade 6 radial length LB from the hub 2 external side surface 2' while arc B cut the blade 6 adjacent to the hub 2 at twenty percent the radial length LB of the said blade 6 from the hub 2 external side surface 2' of the prior art impeller 1'.

Figure 12:
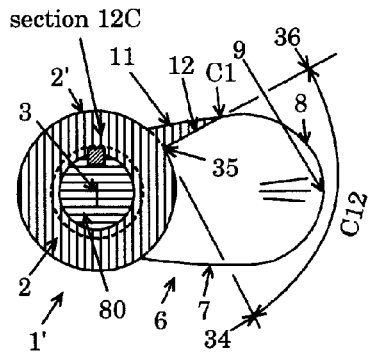
FIG. 12 illustrates the section view of the impeller blade and hub cut by section line I-I' of the impeller in FIG. 10.

FIG. 12 illustrates the section view taken on section line I-I' of the prior art impeller 1' shown in FIG. 10. In FIG. 12 shows section 12C wherein angle C12, the small angle between line 36 and line 34 which are to interest at point 35 is about ninety degrees. Line 36 is the extension line of a straight line which connects point 35 and point C1. Point C1 is the intersection of the high pressure face 12 and the low pressure face 11 of section view 12C. Line 34 is the tangent of the prior art impeller 1' hub 2 external side surface 2' of section 12C at point 35 wherein point 35 is the intersection of the high pressure face 12 and the hub 2 external side surface 2' of section view 12C.

Figure 13:
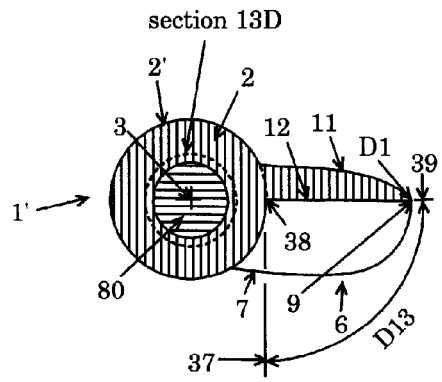
FIG. 13 shows the section view of the impeller blade and hub cut by section line II-IP of the impeller in FIG. 10.

FIG. 13 illustrates the section view of the prior art impeller 1' taken on section line II-II' in FIG. 10. In FIG. 13 shows section 13D wherein angle D13 is the small angle between line 39 and line 37 as shown which intersects at point 38 is about ninety degrees. Line 39 is the extension of a straight line which connects point 38 and point D1. Line 37 is the tangential line of the hub 2 external side surface 2' of section view 13D at point 38. Point D1 is the intersection of the high pressure face 12 and low pressure face 11 of section view 13D and point 38 is the intersection of the high pressure face 12 and the hub 2 external side surface 2' of section 13D.

Figure 14:
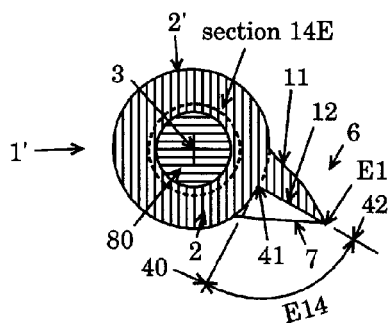
FIG. 14 shows the section view of the impeller blade and hub cut by section line III-III' of the impeller in FIG. 10.

FIG. 14 illustrates section view of the prior art impeller 1' taken on section line III-III' in FIG. 10. In FIG. 10 shows section 14E wherein line 42 is the extension line of a straight line which connects point 41 and point E1 wherein E1 is the intersection of the high pressure face 12 and the low pressure face 11 or the intersection of the high pressure face 12 and the leading edge 8 of section 14E shown in FIG. 14. Point 41 is the intersection of the hub 2 external side surface 2' and the high pressure face 12 of section 14E. The small angle E14 between line 42 and line 40 which is to intersect at point 41 is about ninety degrees. As shown in FIG. 8, FIG. 9, FIG. 10, FIG. 11, FIG. 12, FIG. 13, and FIG. 14, the prior art impeller 1' though a modified screw type impeller has a great capability of pushing the medium sideways which is inefficient. FIG. 12, FIG. 13, and FIG. 14 illustrates the high pressure face 12 sections are perpendicular or almost perpendicular to the longitudinal axis 3 of the prior art impeller 1' which shows the blade 6 has the distinct or relative feature of a screw oriented blade 6 and indicates the blade has a substantial blade 6 twist which is inefficient.

FIG. 15, FIG. 16, FIG. 17, FIG. 18, FIG. 19, FIG. 20, and FIG. 21 shows the prior art impeller 1' of a modified screw type configuration. The prior art impeller 1' with through holes for the impeller shaft 80 when indicated includes a hub 2 with hub 2 external side surface 2', longitudinal axis 3, first end 4, second end 5, blade 6 with leading edge 7, trailing edge 8, tip 9 or tip 9 midpoint, root 10, low pressure face 11, and high pressure face 12. The impeller shaft 80, the low pressure face 11 of the blade 6, and the blade 6 high pressure face 12 of the blade 6 are shown whenever possible.

Figure 15:
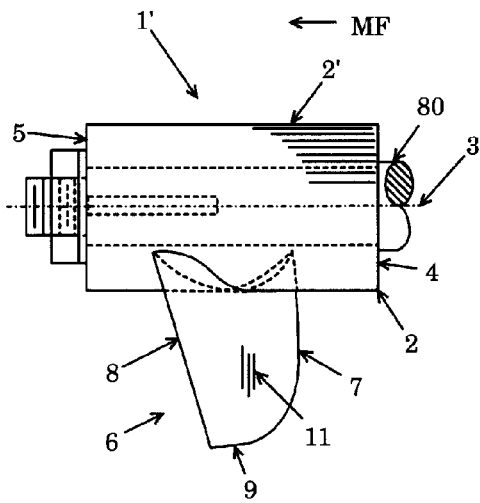
FIG. 15 illustrates the top view of another prior art impeller with screw type configuration.

FIG. 15 shows the top view of another prior art impeller 1' with blade 6 attached on a hub 2 wherein the leading edge 7 and the tip 9 form about ninety degrees and wherein the medium flow MF or fluid flow as shown is from the first end 4 to the second end 5 of the prior art impeller 1' or from inlet to outlet of the impeller housing. Shown are the related parts of the prior art impeller 1'.

Figure 16:
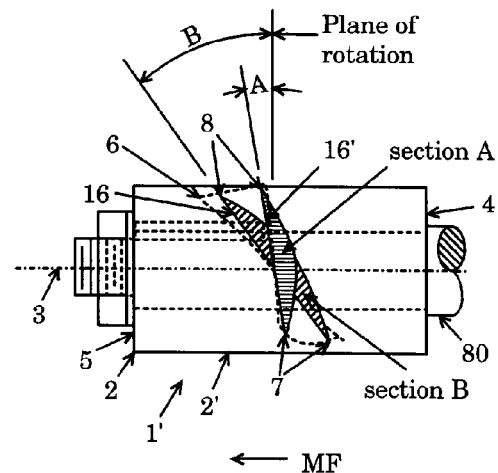
FIG. 16 illustrates the section view of a blade shown as section A on line IV-IV' cut by arc A in FIG. 18 and section view of the same blade shown as section B on line V-V' cut by arc B in FIG. 18.

FIG. 16 shows the prior art impeller 1' with blade 6 line 16 angle B of section B and shows section A with a blade 6 line 16' angle A. Section B is a radial section of the blade 6 of the prior art impeller 1' cut by arc B adjacent to the hub 2 at twenty percent the blade 6 radial length LB from the hub 2 external side surface 2' (see FIG. 18) and section A is the radial section of the blade 6 of the said impeller cut by arc A adjacent to the tip 9 at eighty percent of the blade 6 radial length LB from the hub 2 external side surface 2' (see FIG. 18) and in FIG. 16 we find the blade 6 line 16 of section B is substantially greater than the blade 6 line 16' of section A and shows the blade 6 line 16' of section A approaches the angle of the plane perpendicular to the longitudinal axis 3 of the prior art impeller 1' which are features of a blade 6 with distinct blade 6 twist and similar to the screw type impeller with outdated technology.

Figure 17:
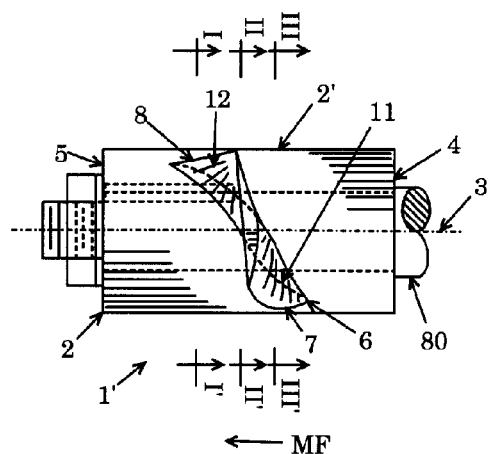
FIG. 17 illustrates the side elevation view of the impeller in FIG. 15.

FIG. 17 illustrates the side elevation view of the prior art impeller 1' shown in FIG. 15. FIG. 17 shows the high pressure face 12 visible from the viewer which means portion of the medium or fluid is pushed outwardly to the side of the impeller and part of the medium or fluid is directed rearward and part of the medium or fluid is pushed in a radial direction. The blade 6 orientation contributes to the inefficiency of the prior art impeller 1' although the reaction of the medium or fluid at the high pressure face 12 is to move in all direction away from the high pressure face 12 when the said impeller is rotated on the longitudinal axis 3 of the said impeller.

Figure 18:
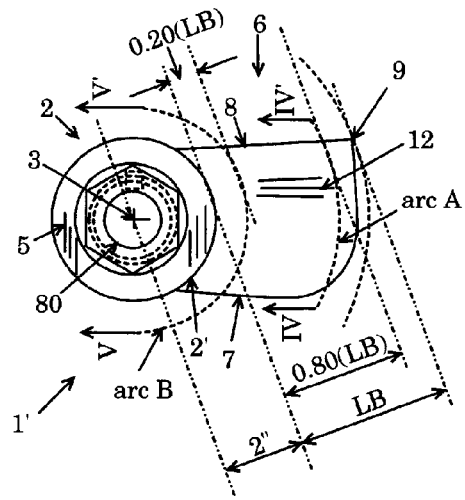
FIG. 18 is the second end view of the impeller in FIG. 17.

FIG. 18 illustrates the prior art impeller 1' second end 5 view with related parts shown in FIG. 17. In FIG. 18 shows the trailing edge 8 and the tip 9 is about ninety degrees and showing IV-IV view direction of section A and line V-V view direction of section B. Arc B cut a radial section of the blade 6 of the prior art impeller 1' as section B wherein arc B is an arc of a circle which center on the longitudinal axis 3 of the said impeller and arc B intersects the blade 6 adjacent to the hub 2 at twenty percent the blade 6 radial length LB from the hub 2 external side surface 2'. Arc A cut a radial section of the blade 6 of the prior art impeller 1' as section A wherein arc A is an arc of a circle which center on the longitudinal axis 3 of said impeller and arc A intersects the blade 6 adjacent to the tip 9 or tip midpoint at eighty percent the blade 6 radial length LB from the hub 2 external side surface 2'.

Figure 19:
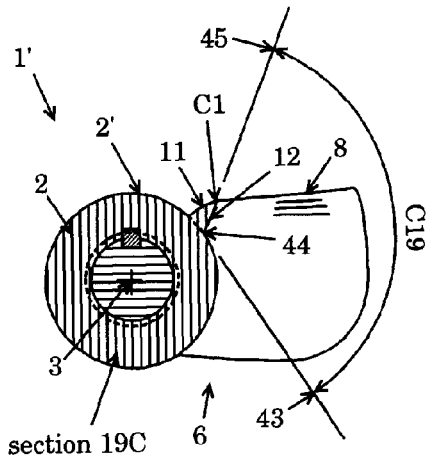
FIG. 19 illustrates the section view of the impeller blade and hub cut by section line I-I' of FIG. 17.

FIG. 19 illustrates the prior art impeller 1' section view taken on section line I-I' in FIG. 17. In FIG. 19 section 19C shows the tangential line 43 of the hub 2 external side surface 2' at point 44 and showing line 45 the extension of a straight line intersecting point 44 and point C1 wherein point C1 is the intersection of the high pressure face 12 and the low pressure face 11 of section 19C and point 44 is the intersection of the high pressure face 12 and the hub 2 external side surface 2' of section 19C and point 44 is the intersection of line 43 and line 45 showing the small angle C19 between line 43 and line 45 greater than ninety degrees.

Figure 20:
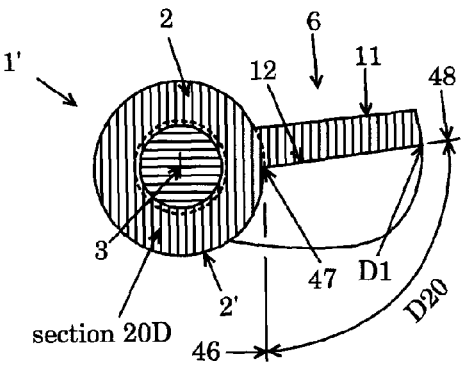
FIG. 20 shows the section view of the impeller blade and hub cut by section line II-II' of FIG. 17.

FIG. 20 illustrates the prior art impeller 1' section view taken on section line in FIG. 17. In FIG. 20 section 20D shows line 46 the tangential line of the hub 2 external side surface 2' at point 47 while line 48, the extension of a straight line intersecting point 47 and point D1. Point D1 is the intersection of the high pressure face 12 and the leading edge 7 of section 20D. Point 47 is the intersection of the high pressure face 12 and the hub 2 external side surface 2' of section 20D at the blade 6 root 10 or blade 6 base and point 47 is the intersection of line 46 and line 48 and as shown the angle D20 between line 46 and line 48 is greater than ninety degrees.

Figure 21:
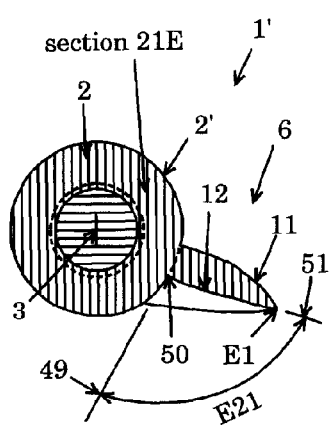
FIG. 21 shows the section view of the impeller blade and hub cut by section line of the impeller in FIG. 17.

FIG. 21 illustrates the prior art impeller 1' section view taken on section line in FIG. 17. In FIG. 21 section 21E shows the line 49 the tangential line of the hub 2 external side surface 2' at point 50, while line 51 is the extended straight line intersecting point E1 and point 50. Point E1 is the intersection of the high pressure face 12 and the leading edge 7 of section 21E. Point 50 is the intersection of the high pressure face 12 and the hub 2 external side surface 2' of section 21E at the blade 6 root 10 or blade 6 base and point 50 is the intersection of line 49 and line 51 showing angle E21, the small angle between line 51 and line 49 as shown is greater than ninety degrees.

The prior art impeller 1' shown in FIG. 15, FIG. 16, FIG. 17, FIG. 18, FIG. 19, FIG. 20, and FIG. 21 is a modified screw impeller is to some degree similar to modified screw configuration impeller in U.S. Pat. No. 1,123,202 to Amnelius filed in 1910. In the said. Amnelius patent, FIG. III and FIG. IV shows line a' is the blade line angle of a section adjacent to the hub and line d' is the blade line angle at about eighty percent of the radial distance from the hub to the tip of the blade and showing the angle of line a' is an acute angle from the plane of rotation located adjacent to the leading edge wherein the angle of line a' is much greater than the acute angle formed by line d' with the plane of rotation located adjacent to the leading edge and said plane of rotation is perpendicular to the longitudinal axis of the United States Amnelius patent impeller. Further analysis of the said Amnelius patent impeller has substantial surfaces facing the side of the impeller which means said surfaces pushes the medium in a sideward, rotational and rearward direction but may have greater efficiency than the screw type impeller. Further analysis of the drawings in U.S. Pat. No. 7,025,642 Baylor shows the blade line angles of the Baylor patent impeller with blade twist but with limited features. The features of the prior art impeller or the Archimedes' screw impeller or the prior art impeller 1' are inefficient since the said impeller blade are oriented to push the medium in a sideward, radial, and rearward direction which waste energy because the said impeller also performs unnecessary operations with some self-defeating purpose.

The prior art impeller 1' shown in FIG. 4, FIG. 11 and FIG. 18 shows the prior art impeller 1' blade 6 with different profiles as seen from the second end 5 of the prior art impeller 1 but the changes in the profiles has not improved the efficiency of the impeller considerably but may have improved the thrust when the high pressure face 12 area is increased but still inefficient. The orientation of the blade 6 in the prior art impeller 1' shown are inefficient which has been the basis of design for most impeller in use nowadays because of the good structural stability but with other technology and the present invention technology disclosed herein could provide clues or standards in building a more efficient impeller.

FIG. 1 to FIG. 18 (inclusive) illustrates the prior art impeller 1' with good design for centrifugal stability when said impeller is rotated on the longitudinal axis 3 but with a high pressure face 12 interacting with the medium in a less efficient manner by moving the medium sideways in addition to moving the medium rotationally and rearward because of the distinctive blade 6 twist bought about by the orientation of the blade 6 line 16 of section B and the blade 6 line 16' of section A which is similar to the an Archimedean propeller or impeller which is very inefficient. The poor efficiency has to be improved with better technology to make the prior art impeller 1' more efficient to save fuel and reduce greenhouse emission of the engine driving the drive train of the prior art impeller 1' and to minimize vibration, stress, and strain of on the drive line of the motor driven system as well as the drive line of the medium driven system.

Figure 22:
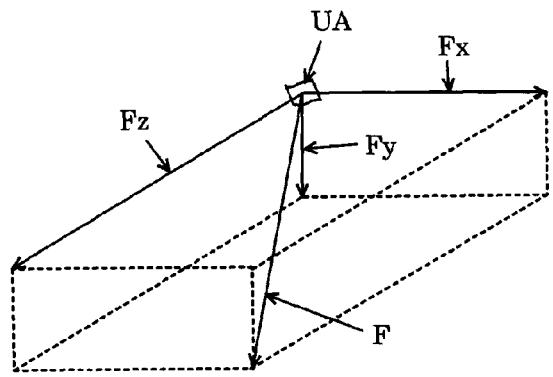
FIG. 22 illustrates the unit force F acting from the unit area of multiple unit area on the high pressure face of the blade exerted by the motor and the component force of F which consist of component forces: force Fx, force Fy, and force Fz on the high pressure face of the prior art screw type impeller or slightly modified screw type impeller or modified screw type impeller.

In FIG. 22 illustrates a schematic diagram of a unit area UA of the blade in the screw type configuration impeller exerting pressure on the medium, wherein unit force F is the pressure exerted by the unit area UA and since the blade working face or high pressure face is directed rearward, sideward, and in a radial direction, force F has a component force Fx, component force Fz and component force Fy when the said impeller is rotated on the longitudinal axis in the medium for forward movement. Force Fx is the component force of force F which has a direction to move the fluid sideways wasting energy because Fx does not move the impeller forward. Component force Fy is a component of force F which is used to overcome the resistance of the fluid or medium due to the blade position in relation to the hub when the impeller is rotated on the longitudinal axis of the said impeller. Component for Fz is the portion of force F available for work which is the force parallel to the longitudinal axis of the prior art impeller which makes the impeller move forward. The value of component force Fx is not negligible because the screw type configuration impeller has high pressure surfaces facing the side of the impeller which suggest that the quantity of the force Fx is quite large which substantially decreases the power for propulsion of the said impeller.

Figure 23:
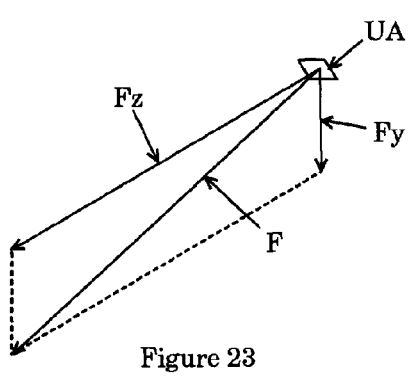
FIG. 23 illustrates the unit force F acting from a unit area of a multiple unit area of the high pressure face of the blade exerted by the motor and the component forces of force F, which are component force Fx and component force Fy on high pressure face of the present invention impeller blade in the tilted plane configuration or in the specific deviation from the tilted plane configuration.

In FIG. 23 shows a schematic diagram of the unit area UA of the present invention impeller blade exerting pressure on the medium wherein unit force F is the pressure exerted by unit area UA and since the present invention impeller blade faces rearward and a radial direction, the unit force F has component force Fy and component force Fz with no representation of force Fx since the value of force Fx is small or zero since the blade high pressure face is not visible or a small visible area of the blade high pressure face is seen when viewed from the side of the present invention impeller when the said impeller is rotated on the longitudinal axis of the present invention impeller hub in fluid or medium. There is an also an area seen from the side when the present impeller is rotated on the longitudinal axis which is inherent to the working impellers with a blade angle and the said blade angle presents some resistance when rotating the impeller and is overcome ,by force Fy. Force F also has the component force Fz which is the force to push the impeller forward. The present invention impeller has either little working surfaces to move the medium sideward or substantially eliminated by the pushing fluid sideways which provides extra usable energy to move the impeller forward and since the medium or fluid is not expelled or pushed sideways, more medium is available for the forward movement, which therefore makes the present invention impeller with more medium for moving the impeller forward for other unit area UA on the blade or more medium available for another set of blade on the impeller which makes the present invention impeller blade oriented in the tilted plane configuration or in the deviation from the tilted plane configuration substantially eliminated or minimized the pushing of the medium sideways which makes the present invention impeller very efficient. The present invention impeller better features therefore has a better approach to the impeller blade functional design which should be taken into consideration in designing a more efficient single set impeller or multi-set impeller.

Figure 24:
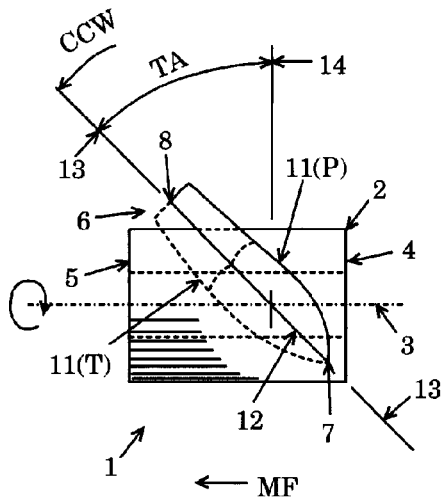
FIG. 24 illustrates a right hand rotation present invention impeller for motor driven system in solid line.

FIG. 24 illustrates a right hand rotation present invention impeller 1 with a hub 2, longitudinal axis 3, and blade 6 wherein said blade 6 with a high pressure face 12 on the tilted plane 13 to illustrate the tilted plane 13 is rotated counterclockwise CCW with a tilted plane angle TA measured from the first vertical plane 14 as shown when the said impeller is positioned horizontally, wherein the said tilted plane 13 with angle TA is used for orientation of the blade 6 line 16 of section B in relation to the present invention impeller 1 hub 2 and using the said tilted plane 13 as reference specifically for right hand rotation impeller for motor driven system when the medium flow MF or fluid flow is from the first end 4 to the second end 5 of the present invention impeller 1 as shown or from inlet to outlet in an impeller housing. The tilted plane 13 as shown is about forty-five degrees but the left hand rotation present invention impeller 1 tilted plane 13 for the orientation of a blade 6 maybe rotated counterclockwise CCW twenty degrees or seventy-eight degrees or between twenty degrees and seventy-eight degrees. The present invention therefore includes right hand rotation impeller for motor driven system in the tilted plane configuration and in the specific deviation from the tilted plane configuration.

Figure 25:
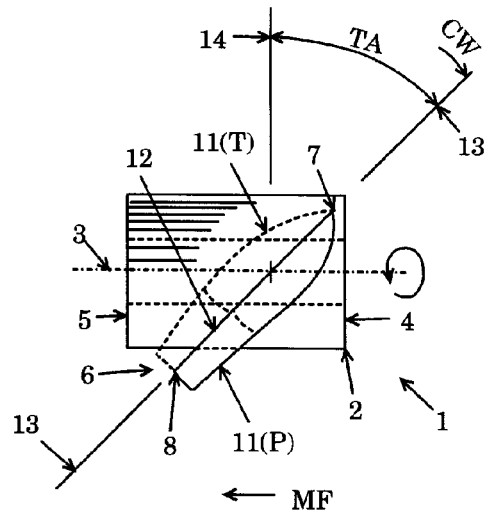
FIG. 25 illustrates a left hand rotation present invention impeller for motor driven system in solid line.

FIG. 25 illustrates a left hand rotation present invention impeller 1 with a hub 2, longitudinal axis 3, and blade 6 wherein said blade 6 with a high pressure face 12 on the tilted plane 13 to illustrate the tilted plane 13 is rotated clockwise CW to a tilted plane 13 with angle TA measured from the first vertical plane 14 as shown when the said impeller is positioned horizontally, wherein the said tilted plane 13 with acute angle TA is used for orientation of the blade 6 line 16 of section B in relation to the present invention impeller 1 hub 2 using the tilted plane 13 as reference specifically for left hand rotation impeller for motor driven system when the medium flow MF or fluid flow is from the first end 4 to the second end 5 of the present invention impeller 1 as shown or from inlet to outlet in an impeller housing. The tilted plane 13 as shown is about forty-five degrees but the left hand rotation present invention impeller 1 tilted plane 13 for the orientation of a blade 6 maybe rotated clockwise CW twenty degrees or seventy-eight degrees or between twenty degrees and seventy-eight degrees. The present invention therefore includes left hand rotation impeller for motor driven system in the tilted plane configuration and in the specific deviation from the tilted plane configuration.

FIG. 26, FIG. 27, FIG. 28, FIG. 29, FIG. 30, FIG. 31, and FIG. 32 illustrates part of the present invention first embodiment wherein the blade 6 of the present invention impeller 1 is oriented in the tilted plane configuration. The present invention impeller 1 when indicated includes a hub 2 with external side surface 2', average radius 2" of the hub 2 (or the average distance of the hub 2 external side surface 2' at the said blade 6 base from the longitudinal axis 3 of the present invention impeller 1) at the blade 6 root 10 or blade 6 base, longitudinal axis 3, first end 4, second end 5, and blade 6 wherein the said blade 6 with leading edge 7, trailing edge 8, tip 9 or tip 9 midpoint, root 10, low pressure face 11(P) or 11(T) or 11, and high pressure face 12. One or any of the blade 6 of the present invention impeller 1 is in consideration thus one blade 6 on the hub 2 is examined, described and shown although the present invention impeller 1 have two or more blades on the hub 2 which are recommended to be spaced equally on the hub 2 and wherein the hub 2 is substantially a cylindrical in shape with through holes for the impeller shaft 80 and said hub 2 maybe adapted to have exhaust passage from the engine or the said hub 2 is in other suitable form. The present invention impeller 1 as shown is a right hand rotation impeller since the tilted plane 13 used in the orientation of the blade 6 is rotated counter-clockwise CCW (similarly shown in FIG. 30) when the medium flow MF or fluid flow is from the first end 4 to the second end 5 of the present invention impeller 1 or from inlet to outlet in an impeller housing.

Figure 26:
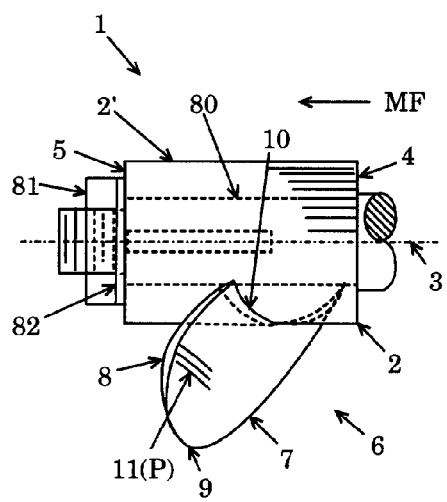
FIG. 26 illustrates the top view of a right hand rotation present invention impeller which is a part of the first embodiment of the present invention.

In FIG. 26 illustrates the right hand rotation present invention impeller 1 top view wherein the blade 6 with outwardly curved leading edge 7, outwardly curved trailing edge 8, with root 10 attached to the hub 2 and shows the first end 4, second end 5, and the longitudinal axis 3, indicated for reference purposes since part of the scope of the present invention deals with blade (6) line (16) of section B and blade (6) line (16') of section A orientation with respect to the hub 2. The tip 9, leading edge 7, and the trailing edge 8 may have other known shape. Not shown in FIG. 26 is the inner hub 2 which maybe adapted for exhaust passage. The present invention impeller 1 hub 2 is adapted to fit snugly and secured to the rotatable impeller shaft 80 with key 85, thrust washer (not shown) end nut 81, and lock 82 or secured with other known systems.

Figure 27:
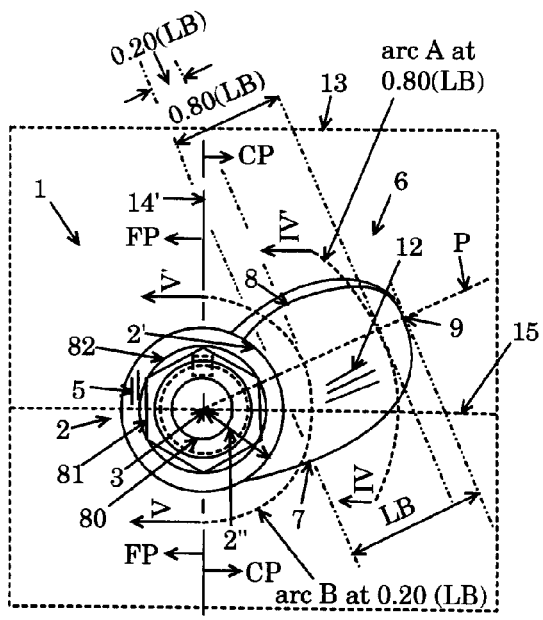
FIG. 27 illustrates the second end view of the present invention impeller shown in FIG. 28.

FIG. 27 illustrates the second end 5 view of the present invention impeller 1 shown in FIG. 28. FIG. 27 shows line V-V' as reference line for section view of section B while line IV-IV' as reference line for section view of section A of the same blade 6. Arc B cut a section of the present invention impeller 1 blade 6 as section B. Arc B cut section B of the blade 6 adjacent to the hub 2 at twenty percent of the blade 6 radial length LB from the blade 6 base or from the hub 2 external side surface 2' while arc A cut section A of the same blade 6 adjacent to the tip 9 or tip 9 midpoint at eighty percent the said blade 6 radial length LB from the blade 6 base or from the hub 2 external side surface 2'. Radial length LB is the difference between the perpendicular distance of the tip 9 or tip 9 midpoint from the longitudinal axis 3 of the present invention impeller 1 and the perpendicular distance of the hub 2 external side surface 2' from the longitudinal axis 3 of the said impeller wherein the said hub 2 side surface 2' is adjacent to and off the addendum (AD) when the blade 6 blends with the hub 2 and wherein the tip 9 or tip 9 midpoint are the farthest point of the blade 6 from the longitudinal axis 3 of the present invention impeller 1 and tip 9 midpoint additionally is half or midway of a wide blade 6 tip 9. For distance measurement, the hub 2 external side surface 2' does not include the addendum (AD) (see FIG. 93) wherein said addendum (AD) blends the hub 2 and the blade 6. Section A and section B are radial sections of the blade 6 since arc A and arc B are radial lines. The radius of the hub 2 and the radial distance of the tip 9 or radial distance of the tip 9 midpoint from the longitudinal axis 3 of the present invention impeller 1 maybe measured along location line P since location line P is a line that intersects the tip 9 or tip 9 midpoint and intersects the longitudinal axis 3 of the said impeller perpendicularly. FIG. 27 also shows the tilted plane 13 is bisected by the second vertical plane 14' and shows the close portion CP and the far portion FP of the tilted plane 13 wherein the close portion CP of the tilted plane 13 is generally used in the orientation of each blade 6 for the present invention impeller 1 but the said blade 6 may have parts on the far portion FP. In the present invention when one blade is designed, other blades of the same set maybe designed on same hub 2 the same way as the one blade by simply rotating the hub 2 clockwise to a hub 2 rotation angle of about 360 divided by N or 360/N wherein N is the number of blades of the set and the said hub 2 rotation angle is the approximate or exact number of degrees partial rotation of the hub 2 to establish the horizontal first axis of rotation 15 of the other blade on the close portion CP which maybe on the same plane of rotation (or same first vertical plane 14) as the said one blade 6 or adjacent to a plane of rotation (or adjacent to the first vertical plane 14) of the said one blade 6 or adjacent to the said first axis of rotation 15 of the said one blade 6 and said first axis of rotation 15 of the one blade 6 maybe used in the orientation of the other blade 6 tilted plane 13 and establish the angle TA of the other blade 6 and wherein said other tilted plane 13 is divided by the second vertical plane 14' of said other blade 6 and the cycle is repeated for another blade on the set, if any.

FIG. 28 is the side elevation view of the present invention impeller 1 shown in FIG. 26 wherein said impeller with blade 6, leading edge 7, trailing edge 8, tip 9 or tip 9 midpoint and high pressure face 12 are shown, and wherein said high pressure face 12 as shown is on the tilted plane 13 but for other section shapes of the present invention impeller 1, the high pressure face 12 may not be on the tilted plane 13 although the blade 6 line 16' of section A and the blade 6 line 16 of section B is on the tilted plane 13 to be on the tilted plane configuration. The low pressure face 11(T) location in relation to the tilted plane 13 is typical to the present invention impeller 1 on operation for medium driven systems as in the case of hydroelectric turbines or wind turbines and low pressure face 11(P) location in relation to the tilted plane 13 are typical to motor driven systems as in the case of watercrafts, drones, weapon systems, mixing and agitator systems, air vehicles, pumps, and compressors when the medium or fluid flow is from the first end 4 to the second end 5 of the hub 2. The tilted plane 13 angle TA from the first vertical plane 14 as shown is about forty-five degrees but the scope of the present invention includes angle TA of twenty degrees and seventy-eight degrees or between twenty degrees and seventy-eight degrees for left hand rotation and right hand rotation impeller and high angles of tilted plane 13 angle TA from the first vertical plane 14 are suggested to be used for medium driven system while low angles of the tilted plane 13 from the first vertical plane 14 are suggested to be used in motor driven systems. The present invention excludes tilted plane 13 angle TA less than twenty degrees measured from the first vertical pane 14 of a horizontally positioned present invention impeller 1 and excludes tilted plane 13 angle TA of more than seventy-eight degrees measured perpendicularly from the first vertical plane 14 as shown. FIG. 28 also shows the tilted plane 13 is rotated counter-clockwise CCW to an angle TA or angle B which indicates the impeller is a right hand rotation impeller.

FIG. 29 illustrates blade radial section views of a blade 6 of the present invention impeller 1 as part of the first embodiment of the present invention showing the said blade 6 section A, the radial section of the blade 6 adjacent to the tip 9 at eighty percent the radial length (LB) of the blade 6 and shows the blade 6 section B, the radial section of the blade 6 adjacent to the hub 2 at twenty percent the radial length (LB) of the blade 6 of the said impeller. The blade 6 line 16 angle B of section B is equal to the tilted plane 13 angle TA measured from the first vertical plane 14 as shown and the blade 6 line 16' angle A of section A is equal to the tilted plane 13 angle TA which shows the blade 6 is oriented in the tilted plane configuration. The blade 6 line 16' of section A and the blade 6 line 16 of section B maybe extended for angle measurements. FIG. 29 also shows the low pressure face 11(P) of the blade 6 which is at the front section FS of the tilted plane 13 wherein the said blade 6 are for impeller designed for watercrafts, air vehicles, weapon systems, agitator and mixing systems, compressors, drones, and pumps while the low pressure face 11(T) at the rear section RS of the tilted plane 13 are impeller designed for hydro-electric turbines and wind turbines in electric generation operations for right hand rotation present invention impeller 1 when the medium flow MF or fluid flow is from the general area of the first end 4 to the general area of the second end 5 of the said impeller or the medium flow MF or fluid flow is from the inlet to the outlet of the impeller housing.

FIG. 30 illustrates the section view of the present invention impeller 1 on section line III-III' shown in FIG. 28. In FIG. 30 section 30C shows that line 52, the tangential line of the hub 2 external side surface 2' at point 53, wherein point 53 is the intersection of the high pressure face 12 and the hub 2 external side surface 2' of section 30C or the projected intersection of the hub 2 external side surface 2' and high pressure face 12 when the blade 6 blends with the hub 2 in the presence of an addendum (AD) and also shows line 54, the extension of a straight line intersecting point 53 and point C1 wherein C1 is the intersection of the high pressure face 12 and the leading edge 7 of section 30C of the present invention impeller 1 and point 53 is the intersection of line 52 and line 54 to have an angle C30 of more than ninety degrees.

FIG. 31 illustrates the section view of the present invention impeller 1 taken on line II-II' shown in FIG. 28. In FIG. 31 section 31D shows line 55 which is the tangent of the hub 2 external side surface 2' at point 56 wherein point 56 is the intersection of the blade 6 high pressure face 12 and the hub 2 external side surface 2' or said point 56 is the projected intersection of the high pressure face 12 and the hub 2 external side surface 2' when the blade 6 blends with the hub 2 or when there is an addendum (AD) between the blade 6 high pressure face 12 and hub 2. Line 57 is the extension line of a straight line intersecting the leading edge 7 and point 56, while point D1 is the intersection of the blade 6 high pressure face 12 and the leading edge 7 of section view 31D of the present invention impeller 1 and line 55 and line 57 which are to intersect at point 56 to have an angle D31 as shown is ninety degrees.

FIG. 32 illustrates the section view of the present invention impeller 1 taken on section line I-I' shown in FIG. 28. In FIG. 32 section 32E shows line 58 which is the tangent of the hub 2 external side surface 2' at point 59, wherein point 59 is the intersection of the hub 2 external side surface 2' and the high pressure face 12 of section 32E. Section 32E is cut by line I-I' in FIG. 28 and line 60 is the extension of a straight line intersecting point 59 and point E1, wherein E1 is the intersection of the high pressure face 12 and the leading edge 7 of section view 32E. Point 59 is the intersection of line 58 and line 60 or point 59 is the projected intersection (PI) of the high pressure face 12 and the hub 2 external side surface 2' when there is an addendum (AD) between the blade 6 and the hub 2. Section 32E shows angle E12 of less than ninety degrees which means the blade 6 of this kind of section is centrifugally stressed during rotation which needs a thicker base and body and made of high strength materials to be structurally safe from the centrifugally induced stress and from the medium pressure or fluid pressure.

FIG. 33, FIG. 34, FIG. 35, and FIG. 36 illustrates a left hand rotation impeller which is a part of the present invention first embodiment and shown for better understanding of the orientation of the blade 6 line of 16' of section A and the. blade 6 line 16 of section B of the same blade 6 as oriented on the hub 2 of the present invention impeller 1 for left hand rotation in accordance to the tilted plane configuration. The present invention impeller 1 when indicated includes a hub 2 with external side surface 2', average radius 2'' of the hub 2 (or the average distance of the hub 2 external side surface 2' at the said blade 6 base from the longitudinal axis 3 of the present invention impeller 1) at the blade 6 root or blade 6 base, longitudinal axis 3, first end 4, second end 5, and blade 6 wherein the said blade 6 with leading edge 7, trailing edge 8, tip 9 or tip 9 midpoint, root 10, low pressure face (11(P) or 11(T) or 11, and high pressure face 12.

Figure 33:
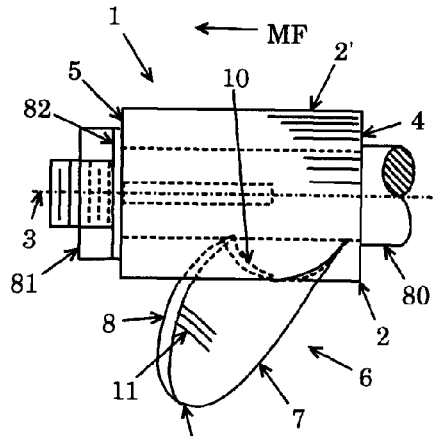
FIG. 33 illustrates the top view of the present invention left hand rotation impeller which is a part of the first embodiment of the present invention.

FIG. 33 is the top view of a left hand rotation present invention impeller 1 showing the impeller shaft 80, end nut 81, lock 82, and impeller parts which includes blade 6 with leading edge 7, trailing edge 8, root 10, tip 9 or tip. 9. midpoint, low pressure face 11 wherein the left hand rotation present invention impeller 1 as shown with hub 2 and external side surface 2', longitudinal axis 3, first end 4, and second end 5. The medium flow MF as shown is from the first end 4 to second end 5 of the present invention impeller 1 or from inlet to outlet in an impeller housing.

Figure 34:
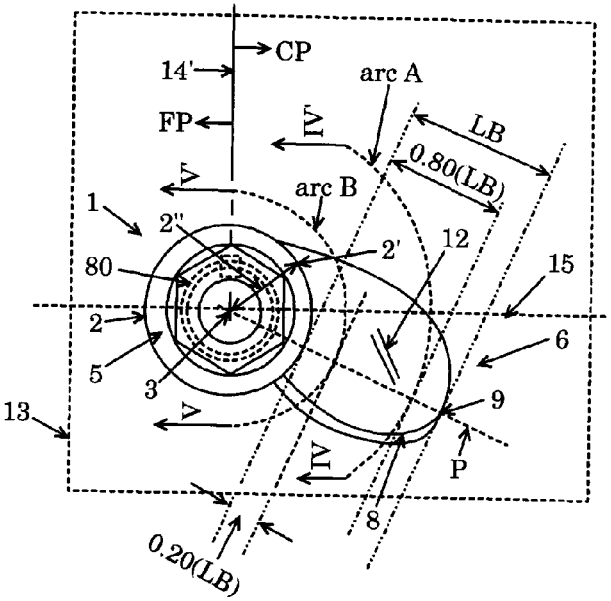
FIG. 34 shows the second end view of the impeller in FIG. 35.

FIG. 34 illustrates the second end 5 view of the present invention impeller 1 with parts shown in FIG. 33. In FIG. 34 shows the left hand rotation impeller 1 and shows location line P intersecting the tip 9 or tip 9 midpoint of the blade 6 and intersects the longitudinal axis 3 of the said impeller. Arc A cut a radial section (as section A) of the blade 6 adjacent to the tip 9 or tip 9 midpoint at eighty percent the blade 6 radial length LB from the hub 2 side external surface 2' on line IV-IV' while arc B cut a radial section (as section B) of the blade 6 adjacent to the hub 2 at twenty percent the blade 6 radial length LB from the hub 2 side external surface 2' on line V-V'. FIG. 34 also shows the second vertical plane 14' bisecting the tilted plane 13 to have the close portion CP and the far portion FP wherein the close portion is substantially used in the orientation of the blade 6 but the blade. 6 may have parts in the far portion FP. Blade 6 radial length LB is the perpendicular distance of the blade 6 tip 9 or tip 9 midpoint from the longitudinal axis of the impeller less the perpendicular distance of the hub 2 external side surface 2' adjacent to the blade 6 root 10 wherein hub 2 external side surface 2' is adjacent and off the addendum when the blade 6 blends with the hub 2.

Figure 35:
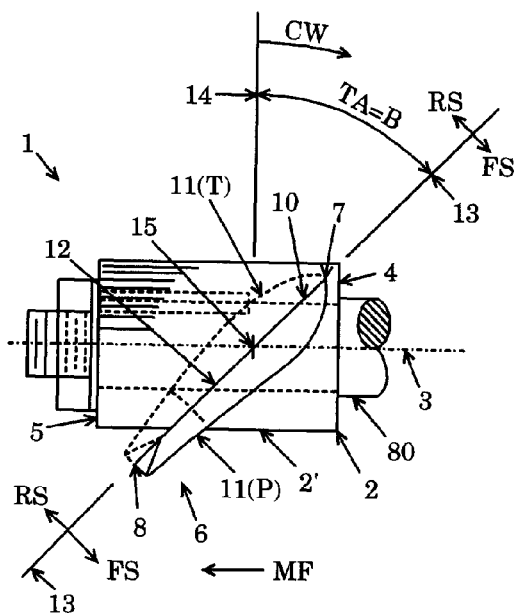
FIG. 35 shows the side elevation view of the impeller in FIG. 33.

FIG. 35 illustrates the side elevation view of a left hand rotation present invention impeller 1 shown in FIG. 33. In FIG. 35 the tilted plane 13 is rotated clockwise CW on the first axis of rotation 15 wherein the tilted plane 13 with an angle TA from the first vertical plane 14 as shown of the horizontally positioned present invention impeller 1, wherein tilted plane 13 as shown is about forty-five degrees from the first vertical plane 14 but the scope of the present invention includes tilted plane 13 rotated clockwise CW of twenty degrees or seventy-eight degrees or between twenty and seventy-eight degrees measured perpendicularly from the first vertical plane 14 as shown. The present invention impeller 1 view shown with low pressure face 11(P) shown in solid line located at the front section FS of the tilted plane 13 and the high pressure face 12 are view of a blade 6 location parts in relation to the tilted plane 13 which applies to watercrafts, weapon systems, mixing and agitation systems, pumps, compressors, air vehicles, and drones while the low pressure face 11(T) shown in broken line located at the rear section RS of the tilted plane 13 and the high pressure face 12 is a view of a present invention impeller 1 blade 6 location parts in relation to the tilted plane 13 which applies to hydro-electric turbines and wind turbines when the medium flow MF or fluid flow is from the general area of the first end 4 to the general area of the second end 5 of the said impeller or the medium flow MF or fluid flow is from the inlet to the outlet of the impeller housing.

Figure 36:
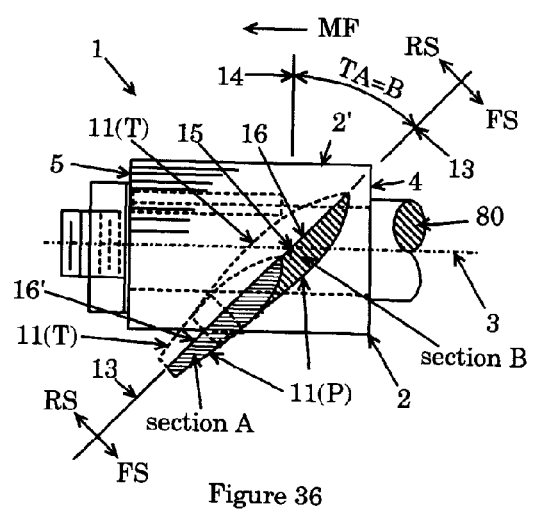
FIG. 36 illustrates the blade section view of section A on section line IV-IV' cut by arc A in FIG. 34 and shows the blade section view of the same blade shown as section B on section line V-V' cut by arc B in FIG. 34 and in said

FIG. 36 illustrates section B cut by arc B and seen on line V-V' shown in FIG. 34 and shows section A cut by arc A and seen on line IV-IV' shown in FIG. 34. As shown the blade 6 line 16 of section B is on the tilted plane 13 with angle TA and the blade 6 line 16' of section A is on the same tilted plane 13 with angle TA (said blade lines may have to be extended for angle measurements) which means the blade 6 is oriented in the tilted plane configuration. The high pressure face 12 and the blade 6 line 16 of section B as shown is on the tilted plane 13 with angle TA of about forty-five degrees but the tilted plane 13 in the present invention includes twenty degrees or seventy-eight degrees or between twenty and seventy-eight degrees and still within the limits of the present invention and furthermore the high pressure face 12 and other section shapes the high pressure face 12 may not be on the tilted plane 13 but the blade 6 line 16' of section A and the blade 6 line 16 of section B are always in the tilted plane 13 to be in the tilted plane configuration.

The present invention impeller (1) encounter less resistance during forward movement since there is not much pressure acting on the low pressure face (11(P) or 11(T) or 11 or 11') portion of the blade (6) because the present invention impeller (1) blade (6) or blades said low pressure face is basically cleared by the leading edge 7 of the said blade 6 because of the impeller slip which is always present since the fluid or medium is not solid and the present invention has not traveled the same distance as the impeller should have traveled and with the blade efficient orientation in the present invention, the blade (6) leading edge (7) makes a cleared area as a free or no drag area for forward motion which makes a thicker blade 6 acceptable or to have section shapes as shown in FIG. 53 to FIG. 68 (inclusive) wherein good efficiency is achieved when the radial sections of the blade 6 low pressure face (11 or 11' or 11(t) or 11(T)) is at the rear section of another vertical plane parallel to the first vertical plane 14 which intersects the leading edge (7) of said section. In the present invention the blade (6) high pressure face (12) is not limited to flat surface but may have other section shapes or may have section shapes as shown in FIG. 53 to FIG. 68 (inclusive) which are the suggested section shapes of section B but the profile of section B shown in FIG. 53 to FIG. 68 (inclusive) maybe used as profile the section A for the impeller of the present invention or maybe adapted for left hand rotation impeller blade profiles or other profiles with suitable shapes.

The manufacture of the impeller sometimes deviate from the original design and there could be some variation to the drawings shown in FIG. 29 and FIG. 36 and the impeller efficiency may not change dramatically so the scope of the present invention is not limited to the tilted plane configuration but includes the specific deviation from the tilted plane configuration referred to in this present invention as the specific deviation from the tilted plane configuration similarly shown in FIG. 37 to FIG. 52 (inclusive) wherein the orientation of the blade 6 on the hub 2 with blade 6 line 16 of section B on the tilted plane (13) with angle TA (angle TA is equal to angle B) and wherein the same blade (6) the blade (6) line (16') angle A of section A is [a] off the tilted plane (13) but with the same angle as the blade (6) line (16) of section B and the said blade (6) line (16') of section A is between the tilted plane (13) and the first boundary plane 17 of the said tilted plane or between the tilted plane (13) and the second boundary plane (18) of said tilted plane (13) or on the first boundary plane (17) of said tilted plane (13) or on the second boundary plane (18) of said tiled plane (13) or the blade (6) line (16') angle A of section A is [b] greater or less than the blade (6) line (16) angle TA of section B or greater or less than the blade (6) line (16) angle B of section B wherein the angle limits of the blade (6) line (16') angle A of section A is twenty-five percent more or less the angle B of the section B which makes the blade (6) line (16) angle A of section A between tilted plane (13) angle TA and twenty-five percent more than the blade (6) line (16) angle B of section B or between tilted plane (13) angle TA and twenty-five percent less the blade 6 line (16) angle B of section B and the said blade (6) line (16') of section A is between the first boundary plane (17) of said tilted plane (13) and the second boundary plane (18) of said tilted plane (13) and the said blade (6) line (16') of section A may intersect or may not intersect the said tilted plane 13. The first boundary plane (17) of said tilted plane (13) and the second boundary plane (18) of said tilted plane (13) are planes which are used as reference to the limits of the present invention impeller (1) blade (6) line (16') of section A orientation. The first boundary plane (17) is rotated in the direction of the third plane (B3) to have an third acute angle (3AA) between the tilted plane (13) and the first boundary plane (17) with the blade (6) line (16) of section B as the axis of rotation wherein said third acute angle (3AA) with an angle of twenty-five percent the value of predetermined tilted plane (13) angle TA. The second boundary plane (18) is rotated from the tilted plane (13) with the blade (6) line (16) of section B as the axis of rotation for the said second boundary plane (18) and rotated in the direction of the fourth plane (B4) to have fourth acute angle (4AA) from the tilted plane (13) and said fourth acute angle (4AA) with an angle of twenty-five percent the value of the said predetermined tilted plane (13) angle TA. Further illustrations of the first boundary plane (17) of a tilted plane (13) and the second boundary plane (18) of the said tilted plane are shown in FIG. 92. When the blade (6) line (16') of section A is moved from the tilted plane (13) the other parts of the blade (6) may have moved too but the blade (6) line (16) of section B is always on the said predetermined tilted plane (13). The radial sections of a blade 6 of the present invention impeller (1) are interpolated so the blade (6) may have smooth surfaces with good structural integrity wherein the root end (10) of the blade (6) maybe larger or less in size than the profile of section B which maybe a matter of choice or feasibility.

In FIG. 37, FIG. 38, FIG. 39, FIG. 40, FIG. 41, FIG. 42, FIG. 43 and FIG. 44 illustrates part of the present invention first embodiment showing a right hand rotation present invention impeller 1 with blade 6 wherein section A and section B as shown is oriented in the specific deviation from the tilted plane configuration which is a part of the first embodiment of the present invention and shows a predetermined angle TA of about forty-five degrees from the vertical plane 14 but the present invention includes angle TA of twenty degrees or seventy-eight degrees or between twenty degrees and seventy-eight degrees and wherein the angles of the first boundary plane 17 and the second boundary plane 18 from the tilted plane 13 are exaggerated to make clear illustrations and further shows the blade 6 line 16 of section B is on the tilted plane 13 with angle TA or angle B and the blade 6 line 16' of section A of the same blade 6 is either [a] with the same or equal angle to angle TA but off the tilted plane 13 and positioned within the acute angle between the tilted plane 13 and the first boundary plane 17 of said tilted plane 13 or located within the acute angle between the tilted plane 13 and the second boundary plane 18 of said tilted plane 13 or on the first boundary plane 17 of said tilted plane 13 or on the second boundary plane 18 of said tilted plane 13 or [b] with angle A of between tilted plane 13 angle TA and twenty-five percent more or less the value of angle TA of said tilted plane 13 and the blade 6 line 16' of section A is within the acute angle between the first boundary plane 17 of said tilted plane 13 and the second boundary plane 18 of said tilted plane 13 and may intersect or may not intersect the said tilted plane 13. FIG. 37 to FIG. 44 (inclusive) the tilted plane 13 as shown as a line which indicates that the viewer is looking along the tilted plane 13 and some drawings in the present invention may show the tilted plane 13 as a line which simply means the viewer is looking along the tilted plane 13. The present invention impeller 1 section A of the blade 6 as previously mentioned is cut by arc A wherein arc A is an arc of a circle which radius intersect the blade 6 adjacent to the tip 9 or tip 9 midpoint at eighty percent the blade 6 radial length LB while arc B is an arc of a circle which radius intersect the same blade 6 adjacent to the hub 2 at twenty percent the blade 6 radial length LB and wherein arc A and arc B center lie on the longitudinal axis 3 of the hub 2 or lie on the longitudinal axis 3 of the present invention impeller 1. Radial length LB is the perpendicular distance of the tip 9 or tip 9 midpoint from the longitudinal axis 3 of the present invention impeller 1 less the radial distance of the hub 2 external side surface 2' from the longitudinal axis 3 of the said impeller wherein said hub 2 external side surface 2' is a part of the hub 2 adjacent to a blade 6 off the addendum (the addendum (AD) is shown in FIG. 93). Section A is cut by arc A similarly shown in FIG. 27 and seen on line IV-IV' while section B is cut by arc B similarly shown in FIG. 27 and seen on line V-V'. In FIG. 37 to FIG. 52 (inclusive) shows the present invention impeller 1 blade 6 with solid line low pressure face 11(P) for watercrafts, weapon systems, air vehicles, mixing and agitation systems, pumps, drones, and compressors while the broken line low pressure face (11(T)) for hydro-electric turbines and wind turbines when the medium flow MF or fluid flow is from the first end 4 to the second end 5 of the hub 2 or from inlet to outlet in an impeller housing. The angle TA as shown is about forty-five degrees but includes angle TA of between twenty degrees and seventy-eight degrees or twenty degrees or seventy-eight degrees. Angle A, angle B, and angle TA are measured perpendicularly from the first vertical plane (14) similarly shown in most of the drawings which shows the present invention impeller 1. In FIG. 37 to FIG. 52 (inclusive) does not show the root end of the blade 6 since there would be too many lines on the drawing and with too many lines may make the drawing intelligible or make the drawing to jumble of lines which could be confusing to the reader. Since the present invention impeller 1 is a right hand rotation impeller the tilted plane 13 is rotated counterclockwise CCW to show the tilted plane 13 angle TA which is used as angle B of section B and used to calculate the blade 6 line 16' of section A (the blade 6 line 16' of section A and the blade 6 line 16 of section B maybe extended for angle measurement) wherein said blade 6 line 16 angle B of section B, blade 6 line 16' angle A of section A, and the tilted plane 13 angle TA are measured perpendicularly from the vertical plane 14 similarly shown.

Figure 37:
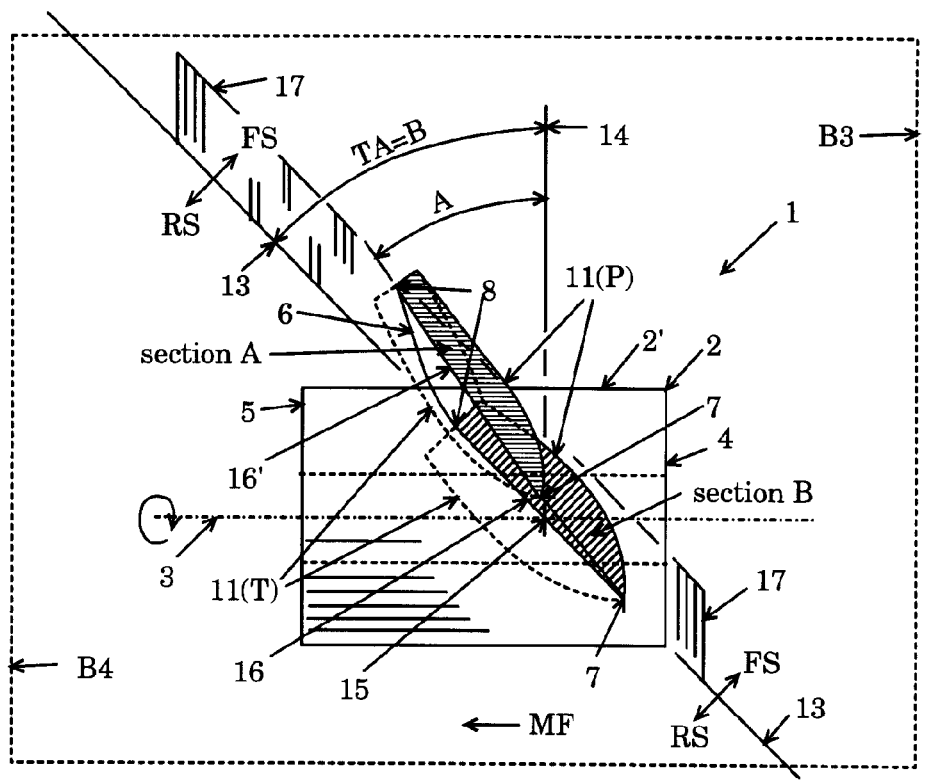
FIG. 37, FIG. 38, FIG. 39, FIG. 40, FIG. 41, FIG. 42, FIG. 43, and FIG. 44 shows the right rotation impeller in the specific deviation from the tilted plane configuration within the scope of the first embodiment.
Figure 38:
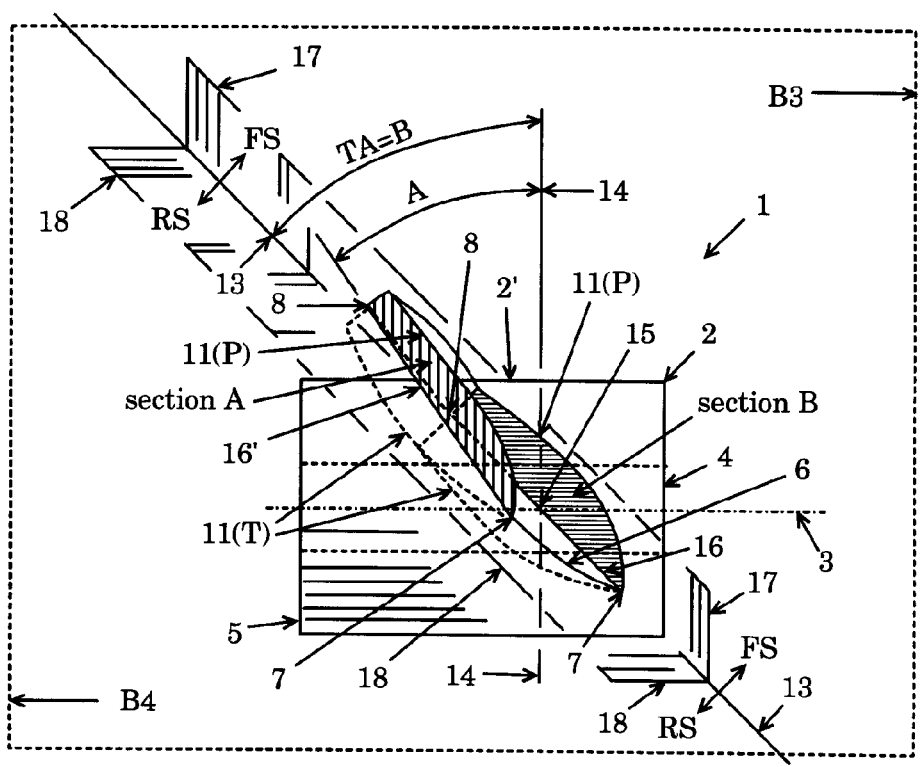
Figure 39:
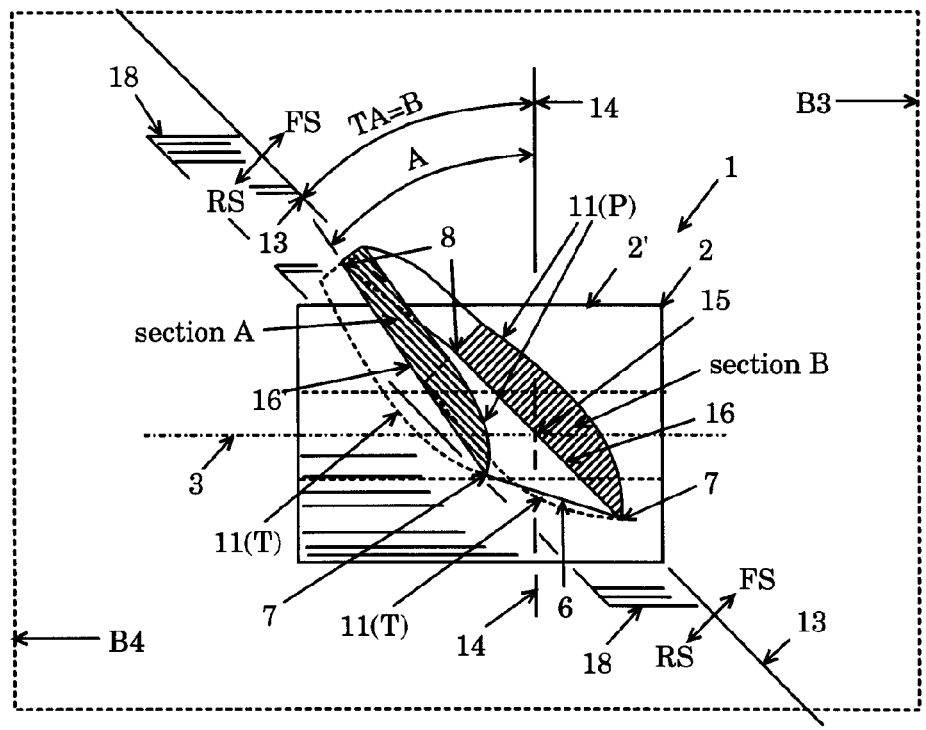

FIG. 37, FIG. 38, and FIG. 39 illustrates additional detailed illustrations of a right hand rotation present invention impeller 1 wherein the blade 6 line 16 of section B is on the tilted plane 13 with angle TA or angle B while the blade 6 line 16' angle A of section A of the same blade 6 has less angle than the blade 6 line 16 angle B of section B wherein the said blade 6 line 16' angle A of section A is between the tilted plane 13 angle TA and twenty-five percent less than the value of tilted plane 13 angle TA and wherein angle A and angle B are measured perpendicularly from the first vertical plane 14 as shown. In FIG. 37 the blade 6 line 16' of section A with angle A is adjacent to the tilted plane 13 and at the front section FS of the tilted plane 13 and the said blade 6 line 16' of section A is within the acute angle between the tilted plane 13 and the first boundary plane 17 of said tilted plane 13. In FIG. 38 the blade 6 line 16' of section A with angle A intersects the tilted plane 13 and partly at the front section FS and partly at the rear section RS of the tilted plane 13 and the said blade 6 line 16' of section A is within the acute angle between the first boundary plane 17 of said tilted plane 13 and the second boundary plane 18 of said tilted plane 13. In FIG. 39 the blade 6 line of section A with angle A is adjacent to the tilted plane 13 and at the rear section RS of the tilted plane 13 and the said blade 6 line 16' of section A is within the acute angle between the tilted plane 13 and the second boundary plane 18 of said tilted plane 13.

Figure 40:
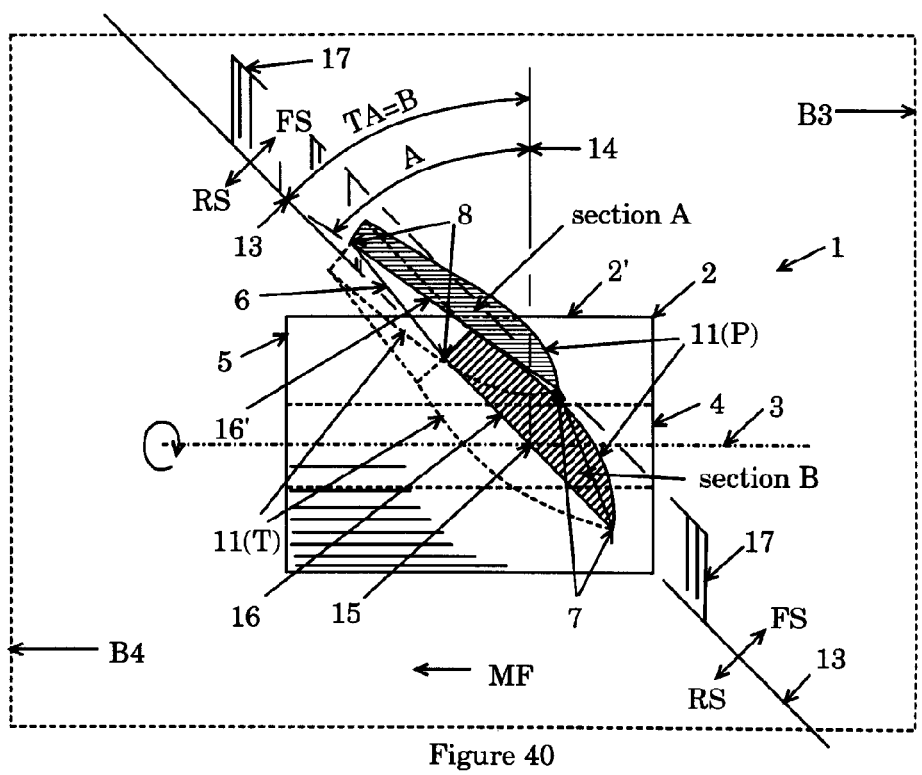
Figure 41:
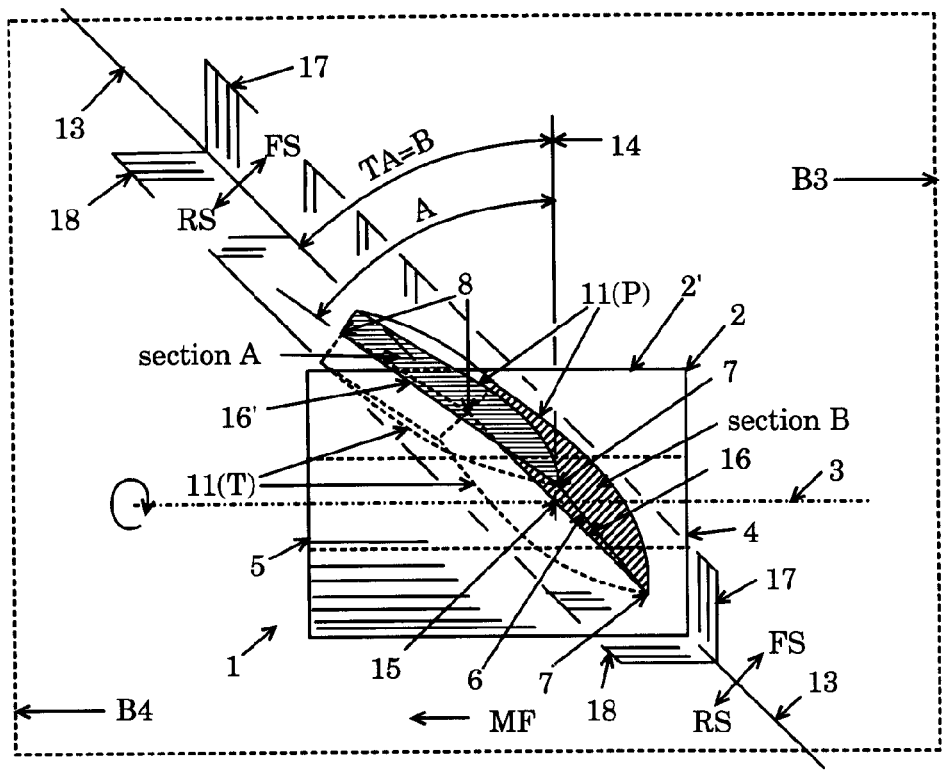
Figure 42:
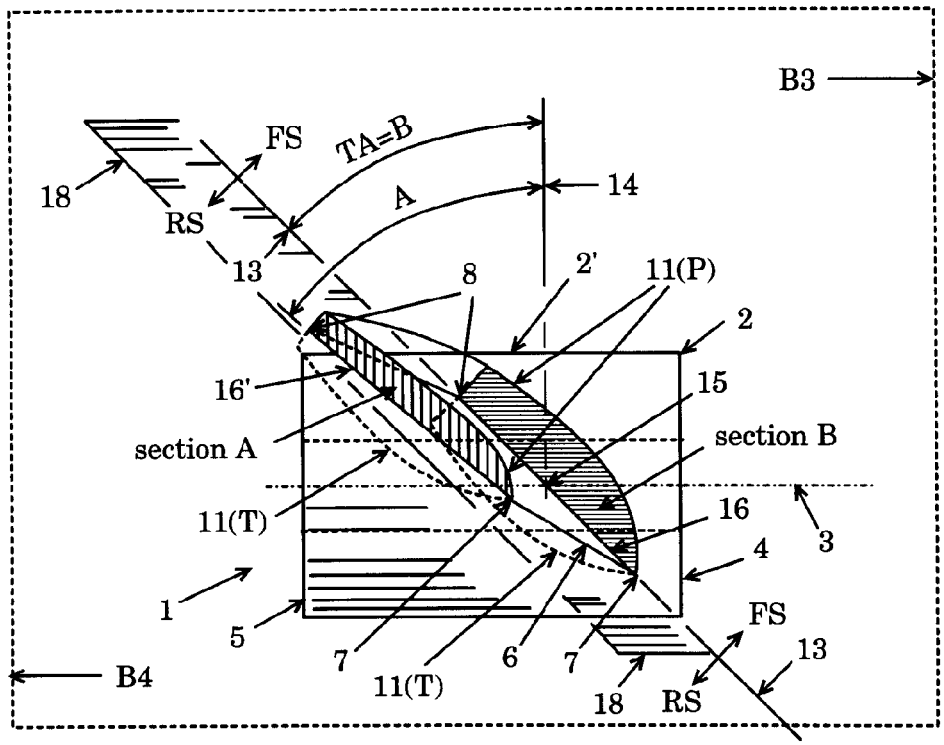

FIG. 40, FIG. 41, and FIG. 42 shows additional detailed illustrations of a right hand rotation present invention impeller 1 wherein the blade 6 line 16 of section B is on the tilted plane 13 with angle B or angle TA while the blade 6 line 16' angle A of section A of the same blade 6 is greater than the blade 6 line angle B of section B and the said blade 6 line 16' angle A of section A is between the tilted plane 13 with angle TA and twenty-five percent greater than the value of tilted plane 13 angle TA and wherein angle A and angle B are measured perpendicularly from the first vertical plane 14 as shown. In FIG. 40 the blade 6 line 16' of section A with angle A is adjacent to the tilted plane 13 and at the front section FS of the tilted plane 13 and the said blade 6 line 16' of section A is within the acute angle between the tilted plane 13 and the first boundary plane 17 of said tilted plane 13. In FIG. 41 the blade 6 line 16' of section A with angle A intersects the tilted plane 13 and the said blade 6 line 16' of section A is within the acute angle between the first boundary plane 17 of said tilted plane 13 and the second boundary plane 18 of said tilted plane and the said blade 6 line 16' of section A partly at the front section FS and partly on the rear section RS of the tilted plane 13. In FIG. 42 the blade 6 line 16' of section A with angle A is adjacent to the tilted plane 13 and at the rear section RS of the tilted plane 13 and the said blade 6 line 16' of section A is within the acute angle between the tilted plane 13 and the second boundary plane 18 of said tilted plane 13.

Figure 43:
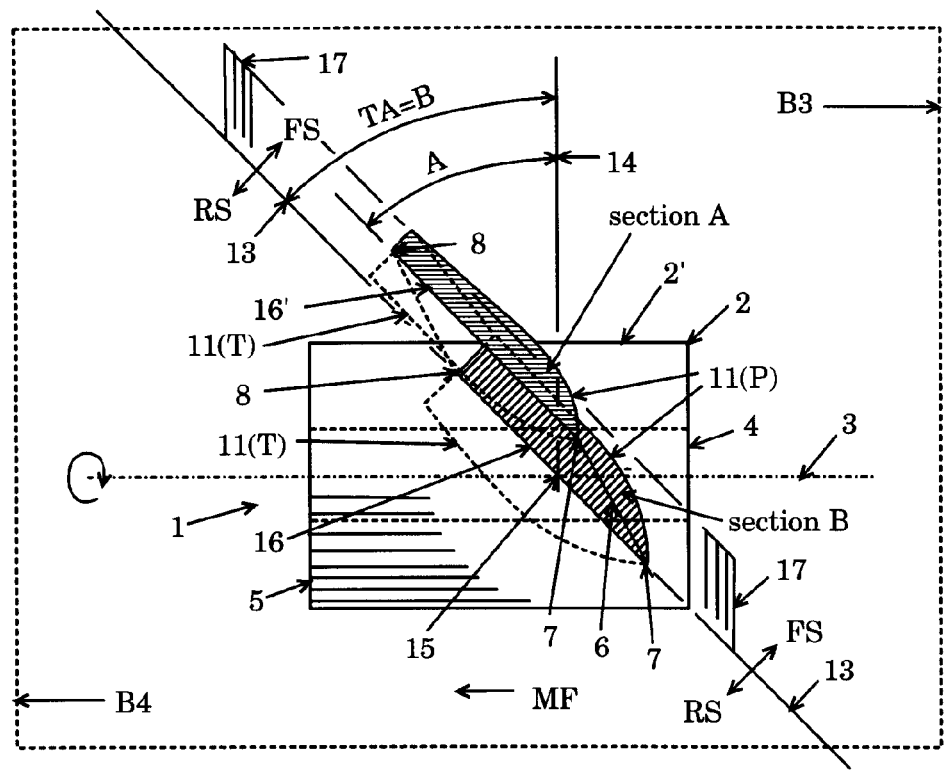
Figure 44:
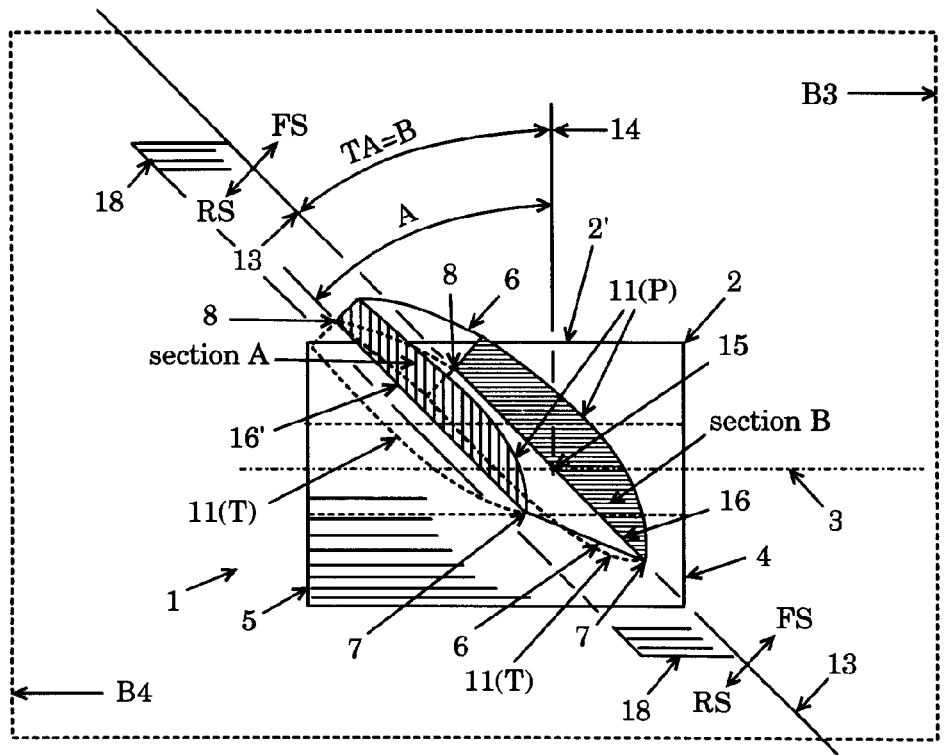

FIG. 43 and FIG. 44 shows additional detailed illustrations of a right hand rotation present invention impeller 1 with the blade 6 line 16 of section B with angle B is on the tilted plane 13 with angle TA or angle B while the blade 6 line 16' angle A of section A of the same blade 6 is off the tilted plane 13 but with an angle A which is equal to or the same as the tilted plane 13 angle TA or equal to the blade 6 line 16 angle B of section B and wherein angle A and angle B are measured perpendicularly from the first vertical plane 14 as shown. In FIG. 43 shows the blade 6 line 16' of section A with angle A is adjacent to the tilted plane 13 and at the front section FS of the tilted plane 13 and the said blade 6 line 16' of section A is within the acute angle between the titled plane 13 and the first boundary plane 17 of said tilted plane 13 or on the first boundary plane 17 of said tilted plane 13. In FIG. 44 the blade 6 line 16' of section A with angle A is adjacent to the tilted plane 13 and at the rear section RS of the tilted plane 13 and the said blade 6 line 16' of section A is within the acute angle between the tilted plane 13 and the second boundary plane 18 of said tilted plane 13 or on the second boundary plane 18 of said tilted plane 13.

FIG. 45, FIG. 46, FIG. 47, FIG. 48, FIG. 49, FIG. 50, FIG. 51, and FIG. 52 illustrates part of the present invention first embodiment showing a left hand rotation present invention impeller 1 wherein section A and section B is oriented in the specific deviation from the tilted plane configuration and shows angle TA of about forty-five degrees from the vertical plane 14 but the present invention includes angle TA of twenty degrees or seventy-eight degrees or between twenty degrees and seventy-eight degrees and wherein the first boundary plane 17 and the second boundary plane 18 shown in exaggerated angles to make clear illustrations and also shows the blade 6 line 16 angle B of section B is equal to angle TA of the tilted plane 13 while the blade 6 line 16' of section A of the same blade 6 is [a] with angle A of section A of equal angle to the blade 6 line 16 angle B of section B and off the tilted plane 13 and the said blade 6 line 16' of section A lies on the first boundary plane 17 of said tilted plane 13 or lies on the secondary plane 18 of said tilted plane 13 or lies within the acute angle between the first boundary plane 17 of said tilted plane 13 and the said tilted plane 13 or the blade 6 line 16' of section A lies within the acute angle between the tilted plane 13 and the second boundary plane 18 of said tilted plane 13 or [b] the blade 6 line 16' of section A with an angle A of between angle TA and twenty-five percent more or less the value of angle TA of the tilted plane 13 and lies within the acute angle between the first boundary plane 17 of the said tilted plane 13 and the second boundary plane 18 of the said tilted plane 13 and may intersect or may not intersect the said tilted plane 13 and the blade 6 line 16' of section A is likely to exceed ninety degrees which is in a less effective area of the present invention. In FIG. 45 to FIG. 52 the tilted plane 13 is shown as a line which indicates that the viewer is looking along the tilted plane 13. It has to be understood that section B is the section generated when arc B cut the section of the blade 6 adjacent to the hub 2 at twenty percent the blade 6 radial length LB. Radial length LB is the radial distance of the tip 9 or tip 9 midpoint from the longitudinal axis 3 of the said impeller less the radial distance of the hub 2 external side surface 2' wherein said hub 2 external side surface 2' radial distance is the distance of the hub 2 external side surface 2 adjacent to the root 10 of the blade 6 where there is no addendum (AD) or off the blending portion between the hub 2 and the blade 6. The angle TA of the tilted plane 13 which is given or predetermined could be determined or checked by measuring the blade 6 line 16 angle B of section B from the first vertical plane 14 and the blade 6 line 16' angle A of section A could be determined by measuring the blade 6 line 16' angle A of section A from the same first vertical plane 14 shown in some of the drawings as a sample illustration. Since the present invention impeller 1 is a left hand rotation impeller the tilted plane 13 is rotated clockwise CW to show the tilted plane 13 angle TA which is used as angle B of section B and used to calculate the blade 6 line 16' of section A (the blade 6 line 16' of section A and the blade 6 line 16 of section B maybe extended for angle measurement) wherein said blade 6 line 16 angle B of section B, blade 6 line 16' angle A of section A, and the tilted plane 13 angle TA are measured perpendicularly from the vertical plane 14 similarly shown. The present invention impeller 1 section A of the blade 6 as previously mentioned is cut by arc A wherein arc A is an arc of a circle which radius intersects the blade 6 adjacent to the tip 9 or tip 9 midpoint at eighty percent the blade 6 radial length LB while arc B is an arc of a circle which radius intersects the same blade 6 adjacent to the hub 2 at twenty percent the blade 6 radial length LB and wherein arc A and arc B center lie on the longitudinal axis of the hub 2 or arc A and arc B center lie on the longitudinal axis of the present invention impeller 1. In FIG. 45 to FIG. 52 (inclusive) Section A is cut by arc A similarly shown in FIG. 34 and seen on line IV-IV' while section B is cut by arc B similarly shown in FIG. 34 and seen on line V-V'.

Figure 45:
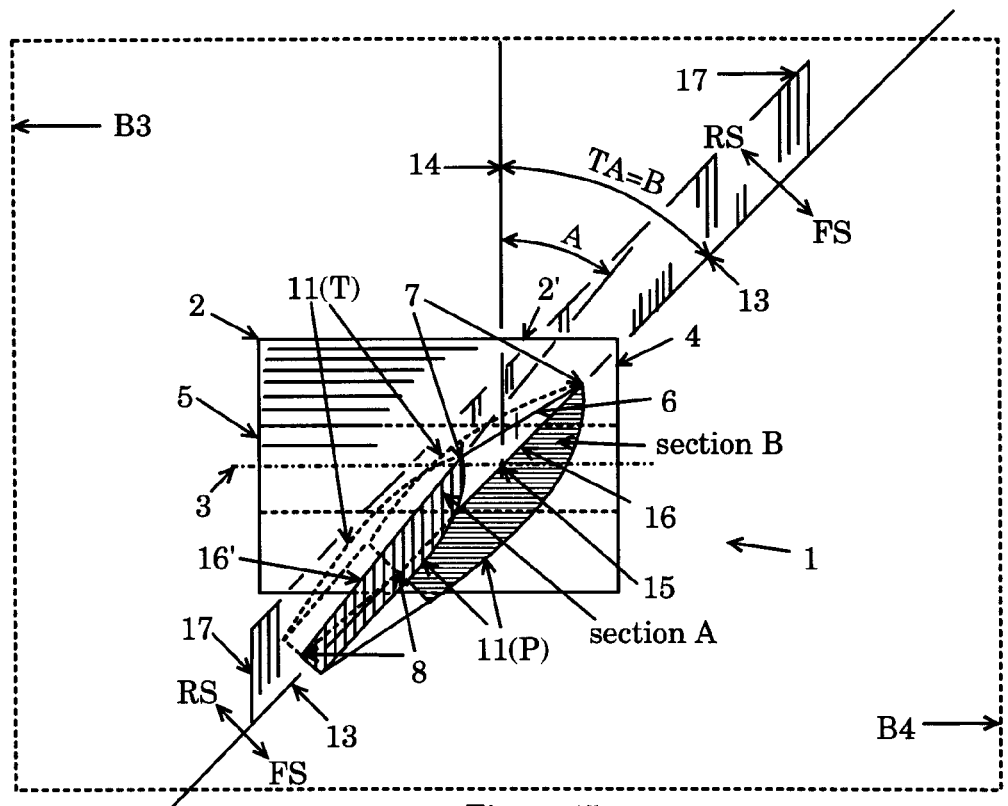
FIG. 45, FIG. 46, FIG. 47, FIG. 48, FIG. 49, FIG. 50, FIG. 51, and FIG. 52 shows the left hand rotation impeller in the specific deviation from the tilted plane configuration within the scope of the first embodiment.
Figure 46:
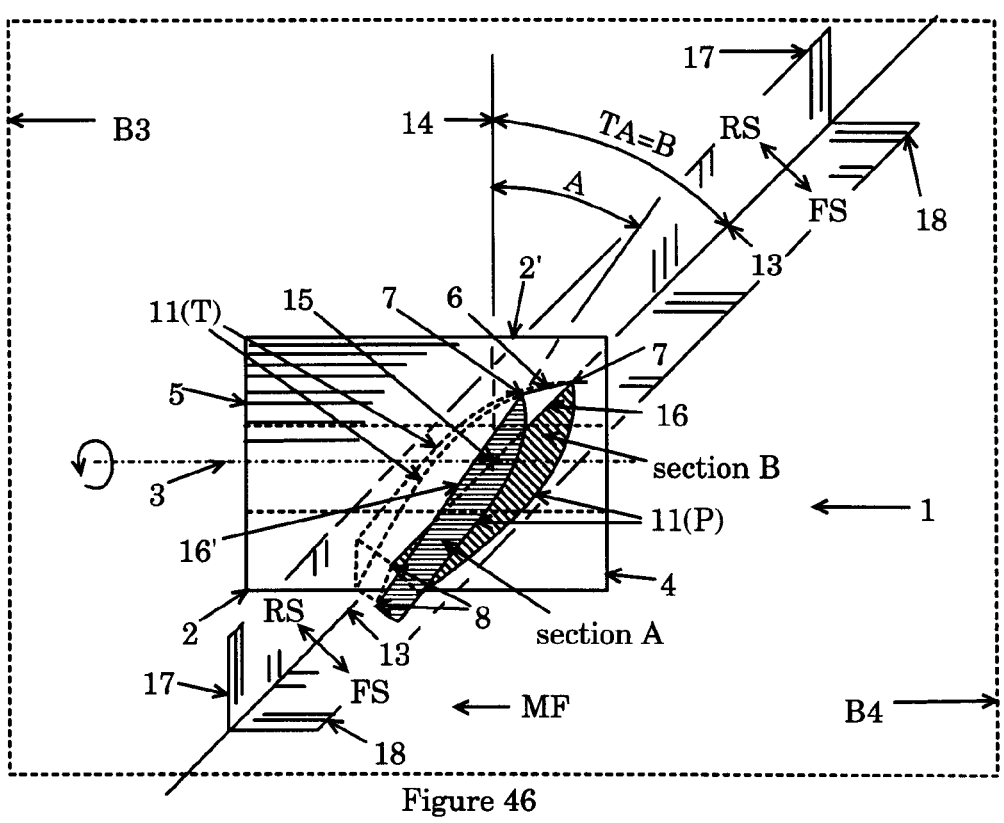
Figure 47:
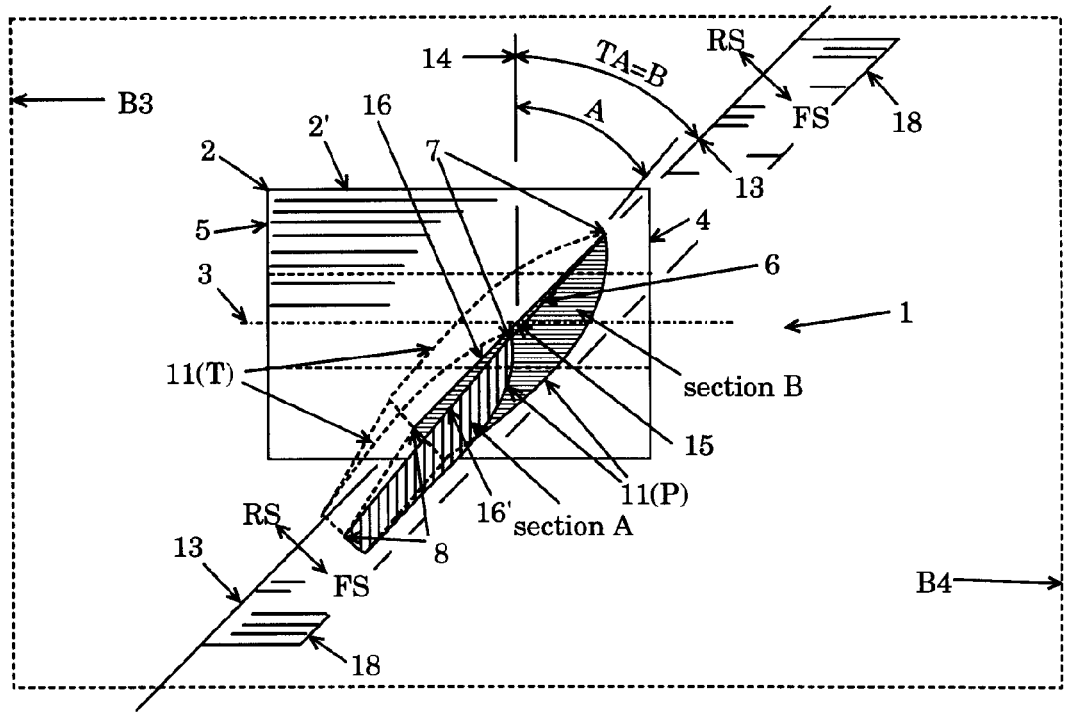

FIG. 45, FIG. 46, and FIG. 47 shows additional detailed illustrations of a left hand rotation impeller 1 wherein the left hand rotation present invention impeller 1 with blade 6 line 16 of section B on the tilted plane 13 with angle TA or angle B while the blade 6 line 16' of section A angle A is less than the blade 6 line 16 angle B of section B and the said blade 6 line 16' angle A of section A is between angle TA and twenty-five percent less the value of the tilted plane 13 angle TA and the said blade 6 line 16' of section A is within the acute angle between the first boundary plane 17 of said tilted plane 13 and the second boundary plane 18 of said tilted plane 13. FIG. 45 illustrates the blade 6 line 16' of section A with angle A is adjacent to the tilted plane 13 and at the rear section RS of the tilted plane 13 and the said blade 6 line 16' is within the acute angle between the tilted plane 13 and the first boundary plane 17 of said tilted plane 13. FIG. 46 illustrates the blade 6 line 16' of section A with angle A is partly on the front section FS and partly at the rear section RS of the tilted plane 13 and the said blade 6 line 16' of section A intersects the tilted plane 13 and the said blade 6 line 16' of section A lies within acute angle between the first boundary plane 17 of said tilted plane 13 and the second boundary plane 18 of said tilted plane 13. FIG. 47 illustrates the blade 6 line 16' of section A is at the front section FS of the tilted plane 13 and the said blade 6 line 16' of section A is within the acute angle between the tilted plane 13 and the second boundary plane 18 of said tilted plane 13.

Figure 48:
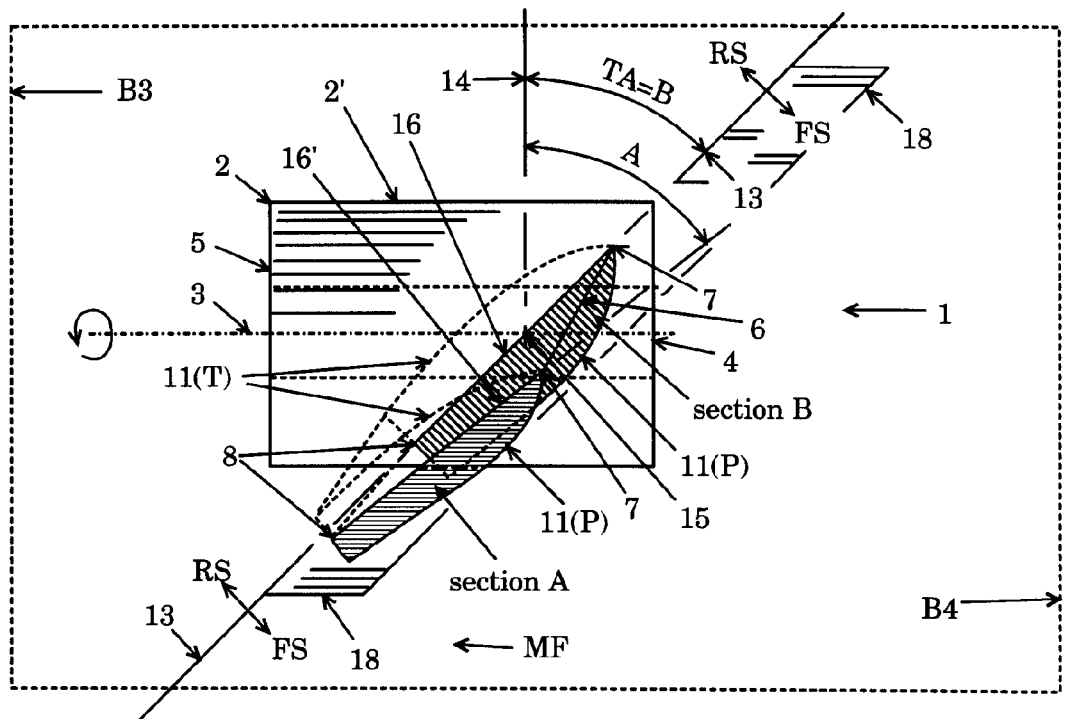
Figure 49:
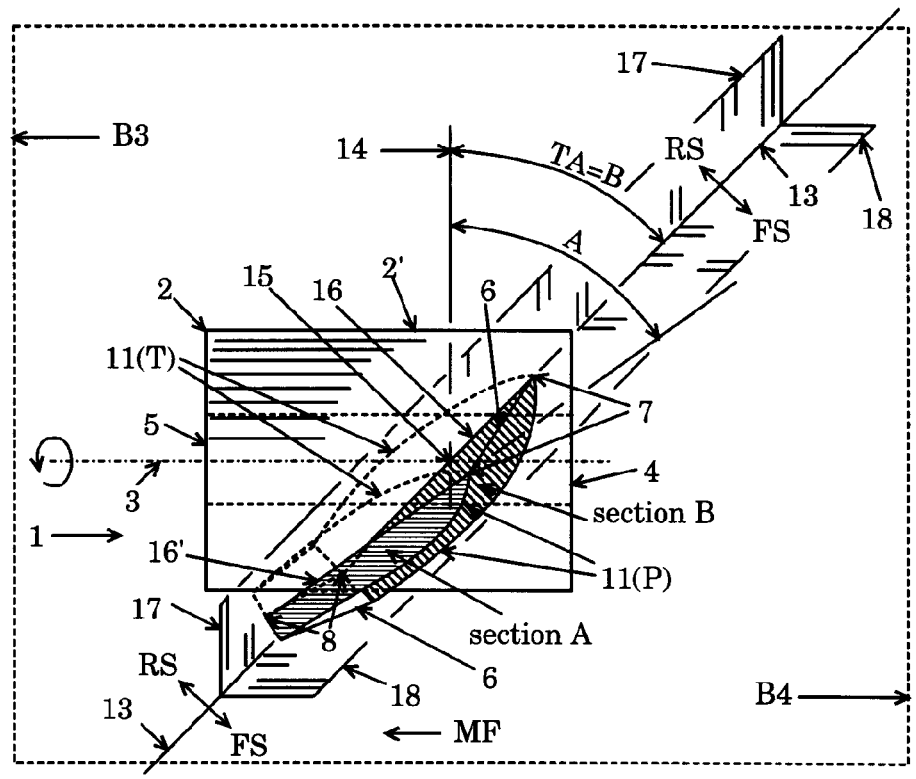
Figure 50:
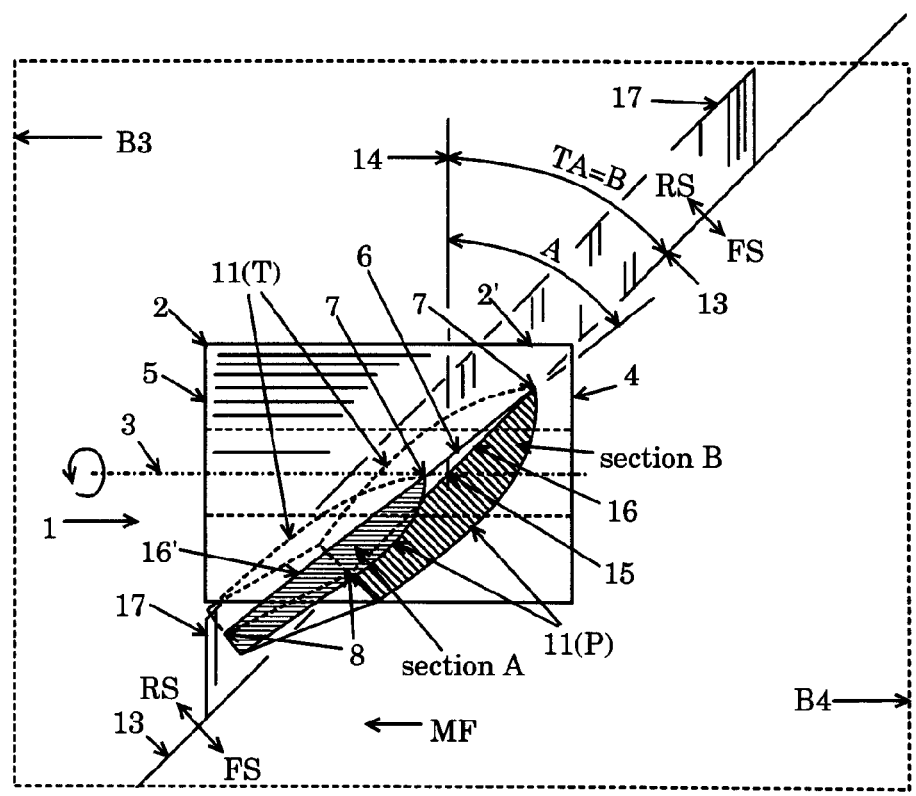

FIG. 48, FIG. 49, and FIG. 50 illustrates additional details of the left hand rotation present invention impeller 1 with blade 6 line 16 of section B on the tilted plane 13 with angle TA or angle B while the blade 6 line 16' section A with angle A is greater than the blade 6 line 16 angle B of section B and said angle A of section A is between angle TA and twenty-five percent greater than the value blade 6 line 16 angle B of section B. In FIG. 48 illustrates the blade 6 line 16' angle A of section A is at the front section FS of the tilted plane 13 and the said blade 6 line 16' of section A is within the acute angle between the tilted plane 13 and the second boundary plane 18 of said tilted plane 13. In FIG. 49 the blade 6 line 16' of section A with angle A intersects the tilted plane 13 and partly at the front section FS and partly at the rear section RS of the tilted plane 13 and the said blade 6 line of section A is within the acute angle between the first boundary plane 17 of said tilted plane 13 and the second boundary plane 18 of said tilted plane 13. FIG. 50 illustrates the blade 6 line 16' of section A with angle A is at the rear section RS of the tilted plane 13 and the said blade 6 line 16' of section A is within the acute angle between the tilted plane 13 and the first boundary plane 17 of said tilted plane 13.

Figure 51:
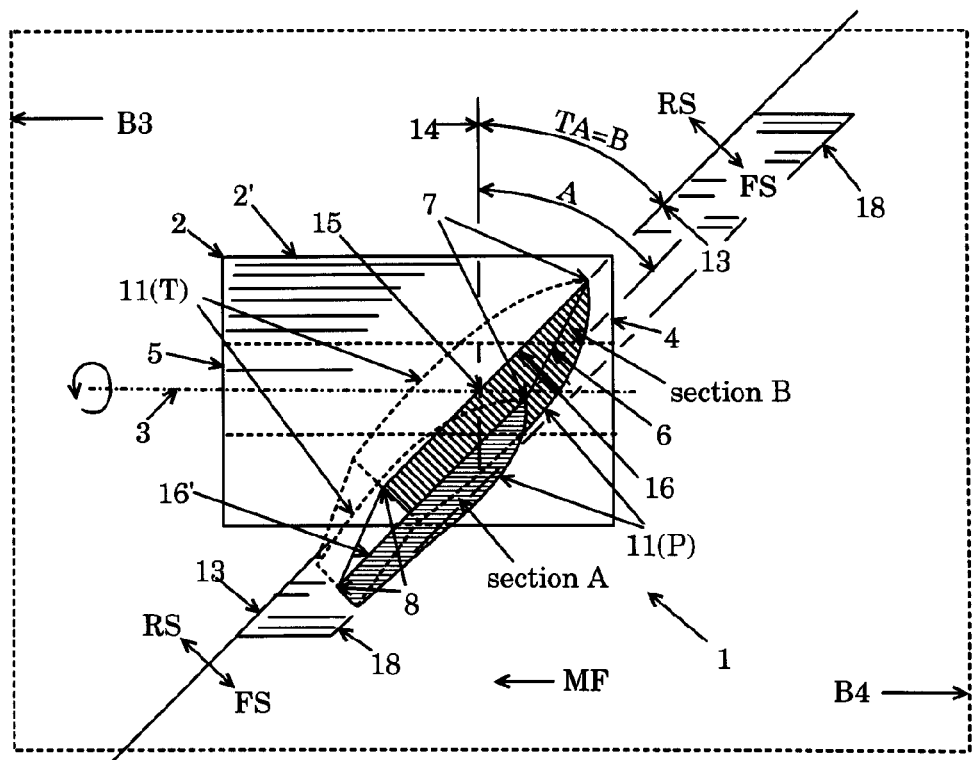
Figure 52:
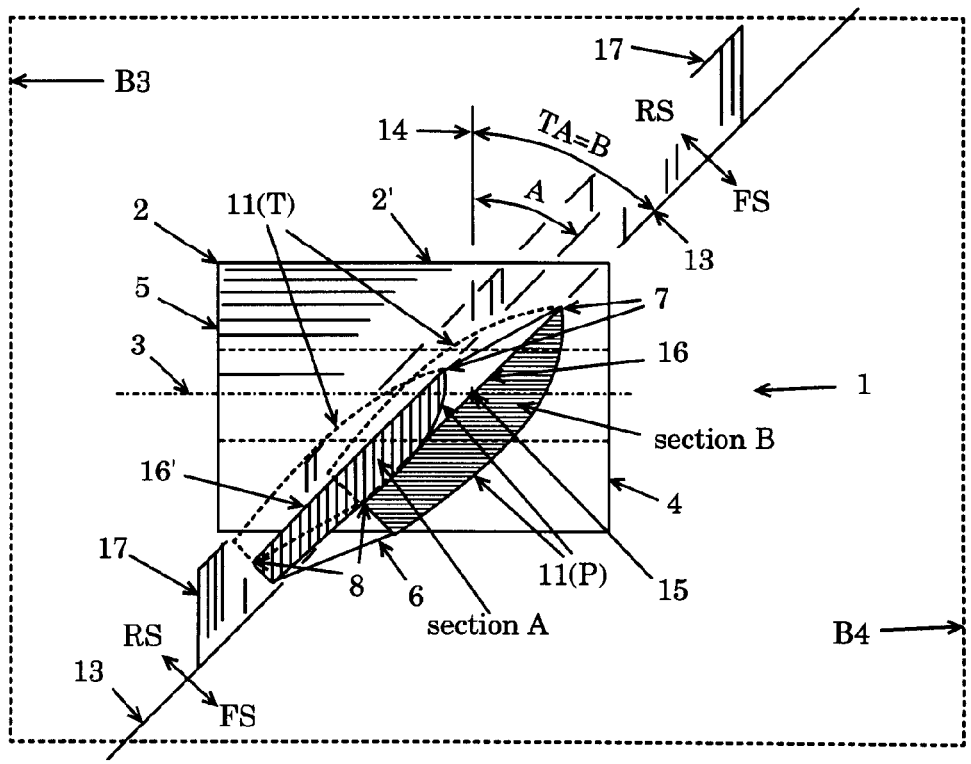

FIG. 51 and FIG. 52 illustrates additional details of the left hand rotation present invention impeller 1 wherein the blade 6 line 16' of section A with angle A is adjacent to and off the tilted plane 13 but with an angle A which is equal to the blade 6 line 16 angle B of section B where in angle A and angle B are measured from the first vertical plane 14. In FIG. 51 the blade 6 line 16' of section A with angle A is at the front section FS of the tilted plane 13 and the blade 6 line 16' line of section A with angle A is within the acute angle between the tilted plane 13 and the second boundary plane 18 of said tilted plane 13 or the said blade 6 line 16' of section A lies on the second boundary plane 18 of said tilted plane 13. In FIG. 52 the blade 6 line 16' of section A with angle A is at the rear section RS of the tilted plane 13 with angle A of equal to the tilted plane 13 angle TA and the blade 6 line 16' of section A is within the acute angle between the tilted plane 13 and the first boundary plane 17 of said tilted plane 13 or the said blade 6 line 16' of section A with angle A lies on the first boundary plane 17 of said tilted plane 13.

FIG. 53, FIG. 54, FIG. 55, FIG. 56, FIG. 57, FIG. 58, FIG. 59, and FIG. 60 shows the known or public domain shapes of section B of the impeller blade 6 on a hub 2 for watercrafts, weapon systems, air vehicles, compressors, mixing and agitation systems, drones, and pumps and (as shown the blade is for a right hand rotation impeller but same blade section can be adapted for left hand rotation impeller) showing the blade 6 line 16 of section B with angle TA which is about forty-five degrees but includes blade 6 line 16 of section B between twenty degrees and seventy-eight degrees or twenty degrees or seventy-eight degrees measured from the first vertical plane 14 wherein first greatest thickness GT or second greatest thickness GT' are measured on a plane perpendicular to the blade 6 line 16 of section B wherein the first greatest thickness GT is between a plane T and plane M or on plane M or plane T and wherein the second greatest thickness GT' is between plane M and plane L. Plane T is a plane which intersects the trailing edge 8 of section B and intersects the blade 6 line 16 of section B perpendicularly while plane M is a plane which intersects half of the length of blade 6 line 16 of section B and intersects the blade 6 line 16 of section B perpendicularly and plane L intersects the leading edge 7 of section B and intersects the blade 6 line 16 of section B perpendicularly and wherein the shape shown in FIG. 53 to FIG. 60 inclusive maybe adapted for section shapes of section B or section shapes of section A of the present invention impeller 1. The first greatest thickness GT is greatest thickness of the blade 6 measured between the high pressure face 12 and the first low pressure face 11 measured along a plane perpendicular to the blade 6 line 16 of section B wherein said first greatest thickness GT occur between plane T and plane M or on plane M or plane T and wherein second greatest thickness GT' is the greatest thickness between the high pressure face 12 and the second low pressure face 11' measured along a plane perpendicular to the blade 6 line 16 of section B and said second greatest thickness GT' is between plane M and plane L. The first greatest thickness GT of section B as shown with first low pressure face 11 or the second greatest thickness GT' of section B shown with second low pressure face 11' but the said second low pressure face 11' of section B with sharp trailing edge 8 maybe modified to section B with a blunt trailing edge 8. Arc B cut the blade 6 adjacent to the hub 2 at twenty percent the blade 6 radial length LB. Radial length LB as previously mentioned is the perpendicular distance of the tip 9 or perpendicular distance of the tip 9 midpoint from the longitudinal axis 3 of the present invention impeller 1 less the radial distance of the hub 2 external side surface 2' adjacent to the root 10 of the blade (6) but off the addendum. The addendum (AD) is the portion of impeller wherein the blade 6 and the hub 2 blends.

Figure 53:
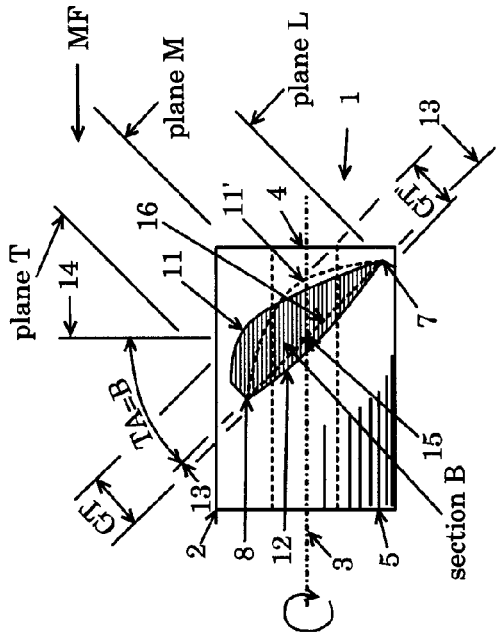
FIG. 53, FIG. 54, FIG. 55, FIG. 56, FIG. 57, FIG. 58, FIG. 59, and FIG. 60 shows prior art or public domain shapes of the blade section B for motor driven system.

FIG. 53 illustrates section B of a blade 6 on a hub 2 with known or with public domain shape for motor driven impeller system with [a] substantially straight high pressure face 12 wherein the first greatest thickness GT of section B is between plane T and plane M or on plane M or on plane T similarly shown with outwardly curved first low pressure face 11 or with [b] substantially straight high pressure face 12 wherein the second greatest thickness GT' of section B is between plane M and plane L similarly shown as section B with substantially straight high pressure face 12 and a sharp trailing edge 8 with outwardly curved second low pressure face 11' shown in broken line but section B with sharp trailing edge 8 of said section B with second low pressure face 11' may be modified to a section B with a blunt trailing edge 8 with outwardly curved second low pressure face 11' and second greatest thickness GT'.

Figure 54:
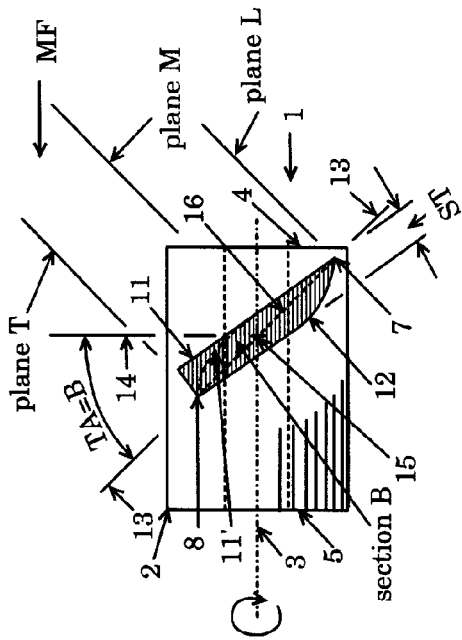

FIG. 54 illustrates section B of a blade 6 on a hub 2 with known and public domain shape for motor driven system with [a] an outwardly curved high pressure face 12 with the first greatest thickness GT of section B is between plane T and plane M or on plane M or on plane T similarly shown as section B with outwardly curved first low pressure face 11 or with [b] an outwardly curved high pressure face 12 and the second greatest thickness GT' of section B adjacent to the leading edge 7 shown as section B with outwardly curved high pressure face 12 and outwardly curved second low pressure face 11' indicated in broken line with sharp trailing edge 8 but said section B with second low pressure face 11' and sharp trailing edge 8 may be modified to section B with a blunt trailing edge 8 with outwardly curved second low pressure face 11' and second greatest thickness GT'.

Figure 55:
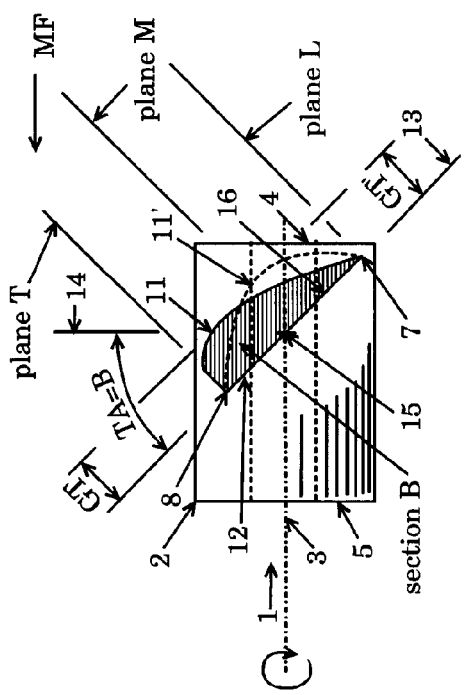

FIG. 55 illustrates section B of a blade 6 on a hub 2 with known or public domain shape for motor driven system with [a] an inwardly curved high pressure face 12 wherein the first greatest thickness GT of section B is between plane T and plane M or on plane M or on plane T similarly shown as section B with outwardly curved first low pressure face 11 or with [b] an outwardly curved high pressure face 12 wherein the second greatest thickness GT' of section B is between plane M and plane L shown as section B with inwardly curved high pressure face 12 and outwardly curved second low pressure face 11' shown in broken line with sharp trailing edge 8 but the said section B with second low pressure face 11' may be modified from section B with sharp trailing edge 8 to section B with blunt trailing edge 8 with outwardly curved second low pressure face 11' and second greatest thickness GT'. This includes first low pressure face 11 with high pressure face 12 which curves abruptly inward adjacent to the trailing edge 8 of the blade 6 or with second low pressure face 11' wherein the high pressure face 12 bends abruptly inward adjacent to the trailing edge 8 of the blade 6 with outwardly curved second low pressure face 11' and second greatest thickness GT' and wherein the said high pressure face 12 which bends abruptly inward consist of a curve and said curve may include an arc of a circle or part of an eclipse or part of a parabola which center or focus applied to a certain radial distance of the blade 6 and the same curve is applied to a different radial section with a different radial distance from the longitudinal axis of the hub 2 for the said blade 6 high pressure face 12 which bends abruptly inward adjacent to the trailing edge 8 wherein said curve must provide a smooth surfaces for the said high pressure face 12 to be efficient. When the high pressure face adjacent to the trailing edge lies on a straight line which intersects the longitudinal axis of the hub, the cup section center or focus on a radial section of the blade should lie on a common another straight line off and adjacent to the high pressure face which intersects the longitudinal axis of the hub for more efficiency of the said blade.

Figure 56:
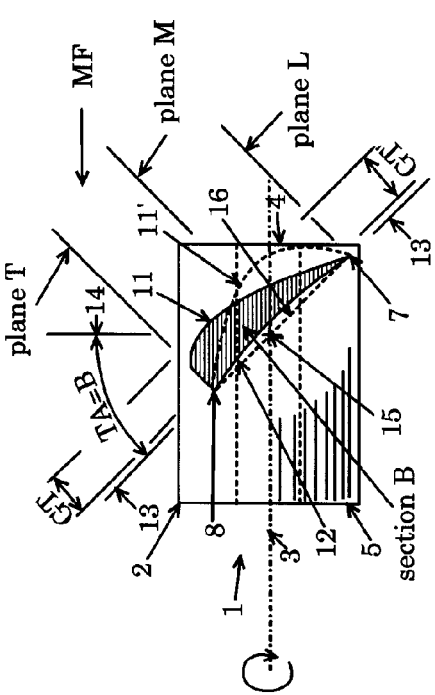

FIG. 56 illustrates section B of a blade 6 on a hub 2 with known or public domain shape for motor driven system with [a] a substantially straight high pressure face 12 with outwardly curved high pressure face 12 adjacent to the leading edge 7 wherein the first greatest thickness GT is between plane T and plane M or on plane M or on plane T similarly shown with substantially straight first low pressure face 11 or with [b] with substantially straight portion of high pressure face 12 adjacent to the trailing edge 8 and with outwardly curved section of high pressure face 12 adjacent to the leading edge 7 shown as section B with a curved second low pressure face 11' (shown partly in broken line) adjacent to the trailing edge 8 with substantial straight portion of low pressure face 11' adjacent to the leading edge 7 with similar thickness ST between plane M and plane L and a sharp trailing edge 8 but said section B with second low pressure face 11' maybe modified to section B with blunt trailing edge 8 with outwardly curved second low pressure face 11' and second greatest thickness GT'.

Figure 57:
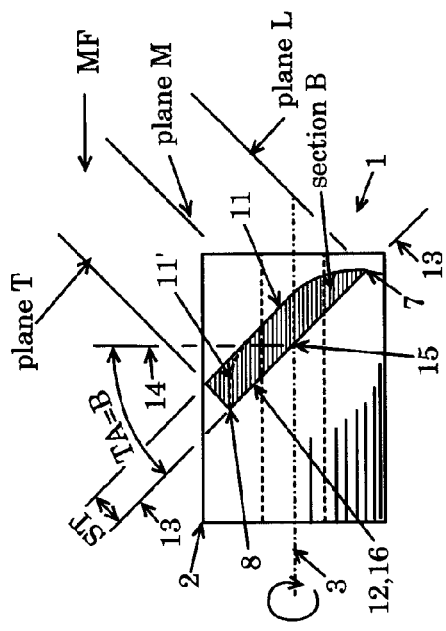

FIG. 57 illustrates section B of a blade 6 on a hub 2 with known or public domain shape for motor driven impeller systems with [a] substantial straight line high pressure face 12 which starts adjacent to the leading edge 7 with outwardly curved high pressure face 12 adjacent to the trailing edge 8, wherein the first greatest thickness GT of section B is between plane T and plane M or on plane M or on plane T similarly shown with outwardly curved first low pressure face 11 in solid line or with [b] with substantial straight line high pressure face 12 and second greatest thickness GT' of section B adjacent to the leading edge 7 as shown section B with outwardly curved second low pressure face 11' shown in broken line wherein the said section B with sharp trailing edge 8 shown with second low pressure face 11' maybe modified from a section B with sharp trailing edge 8 to section B with blunt trailing edge 8 with outwardly curved second low pressure face 11' and second greatest thickness GT'.

Figure 58:
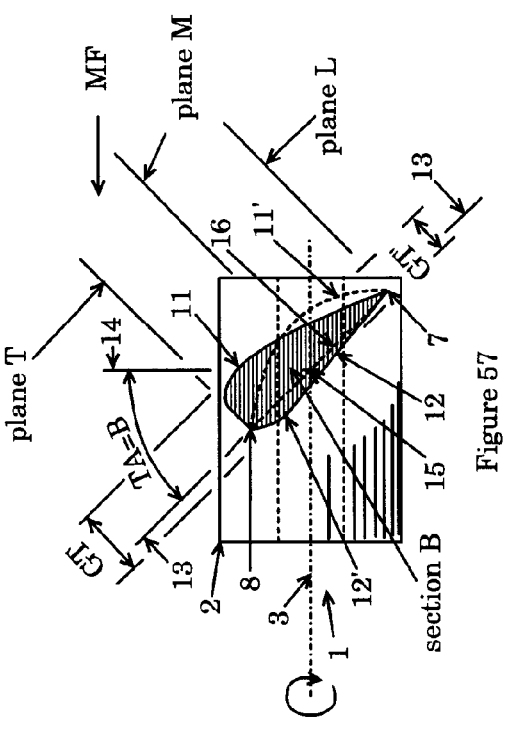

FIG. 58 illustrates section B of a blade 6 on a hub 2 with known or public domain shape for motor driven system with [a] a straight high pressure face 12 wherein the blade 6 section B with substantial similar thickness ST as shown with substantial straight section (low pressure face) and outwardly curved section (low pressure face) adjacent to the leading edge 7 as shown with first low pressure face 11 in solid line or with [b] a straight high pressure face with symmetrical shape of section B with respect to plane M indicated with similar thickness ST and straight high pressure face 12 as section B with second low pressure face 11' shown partly in broken line and partly in solid line but the sharp trailing edge 8 of the said section B with second low pressure face 11' may be modified to a section B with a curved section of second low pressure face 11' adjacent to the trailing edge 8 of said section B to have a non-symmetrical section B with blunt trailing edge 8 with partly outwardly curved second low pressure face 11' adjacent to the trailing edge 8 with similar thickness ST.

Figure 59:
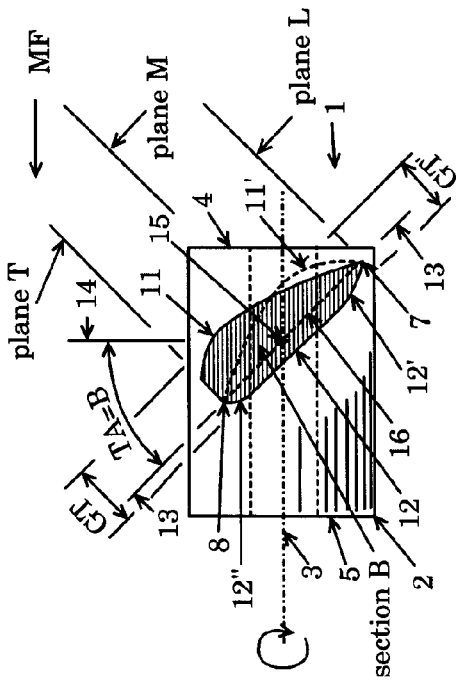

FIG. 59 shows section B of a blade 6 on a hub 2 with known or public domain shape for motor driven impeller systems with [a] an outwardly curved high pressure face 12 adjacent to the leading edge 7 and inwardly curved high pressure face 12 adjacent to the trailing edge 8 wherein the first greatest thickness GT of section B is between plane T and plane M or on plane M or on plane T as shown with outwardly curved first low pressure face 11 in solid line or with [b] an outwardly curved high pressure face 12 adjacent to the leading edge 7 and inwardly curved high pressure face 12 adjacent to the trailing edge 8 wherein the second greatest thickness GT' of section B between plane M and plane L as shown with outwardly curved high pressure face 12 adjacent to the leading edge 7 and inwardly curved high pressure face 12 adjacent to the trailing edge 8 with outwardly curved second low pressure face 11' shown in broken line wherein the sharp trailing edge 8 of the said second low pressure face 11' maybe modified to section B with a blunt trailing edge 8 with outwardly curved second low pressure face 11' and second greatest thickness GT'.

Figure 60:
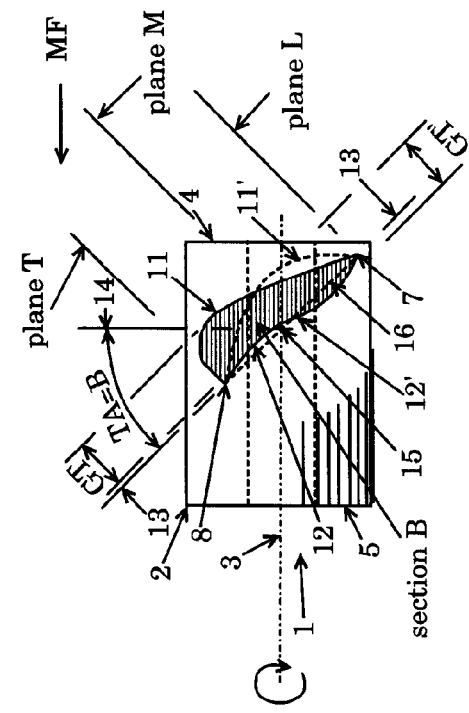

FIG. 60 shows section B of a blade 6 on a hub 2 with known or public domain shape for the motor driven impeller systems with [a] an outwardly curved high pressure face 12 adjacent to the leading edge 8, outwardly curved high pressure face 12 adjacent to the leading edge 7, and a straight line high pressure face 12 between the two curved high pressure face 12 with first greatest thickness GT is between plane T and plane M or on plane M or on plane T as shown with outwardly curved low pressure face 11 in solid line or with [b] an outwardly curved high pressure face 12 adjacent to the leading edge 7 and outwardly curved high pressure face 12 adjacent to the trailing edge 8 and a straight line high pressure face 12 between the two curved high pressure face 12 wherein the second greatest thickness GT' is between plane M and plane L as shown section B with outwardly curved second low pressure face 11' shown in broken line with sharp trailing edge 8 but the said section B with second low pressure face 11' maybe modified to section B with a blunt trailing edge 8 with outwardly curved second low pressure face 11' and second greatest thickness GT'.

FIG. 61, FIG. 62, FIG. 63, FIG. 64, FIG. 65, FIG. 66, FIG. 67, and FIG. 68 are known or public domain shapes of section B of the impeller blade 6 on a hub 2 for medium driven system or fluid driven system which includes the hydro-electric turbines or the wind turbines for generation of electricity (as shown the blade is for a right hand rotation impeller but same blade section can be adapted for left hand rotation impeller) showing the blade 6 line 16 of section B with angle TA which is about forty-five degrees but includes blade 6 line 16 of section B between twenty degrees and seventy-eight degrees or twenty degrees or seventy-eight degrees measured from the first vertical plane 14 wherein first greatest thickness GT or second greatest thickness GT' are measured on a plane perpendicular to the blade 6 line 16 of section B wherein the first greatest thickness GT is between a plane T and plane M or on plane M or on plane T and wherein the second greatest thickness GT' is between plane M and plane L. Plane T is a plane which intersects the trailing edge 8 of section B and intersect the blade 6 line 16 of section B perpendicularly while plane M is a plane which intersect half of the length of blade 6 line 16 of section B and intersects the blade 6 line 16 of section B perpendicularly and plane L intersects the leading edge 7 of section B and intersects the blade 6 line 16 of section B perpendicularly and wherein the shape shown in FIG. 53 to FIG. 60 inclusive maybe adapted for section shapes of section B or section shapes of section A of the present invention impeller 1. The first greatest thickness GT is greatest thickness of the blade 6 measured between the high pressure face 12 and the first low pressure face 11 measured along a plane perpendicular to the blade 6 line 16 of section B wherein said first greatest thickness GT occur between plane T and plane M or on plane M or plane T and wherein second greatest thickness GT' is the greatest thickness between the high pressure face 12 and the second low pressure face 11' measured along a plane perpendicular to the blade 6 line 16 of section B and said second greatest thickness GT' is between plane M and plane L. The first greatest thickness GT of section B as shown with first low pressure face 11 or the second greatest thickness GT' of section B shown with second low pressure face 11' and the blade 6 second low pressure face 11' shown a section with sharp trailing edge 8 but said second low pressure face 11' maybe modified to section B with a blunt trailing edge 8. Arc B cut the blade 6 adjacent to the hub 2 at twenty percent the blade 6 radial length LB. Radial length LB as previously mentioned is the perpendicular distance of the tip 9 or the perpendicular distance of the tip 9 midpoint from the longitudinal axis 3 of the present invention impeller 1 less the radial distance of the hub 2 external side surface 2' adjacent to the root 10 or base of the blade 6 but off the addendum. The addendum is the portion of impeller wherein the blade 6 and the hub 2 blends.

Figure 61:
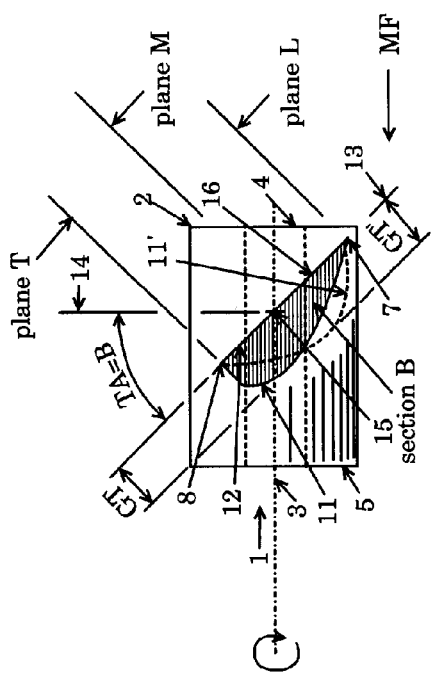
FIG. 61, FIG. 62, FIG. 63, FIG. 64, FIG. 65, FIG. 66, FIG. 67 and FIG. 68 shows prior art or public domain shapes of the blade section B for the medium driven system.

FIG. 61 illustrates section B of a blade 6 on a hub 2 with known or public domain shape for the medium driven impeller system with [a] a straight high pressure face 12 wherein the first greatest thickness GT of section B is between plane T and plane M or on plane M or on plane T shown with outwardly curved first low pressure face 11 or with [b] a straight high pressure face 12 wherein the second greatest thickness GT' of section B is between plane M and plane L wherein section B with straight high pressure face 12 and outwardly curved second low pressure face 11' shown in broken line but the trailing edge 8 of the said section B with second low pressure face 11' may be modified from section B with sharp trailing edge 8 to section B with blunt trailing edge 8 with outwardly curved second low pressure face 11' and second greatest thickness GT'.

Figure 62:
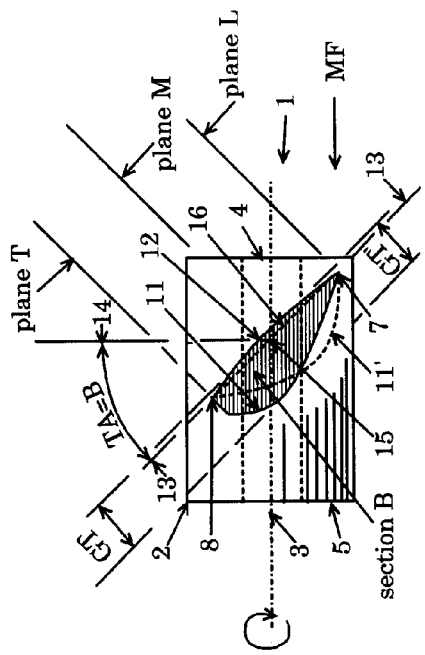

FIG. 62 illustrates section B of a blade 6 on a hub 2 with known or public domain shape for a medium driven impeller system with [a] an outwardly curved high pressure face 12 wherein the first the first greatest thickness GT of section B lies between plane T and plane M or on plane M or on plane T as shown with outwardly curved first low pressure face 11 or with [b] an outwardly curved high pressure face 12 wherein the second greatest thickness GT' of section B is between plane M and plane L with outwardly curved high pressure face as shown with outwardly curved second low pressure face 11' shown in broken line but the said section B with second low pressure face 11' with sharp trailing edge 8 may be modified to section B with blunt trailing edge 8 with outwardly curved second low pressure face 11' and second greatest thickness GT'.

Figure 63:
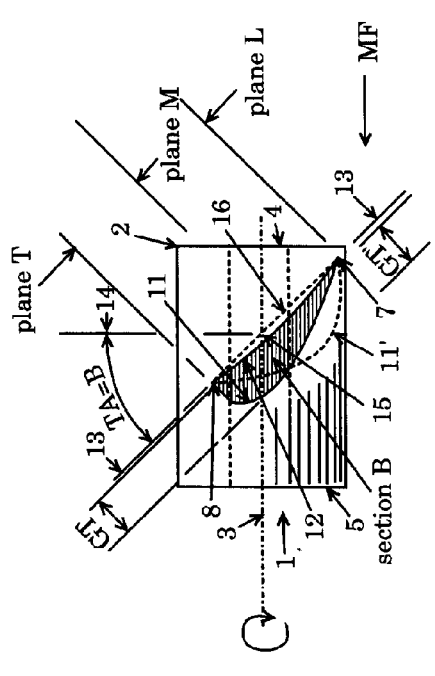

FIG. 63 illustrates section B of a blade 6 on a hub 2 with known or public domain shape for a medium driven impeller system with [a] an inwardly curved high pressure face 12 wherein the first greatest thickness GT of section B is between plane T and plane M or on plane M or on plane T as shown with the outwardly curved first low pressure face 11 in solid line or with [b] an inwardly curved high pressure face 12 wherein the second greatest thickness GT' of section B is between plane M and plane L as shown with section B with an inwardly curved high pressure face 12 with outwardly curved second low pressure face 11' shown in broken line with sharp trailing edge 8 but the said second low pressure face 11' may be modified from a section B with sharp trailing edge 8 to a section B with blunt trailing edge 8 with outwardly curved second low pressure face 11' and second greatest thickness GT'. This includes section B wherein the high pressure face 12 bends inward abruptly adjacent to the trailing edge 8 with outwardly curved first low pressure face 11 or section B wherein the high pressure face 12 curves inward abruptly adjacent to the trailing edge 8 with outwardly curved second low pressure face 11' and wherein the said high pressure face 12 which bends abruptly inward consist of a curve and said curve may include an arc of a circle or part of an eclipse or part of a parabola which center or focus applied to a certain radial distance of the blade 6 and the same curve is applied to a different radial section with a different radial distance from the longitudinal axis of the hub 2 for the said blade 6 high pressure face 12 which bends abruptly inward adjacent to the trailing edge 8 wherein said curve must provide a smooth surfaces for the said high pressure face 12 to be efficient. When the high pressure face adjacent to the trailing edge lies on a straight line which intersects the longitudinal axis of the hub, the cup section center or focus on a radial section of the blade should lie on a common another straight line off and adjacent to the high pressure face which intersects the longitudinal axis of the hub for more efficiency of the said blade.

Figure 64:
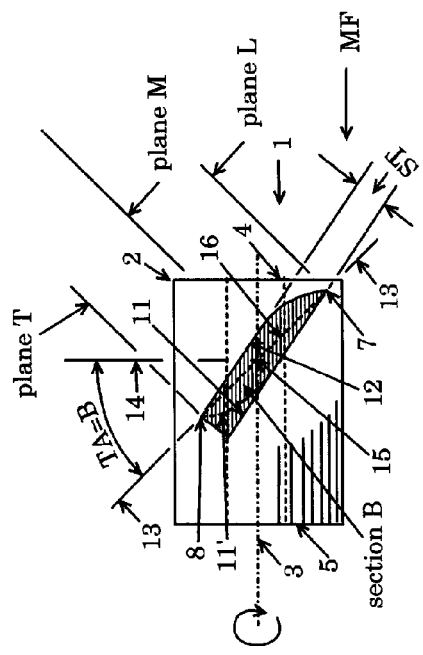

FIG. 64 illustrates section B of a blade 6 on a hub 2 with known or public domain shape for medium driven systems with [a] a substantial straight high pressure face 12 with outwardly curved high pressure face 12 adjacent to the leading edge 7 wherein the similar thickness ST of section B is substantial as shown with straight first low pressure face 11 in solid line or with [b] a substantial straight high pressure face 12 with outwardly curved high pressure face adjacent to the leading edge 7 wherein similar thickness ST with less length as shown with straight section of high pressure face 12 and outwardly curved section of high pressure face 12 adjacent to the leading edge 7 and straight low pressure face 11' adjacent to the leading edge 7 (in solid line) and inwardly curved section of second low pressure face 11' adjacent to the trailing edge 8 shown partly in broken line wherein the trailing edge 8 of the said section B with second low pressure face 11' may be modified from a section B with sharp trailing edge 8 to section B with blunt trailing edge 9 with partly outwardly curved portion of low pressure face 11' adjacent to the trailing edge 8 and the outwardly curve high pressure face 12 adjacent to the leading edge 7 and straight line of high pressure face 12 adjacent to the leading edge 7 with similar thickness ST of less length.

Figure 65:
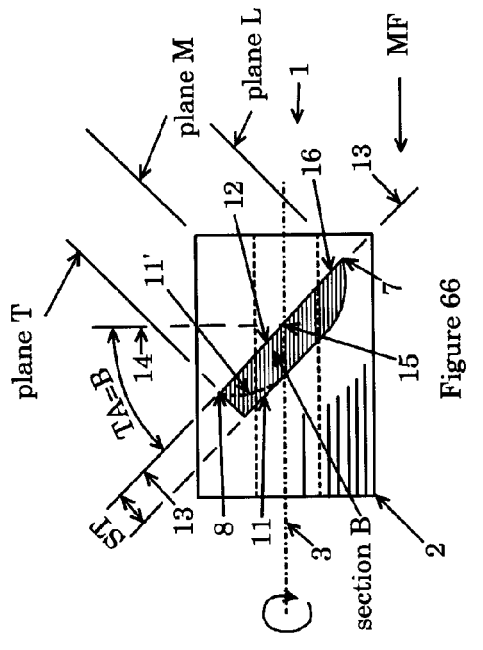

FIG. 65 illustrates section B of a blade 6 on the hub 2 with known or public domain shape for medium driven systems with [a] a substantial straight line high pressure face 12 with outwardly curved high pressure face 12 adjacent to the trailing edge 8 wherein the greatest thickness GT of section B is between plane T and plane M or on plane M or on plane T similarly shown with outwardly curved first low pressure face 11 in solid line or with [b] a substantial straight line high pressure face 12 with outwardly curved high pressure face adjacent to the trailing edge 8 wherein the second greatest thickness GT' of section B is between plane M and plane L similarly shown a section B with outwardly curved second low pressure face 11' shown in broken line with a substantial straight line high pressure face 12 and outwardly curved high pressure face 12 adjacent to the trailing edge 8 and sharp trailing edge 8 but section B with sharp trailing edge 8 as shown with second low pressure face 11' may be modified to section B with blunt trailing edge 8 with outwardly curved second low pressure face 11' and second greatest thickness GT' and substantial straight high pressure face 12 which starts at the leading edge 7 and an outwardly curved high pressure face 12 adjacent to the trailing edge 8.

Figure 66:
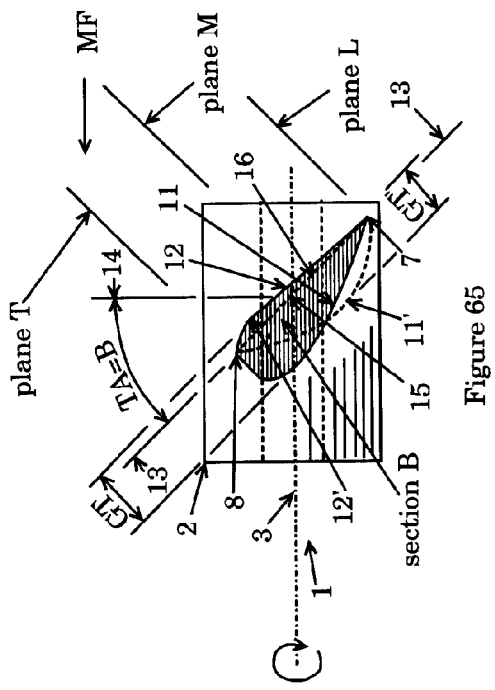

FIG. 66 illustrates section B of a blade 6 on a hub 2 with known or public domain shape for medium driven systems with [a] a straight high pressure face 12 and wherein the similar thickness ST of section B is substantial as shown section B with outwardly curved portion of low pressure face 11 adjacent to the leading edge 7 and substantial straight portion shown with first low pressure face 11 in solid line and partly solid line or with [b] a straight high pressure face with less similar thickness ST and outwardly curved portion of low pressure face adjacent to the leading edge 7 in solid line and a straight portion of low pressure face 11' in solid line between the two curved portion low pressure face 11' shown with outwardly curved second low pressure face 11' adjacent to the trailing edge shown partly in broken line with sharp trailing edge 8 wherein section B with sharp trailing edge 8 maybe modified to section B with blunt trailing edge 8 with outwardly curved in part second low pressure face 11' adjacent to the trailing edge 8, outwardly curved low pressure face 11' in part adjacent to the leading edge 7 with similar thickness ST, and straight high pressure face 12.

Figure 67:
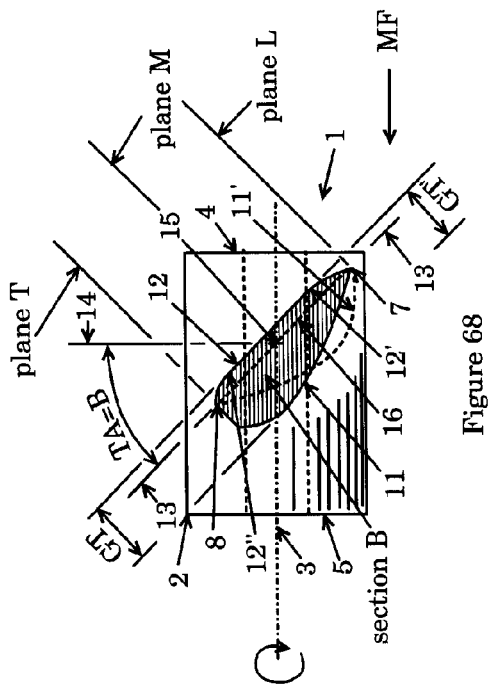

FIG. 67 illustrates a blade 6 of section B on a hub 2 with known or public domain shape for medium driven systems with [a] an outwardly curved high pressure face 12 adjacent to the leading edge 7 and inwardly curved high pressure face 12 adjacent to the trailing edge 8 wherein the first greatest thickness GT is between plane T and plane M or on plane M or on plane T similarly shown as section B with outwardly curved first low pressure face 11 in solid line or with [b] an outwardly curved high pressure face 12 adjacent to the leading edge 7 and inwardly curved high pressure face 12 adjacent to the trailing edge 8 wherein the second greatest thickness GT' between plane M and plane L similarly shown as section B with outwardly curved high pressure face 12 adjacent to the leading edge 7 and inwardly curved portion high pressure face adjacent to the trailing edge with second low pressure face 11' shown in broken line wherein the said section B with second low pressure face 11' with sharp trailing edge 8 may be modified to section B with blunt trailing edge 8 with outwardly curved second low pressure face 11' and second greatest thickness GT' and inwardly curved high pressure face 12 adjacent to the trailing edge 8 with outwardly curved high pressure face 12 adjacent to the leading edge 7.

Figure 68:
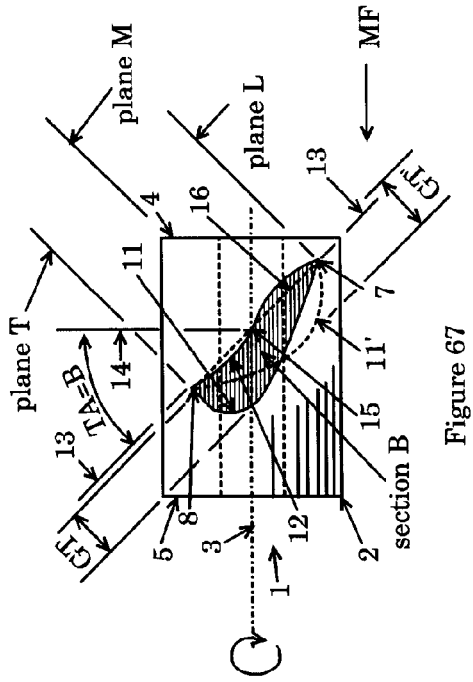

FIG. 68 illustrates a blade 6 of section B on a hub 2 with known or public domain shape for medium driven system with [a] an outwardly curved high pressure face 12 adjacent to the trailing edge 8 and outwardly curved high pressure face 12 adjacent to the leading edge 7 with straight line between the two curved lines of high pressure face 12 wherein the first greatest thickness GT of section B is between plane T and plane M or on plane M or on plane T as shown with the outwardly curved first low pressure face 11 in solid line or with [b] an outwardly curved high pressure face 12 adjacent to the trailing edge 8 and outwardly curved high pressure face adjacent to the leading edge 7 with straight line high pressure face 12 between the two curved high pressure face 12 wherein the second greatest thickness GT' of section B is between plane M and plane L with outwardly curved high pressure face 12 adjacent to the trailing edge 8 and outwardly curved high pressure face 12 adjacent to the leading edge 7 with straight line high pressure face 12 between the two curved high pressure face 12 as shown section B with the outwardly curved second low pressure face 11' shown in broken line wherein the said section B with second low pressure face 11' with sharp trailing edge 8 may be modified to section B with blunt trailing edge 8 with outwardly curved second low pressure face 11' and second greatest thickness GT' and outwardly curved high pressure face 12 adjacent to the leading edge 7 and outwardly curved high pressure face 12 adjacent to the trailing edge 8 with straight high pressure face 12 between the curved high pressure face 12.

FIG. 69, FIG. 69A, FIG. 70, FIG. 70A, FIG. 71, FIG. 71A, FIG. 72, FIG. 72A, FIG. 73, FIG. 73A, FIG. 74, FIG. 74A, FIG. 75, FIG. 75A FIG. 76, FIG. 76A, FIG. 77, and FIG. 77A illustrates the preceding set 19 and the next set 20 on the present invention impeller 1 with multi-set configuration, which blades are oriented in accordance to the present invention wherein the angle TA of at least one blade of the preceding set 19 compared to the angle TA of a blade of the next set 20 is the same or between the same angle and forty degrees difference wherein angle B of the blade 6 line 16 of section B or the tilted plane 13 angle TA of a blade 6 is measured perpendicularly from the first vertical plane 14 as shown and wherein at least one blade 6 of the preceding set 19 may have the same angle of location line P or different angle of location line P compared to at least one blade 6 of the next set 20 as seen from the second end 5 of the hub 2 of the said impeller. The area of one blade 6 in a set compared to the area of another set is either substantially the same or with an area difference of between one percent and fifty percent. The blade 6 of the preceding set 19 or the next set 20 are suggested to be spaced equally around the hub 2 and along the same plane of rotation of the impeller. The preceding set 19 maybe on the first set 19 or the second set 20 or on or adjacent to the first end 4 or the next set 29 maybe on or adjacent to the second end 5 of the hub 2 when the medium flow MF as shown. The blade 6 or blades shown are oriented in tilted plane configuration but the present invention includes blade 6 or blades oriented in the specific deviation from the tilted plane configuration wherein the blade 6 line of section B on the tilted plane 13 while the blade 6 line 16' of section A is off and adjacent to the tilted plane 13 with specific limits. The lines bounded by the low pressure face 11(T) and the high pressure face 12 are blades for turbines for electric generation while the lines bounded by the high pressure face 12 and the low pressure face 11(P) are blades for pumps, air vehicles, compressors, drones, mixing and agitation systems, watercrafts, weapon systems, and compressors. In the present invention, watercrafts includes manned or unmanned motorized vehicles which operates adjacent to the surface or under the surface of water or operates both under the surface or adjacent to the surface of water and includes submarines, amphibious vehicles, deep submergence vehicles, and watercrafts with water jet system. The blades as shown are in non-intrusive configuration but the blade maybe in the intrusive type of blade configuration similar to the blade orientation shown in FIG. 80. The present invention impeller (1) when rotated on the longitudinal axis (3) without forward or backward motion, the blade (6) in a set which are not in the swing area of another set are non-intrusive blades while the intrusive blades are blades in a set which are on the swing area of a blade 6 of another set.

FIG. 69 and FIG. 69A shows the second embodiment of the present invention wherein the present invention impeller 1 is a multi-set configuration impeller wherein the blades are oriented in accordance to the present invention. FIG. 69 shows the side elevation view of the impeller wherein one blade 6 of the preceding set 19 and one blade 6 of the next set 20 are shown wherein the tilted plane 13 angle TA of at least one blade 6 of the preceding set 19 and the tilted plane 13 angle TA of the next set 20 is substantially the same and wherein the high pressure face 12 area of the said one blade 6 of said preceding set 19 and the high pressure face 12 area of the said one blade 6 of said next set 19 are substantially the same. FIG. 69A is the section view of the blade 6 on line IX-IX' of the impeller in FIG. 69 and also the section view on line X-X' of the impeller in FIG. 69. In FIG. 69A shows the blade 6(19, 20) in the preceding set 19 and in the next set 20 with the same high pressure face 12 area and with location line P(19, 20) angles from the second vertical plane 14' is substantially the same but the location line P (20) angle of the blade 6 in the next set 20 maybe modified to have greater or less angle than the location line P(19) angle of the blade 6 in the preceding set 19 from one reference plane along the longitudinal axis 3 of the impeller which maybe the second vertical plane 14'.

FIG. 70 and FIG. 70A shows the first modification of the second embodiment of the present invention wherein the present invention impeller 1 with multi-set configuration with blades oriented in accordance to the present invention. In FIG. 70 shows the side elevation view of the present invention impeller 1 with two set of blades but may have more set of blades on the hub 2 which includes the preceding set 19 and the next set 20 wherein at least one blade 6 of the preceding set 19 tilted plane 13 angle TA is greater than the tilted plane 13 angle TA of at least one blade 6 of the next set 20 and said tilted plane 13 angle TA is measured perpendicularly from the first vertical plane 14 as shown and said one blade 6 of the said next set 20 and the said one blade 6 of the said preceding set 19 have substantially the same high pressure face 12 area. FIG. 70A is the second end 5 view of the impeller shown in FIG. 70. FIG. 70A shows the blade 6 in the preceding set 19 and the blade 6 in the next set 20 have the same size. In FIG. 70A shows the location line P(19) angle of the blade 6 in the preceding set 19 is greater than the location line P(20) angle of the blade 6 in the next set 20 measured from the second vertical plane 14' but the location line P(20) of the blade 6 in the next set 20 maybe modified to have the same angle or greater angle than the location line P(19) angle of the blade 6 in the preceding set 19 from the second vertical plane 14'.

FIG. 71 and FIG. 71A shows the second modification of the second embodiment of the present invention showing the present invention impeller 1 with multi-set configuration. FIG. 71 shows the side elevation view of the present invention impeller 1 with two set of blades as shown which includes the preceding set 19 and the next set 20 wherein the tilted plane 13 angle TA of at least one blade 6 of the preceding set 19 has less tilted plane 13 angle TA than at least one blade 6 of the next set 20 and the said one blade 6 high pressure face area 12 of the said preceding set 19 and the said one blade 6 high pressure face 12 area of the said next set 20 are substantially the same. FIG. 71 is the side elevation view of the present invention impeller 1 and FIG. 71A is the second end 5 view of the impeller shown in FIG. 71 wherein in FIG. 71A shows the location line P (19, 20) angles of the blade 6 in the preceding set 19 and the blade 6 in the next set 20 are substantially the same, measured perpendicularly from the second vertical plane 14' as shown but the blade 6 in the preceding set 19 maybe modified to have greater or less angle than the location line P(20) of the blade 6 in the next set 20 from the second vertical plane 14'. FIG. 71A shows the blade 6 in the preceding set 19 and the blade 6 in the next set 20 have the same size although not so evident since the blade 6 or blades have different angles of tilted plane 13.

FIG. 72 and FIG. 72A illustrates the third embodiment of the present invention wherein the present invention impeller 1 with multi-set configuration with blades oriented in accordance to the present invention. FIG. 72 is the side elevation view of the present invention impeller 1 with two set of blade 6 on the hub 2 as shown namely, the preceding set 19 and the next set 29 wherein the tilted plane 13 angle TA of at least one blade 6 in the preceding set 19 is greater than the tilted plane 13 angle TA of at least one blade 6 in the next set 20 and wherein the high pressure face 12 area of the said one blade 6 in the said next set 20 is between one percent to fifty percent less the high pressure face 12 area of the said one blade 6 in the said preceding set 20. FIG. 72A is the second end 5 view of the present invention impeller 1 in FIG. 72. FIG. 72A shows the location line P(19, 20) of the blade 6 in the preceding set 19 and in the next set 20 from the second vertical plane 14' are the substantially the same but the location line P(19) angle of the blade 6 in the preceding set 19 maybe modified to have less or greater angle than the location line P(20) angle of the blade 6 in the next set 20 from the second vertical plane 14'. FIG. 72A shows the blade 6 in the preceding set 19 and the blade 6 in the next set 20 have the same size although not so evident since the blade 6 or blades have different angles of tilted plane 13.

FIG. 73 and FIG. 73A illustrates the first modification of the third embodiment of the present invention wherein the present invention impeller 1 is a multi-set configuration impeller with blades oriented in accordance to the present invention. FIG. 73 shows the present invention impeller 1 with the preceding set 19 and the next set 20 wherein at least one blade 6 tilted plane 13 angle TA of the preceding set 19 is with less tilted plane 13 angle TA of at least one blade 6 in the next set 20 and wherein the high pressure face area 12 of the said one blade 6 in the said preceding set 19 is between one percent and fifty percent less area than the high pressure face 12 area of the said one blade 6 in the said next set 20. FIG. 73 is the side elevation view of the present invention impeller. FIG. 73A is the second end 5 view of the present invention impeller 1 shown in FIG. 73. FIG. 73A shows the location line P(19, 20) angle of the blade 6 in the preceding set 19 and the angle of the location line P(19, 20) of the blade 6 in the next set 20 are the same but the said one blade 6 in the said preceding set 19 maybe modified to have greater or less angle of location line P(19) of the said one blade 6 in the said next set 20 from the second vertical plane 14'. FIG. 73A shows the blade 6 in the preceding set 19 is larger in size than the blade 6 size in the next set 20.

FIG. 74 and FIG. 74A illustrates the second modification of the third embodiment of the present invention wherein the present invention impeller 1 is a multi-set configuration impeller. FIG. 74 shows the side elevation view of the present invention impeller 1 with a blade 6 in each set wherein the preceding set 19 and the next set 20 with blades which are of non-intrusive to one another and wherein at least one blade 6 in the preceding set 19 angle TA has less tilted plane 13 angle TA than the tilted plane 13 angle TA at least one blade 6 in the next set 20 and wherein the said one blade 6 in the said preceding set 19 has a high pressure face 12 area which is larger than the high pressure face 12 of said one blade 6 in the said next set 20. Tilted plane 13 angle TA as previously mentioned are used to orient the blade 6 on the hub 2. FIG. 74A shows the second end 5 view of the present invention impeller 1 shown in FIG. 74. In FIG. 74A shows the location line P(20) angle of the blade 6 in the next set 20 is greater than the location line P(19) angle of the blade 6 in the preceding set 19 but the location line P(20) angle of the blade 6 in said next set 20 maybe modified to have the same angle as the location line P(20)angle in the next set 20 or modified to have less location line P(20) angle than the location line P(19) of the blade 6 in the preceding set 19. FIG. 74A shows the blade 6 in the preceding set 19 is larger in size than the blade 6 size in the next set 20.

FIG. 75 and FIG. 75A shows the fourth embodiment of the present invention wherein the present invention impeller 1 is a multi-set configuration impeller. FIG. 75 is the side elevation view of the present invention impeller 1 with two set of blades which are non-intrusive configuration with at least one blade 6 of the preceding set 19 has less high pressure 12 area than the high pressure face 12 area of at least one blade 6 in the next set 20 and wherein the tilted plane 13 angle TA of a blade 6 in the preceding set 19 is substantially the same as the tilted plane 13 angle TA of at least one blade 6 in the next set 20. FIG. 75A is the second end 5 view of the impeller shown in FIG. 75. In FIG. 75A shows the angle of location line P(19) of the blade 6 in the preceding set 19 is greater than the location line P(20) angle of the blade 6 in the next set 20 but the location line P(19) angle of the blade 6 in the preceding set 19 maybe modified to a less angle or the same angle as the location line P(20) of the blade 6 in the next set 20. FIG. 75A shows the blade 6 in the preceding set 19 is smaller in size than the blade 6 size in the next set 20.

FIG. 76 and FIG. 76A shows the first modification of the fourth embodiment of the present invention wherein the present invention impeller 1 is a multi-set configuration impeller. FIG. 76 shows the side elevation view of the present invention impeller 1 with a blade 6 in a set of wherein at least one blade 6 with tilted plane 13 angle TA of the preceding set 19 is greater than at least one blade 6 with tilted plane 13 angle TA of the blade 6 in the next set 20 and wherein the blade 6 high pressure face 12 area of the at least one blade 6 in the preceding set 19 is greater than the high pressure face 12 area of at least one blade 6 in the next set 20. FIG. 76 shows the preceding set 19 and the next set 20 are of non- intrusive configuration. FIG. 76A shows the second end 5 view of the of the present invention impeller 1 shown in FIG. 76. FIG. 76A shows at least one blade 6 in the preceding set 19 location line P(19) angle is greater than the location line P(20) of at least one blade 6 in the next set 20 but the blade 6 location line P(19) angle of the blade 6 in the preceding set 19 maybe modified to have the same or less blade 6 location line P(20) angle of the blade 6 in the next set 20. FIG. 76A shows the blade 6 in the preceding set 19 is smaller in size than the blade 6 size in the next set 20.

FIG. 77 and FIG. 77A shows the second modification of the fourth embodiment of the present invention wherein the present invention impeller 1 is a multi-set configuration impeller. FIG. 77 shows the side elevation view the present invention impeller 1 with a blade 6 in each set wherein the present invention impeller 1 consist of the preceding set 19 and the next set 20 which are of non-intrusive configuration and wherein at least one blade 6 in the preceding set 19 tilted plane 13 angle TA with less angle than the tilted plane 13 angle TA of at least one blade 6 in the next set 20 and at least one blade 6 in the next set 20 high pressure face 12 area is greater than at least one blade 6 high pressure face 12 area in the preceding set 19. FIG. 77A shows the second end 5 view of the present invention impeller 1 shown in FIG. 77. FIG. 77A shows the location line P(19, 20) angle of the blade 6 in next set 20 and in the preceding set 19 are the same but the location line P(19) angle of the blade 6 in the preceding set 19 maybe modified to have the greater or less angle than the location line P(20) of the blade 6 in the next set 20. At least one blade 6 in a set of blades of the present invention impeller 1 with multi-set configuration is oriented in the tilted plane configuration or in the specific deviation from the tilted plane configuration. FIG. 77A shows the blade 6 in the preceding set 19 is smaller in size than the blade 6 size in the next set 20.

FIG. 78 to FIG. 83 (inclusive) shows a multi-set configuration present invention impeller 1 in which the hub 2 inner section 22 length 23 is between forty percent to sixty percent the hub 2 maximum length 24 which applies to non-exhaust through the hub 2 and exhaust through the hub 2 impeller and wherein at least one blade 6 in a set is oriented in the tilted plane configuration or in the specific deviation from the tilted plane configuration. FIG. 78 to FIG. 83 (inclusive) also shows one blade 6 in a set but the present invention impeller 1 may have two or more blades in a set.

FIG. 78 illustrates the fifth embodiment of the present invention wherein the present invention impeller 1 is of a multi-set configuration and shows a blade 6 in each set of two wherein the first set 19' and the second set 20' are of non- intrusive configuration and the hub 2 inner section 22 length 23 adjacent to the impeller shaft 80 is about fifty-nine percent of the hub 2 maximum length 24 but maybe modified to have a hub 2 inner section 22 length 23 of between forty percent and sixty percent of the hub 2 maximum length 24 which are the limits of the hub 2 inner section 22 length 23 in the present invention.

FIG. 79 illustrates the sixth embodiment of the present invention wherein the present invention impeller 1 is a multi-set configuration impeller and shows a blade 6 in each set of three wherein the first set 19' and the second set 20' are of non-intrusive type of blade while the second set 20' and the third set 21' are intrusive type of blade 6 set arrangement and wherein the hub 2 inner section 22 length 23 adjacent to the rotatable impeller shaft 80 is about forty-one percent of the hub 2 maximum length 24 but the hub 2 inner section 22 length 23 maybe modified to have a hub 2 inner section 22 length 23 of between forty and sixty percent the hub 2 maximum length 24 which is within the limits of the present invention.

Figure 80:
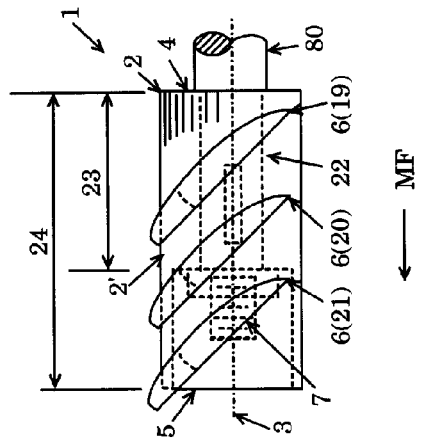
FIG. 80 illustrates the seventh embodiment of the present invention wherein the two adjacent set of blades are of intrusive configuration with hub inner section length within the limits of the present invention.

FIG. 80 illustrates the seventh embodiment of the present invention wherein the present invention impeller 1 with multi-set configuration which shows a blade 6 in each set of two wherein the first set 19' and the second set 20' are of intrusive type of blade 6 set arrangement in which the hub 2 inner section 22 length 23 adjacent to the rotatable impeller shaft 80 is about forty-one percent the hub 2 maximum length 24 but the hub 2 inner section 22 length 23 maybe modified to between forty percent and sixty percent the hub 2 maximum length 24 which is within the limits of the present invention.

Figure 81:
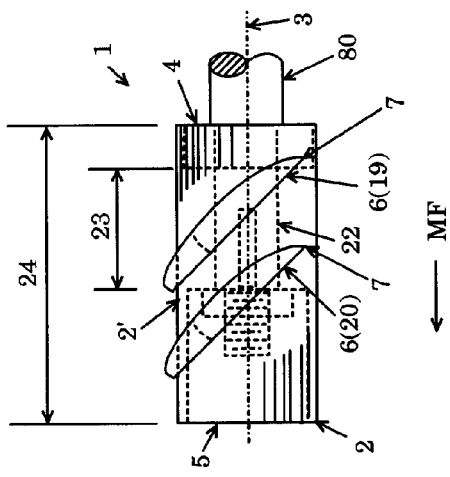
FIG. 81 illustrates the eighth embodiment of the present invention wherein the three adjacent set of blades are of intrusive type of configuration with hub inner section length within the limits of the present invention.

FIG. 81 illustrates the eight embodiment of the present invention wherein the present invention impeller 1 is a multi-set configuration impeller showing a blade 6 in each set of three wherein the first set 19' and the second set 20' is of intrusive type of blade 6 set arrangement while the second set 20' and the third set 21' are of intrusive type of blade 6 set arrangement and the present invention impeller 1 with a hub 2 inner section 22 length 23 adjacent to the rotatable impeller shaft 80 is about fifty-nine percent the hub 2 maximum length 24 but the hub 2 inner section 22 length 23 maybe modified to between forty and sixty percent the hub 2 maximum length 24.

Figure 82:
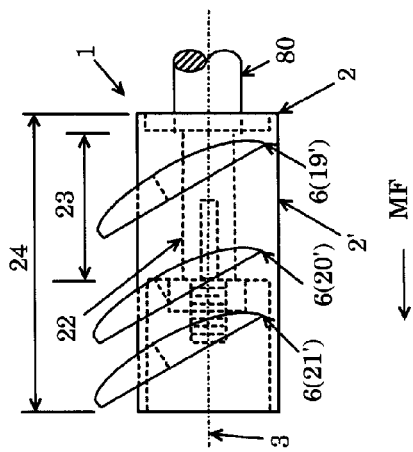
FIG. 82 illustrates the ninth embodiment of the present invention with three set of blades wherein the first set and the second set are of intrusive configuration while the second set and the third set are of non-intrusive configuration with hub inner section length within the limits of the present invention.

FIG. 82 illustrates the ninth embodiment of the present invention wherein the present invention impeller 1 with multi-set configuration and shows a blade 6 in each set with three set wherein the first set 19' and the second set 20' are of intrusive type of blade 6 set arrangement while the second set 20' and the third set 21' are non-intrusive type of blade 6 set arrangement and the present invention impeller 1 with a hub 2 inner section 22 length 23 adjacent to the rotatable impeller shaft 80 of about fifty percent the hub 2 maximum length 24 but the hub 2 inner section 22 length 23 maybe modified to a hub 2 inner section 22 length 23 of between forty percent and sixty percent the hub 2 maximum length 24 which is within the limits of the present invention.

Figure 83:
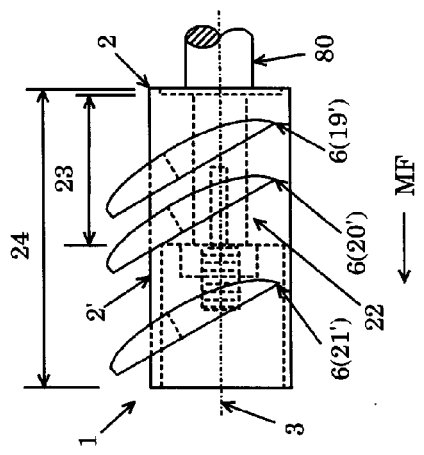
FIG. 83 illustrates the tenth embodiment of the present invention wherein the first set and the second set are of non-intrusive configuration while the second set and the third set are of intrusive configuration with hub inner section length within the limits of the present invention.

FIG. 83 illustrates the tenth embodiment of the present invention wherein the present invention impeller 1 with multi-set configuration which shows a blade 6 in each set of three wherein the first set 19' and the second set 20' are of non-intrusive type of blade 6 set arrangement while the second set 20' and the third set 21' are intrusive type of blade 6 set arrangement and the present invention impeller 1 with a hub 2 inner section 22 length 23 adjacent to the rotatable impeller shaft 80 of about fifty percent the hub 2 maximum length 24 but the hub 2 inner section 22 length 23 maybe modified to a hub 2 inner section 23 length 23 of between forty percent and sixty percent the hub 2 maximum length 24 which is within the limit of the present invention.

FIG. 84 illustrates a right hand rotation present invention impeller 1 with a hub 2 longitudinal axis 3 and blade 6 wherein said blade 6 with a high pressure face 12 on the tilted plane 13 to illustrates the tilted plane 13 is rotated clockwise CCW with a tilted plane 13 angle TA measured from the first vertical plane 14 as shown when the said impeller is positioned horizontally, wherein the said tilted plane 13 with tilted plane 13 angle TA is used for orientation of the blade 6 line 16 of section B in relation to the present invention impeller 1 hub 2 using the tilted plane 13 as reference specifically for right hand rotation impeller for medium driven system when the medium flow MF is from the first end 4 to the second end 5 of the impeller as shown or from inlet to outlet in an impeller housing. The tilted plane 13 angle TA as shown is about forty-five degrees but the right hand rotation present invention impeller 1 tilted plane 13 for the orientation of a blade 6 maybe rotated clockwise CCW twenty degrees or seventy-eight degrees or between twenty degrees and seventy-eight degrees. The present invention therefore includes left hand rotation impeller for medium driven system in the tilted plane configuration and in the specific deviation from the tilted plane configuration.

FIG. 85 illustrates a left hand rotation present invention impeller 1 with a hub 2 longitudinal axis 3 and blade 6 wherein said blade 6 with a high pressure face 12 on the tilted plane 13 which illustrates the tilted plane 13 is rotated clockwise CW with a tilted plane 13 angle TA measured from the first vertical plane 14 as shown when the said impeller is positioned horizontally, wherein the said tilted plane 13 with angle TA is used for orientation of the blade 6 line 16 of section B in relation to the present invention impeller 1 hub 2 using the tilted plane 13 as reference specifically for left hand rotation impeller for motor driven system when the medium flow MF or fluid flow is from the first end 4 to the second end 5 of the impeller as shown or from inlet to outlet in an impeller housing. The tilted plane 13 as shown is about forty-five degrees but the left hand rotation present invention impeller 1 tilted plane 13 for the orientation of a blade 6 maybe rotated clockwise CW twenty degrees or seventy-eight degrees or between twenty degrees and seventy-eight degrees. The present invention therefore includes left hand rotation impeller for medium driven system in the tilted plane configuration and in the specific deviation from the tilted plane configuration.

FIG. 86 illustrates the eleventh embodiment of the present invention wherein the present invention impeller 1 with second blade assembly 6A2 which is secured to the second end 5 of the hub 2. The second blade assembly 6A2 as shown has two blades but the present invention second blade assembly 6A2 may have more than two blades. The second blade assembly 6A2 is attached to the hub 2 with cap screw 83 and welded or brazed to the second end 5 of the hub 2 and as shown the impeller has right hand rotation oriented blade 6 but the blades maybe modified to have left hand rotation oriented blade 6. The present invention second blade assembly 6A2 and the hub 2 as shown may have the optional through holes TH adapted for exhaust though the hub system. The present invention impeller may have one or more second blade assembly 6A2 on the second end 5 of said hub 2, and the said hub 2 is adapted to the rotatable impeller shaft 80 so the said impeller rotates with the impeller shaft 80 and prevented of moving along said impeller shaft 80. The hub 2 and the blade assembly 6A2 hub 2''' are adapted to one another.

Figure 87:
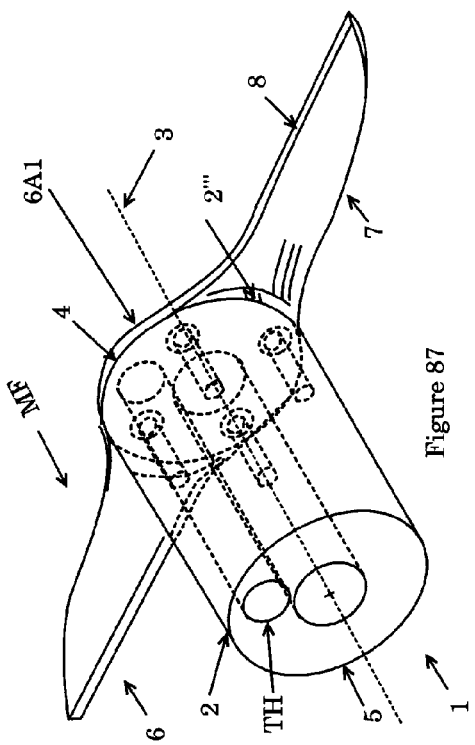
FIG. 87 illustrates the twelfth embodiment of the present invention wherein the present invention impeller with first blade assembly attached to the first end of the hub.

FIG. 87 illustrates the twelfth embodiment of the present invention wherein the first blade assembly 6A1 is connected to the first end 4 of the hub 2. The first blade assembly 6A1 as shown has two blades but the present invention first blade assembly 6A1 may have more than two blades on each first blade assembly 6A1. The first blade assembly 6A1 is attached to the hub 2 with cap screw 83 and welded or brazed on the hub 2 second end 5 and as shown the blade 6 are oriented for right hand rotation but maybe modified to have left hand rotation oriented blades. There maybe one first blade assembly or more first blade assembly 6A1 on the first end 5 of the hub 2 and the said hub 2 is adapted to the rotatable impeller shaft 80 so the said impeller rotates with the impeller shaft 80 and prevented of moving along said impeller shaft 80. The first blade assembly 6A1 and the hub 2 as shown is may have an optional through holes TH adapted for exhaust through the hub 2 system. The present invention impeller may have more than one first blade assembly 6A1 on the first end 4 of hub 2. The hub 2 and the blade assembly 6A1 hub 2''' are adapted to one another.

Figure 88:
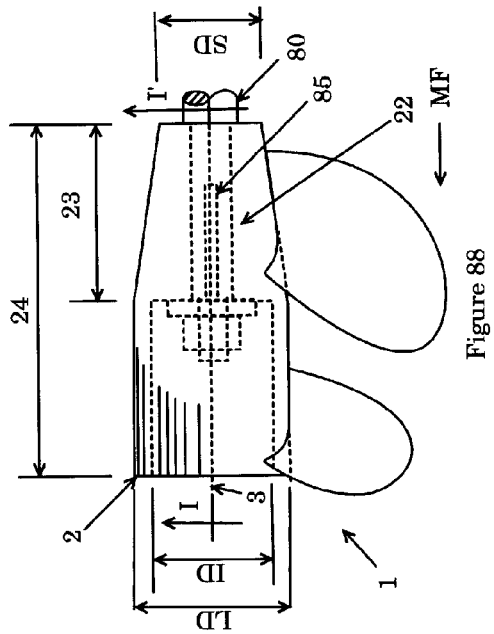
FIG. 88 shows the thirteenth embodiment of the present invention wherein the present invention impeller with two set of blades and wherein the hub with no exhaust through the hub has an large diameter (LD) adjacent to the second end of the hub with inside diameter (ID) which is a space for the end nut and tools for installation of the impeller to the rotatable impeller shaft with small diameter (SD) adjacent to the first end of the hub.

FIG. 88 shows the thirteenth embodiment of the present invention wherein the impeller 1 has two set of blades and the hub 2 has a large diameter LD adjacent to the second end 5 of the hub 2 to have space for the end nut and tools for installation of the impeller to the rotatable impeller shaft 80 with small diameter SD adjacent to the first end 4 of the hub 2. The difference of the large diameter LD and the small diameter SD as shown is about thirty percent but the small diameter SD includes diameter of between fifty percent and ninety percent the diameter of the large diameter LD wherein the large diameter LD adjacent to the second end 5 and the small diameter SD on the first end 4 or adjacent to the first end 4 of the said impeller. The inside diameter ID of the hub 2 adjacent to second end 5 is between ninety-five percent and sixty percent the large diameter LD of the hub 2. The hub 2 inner section 22 length 23 as shown is about fifty percent of the maximum hub 2 length 24 but the hub 2 inner section 22 length 23 maybe modified to between forty and sixty percent the hub 2 maximum length 24.

Figure 89:
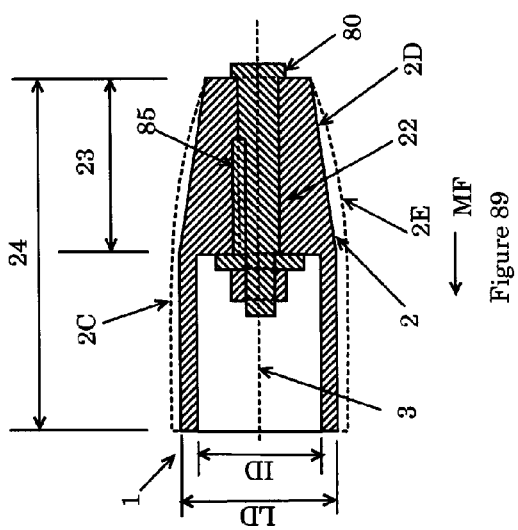
FIG. 89 illustrates the section view on line I-I' of FIG. 88 with increased hub diameter.

FIG. 89 illustrates the section view on line I-I' of FIG. 87. The difference of the large diameter LD and the small diameter SD as shown is about thirty percent but the small diameter SD includes diameter of between fifty percent and ninety percent the diameter of the large diameter LD wherein the large diameter LD adjacent to the second end 5 and with small diameter SD is at the first end 4 or adjacent to the first end 5 of the said impeller. The inside diameter ID of the hub 2 at the second end 5 or adjacent to the second end 5 is between ninety-five percent and sixty percent the large diameter LD of the hub 2. FIG. 89 shows the hub 2 with curved outer portion 2C or the modified shape 2D with substantially annular sections represented by straight line on the section. The sections of the hub 2 perpendicular to the longitudinal axis 3 of the hub 2 excluding the blades are annular sections. The hub 2 for the present invention impeller 1 is more efficient and adapted for the impeller shaft 80.

Figure 90:
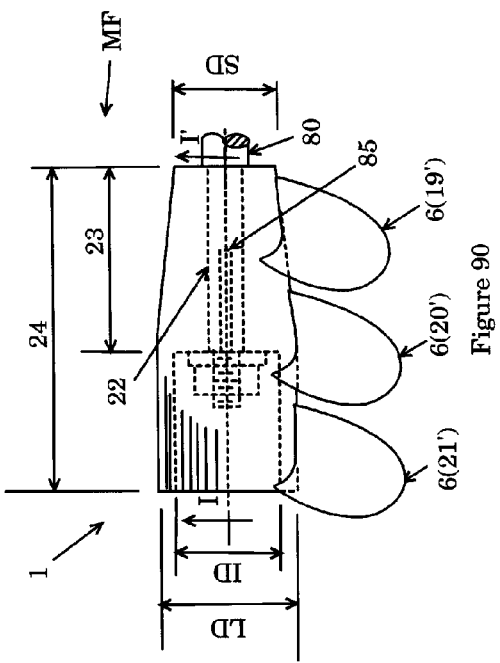
FIG. 90 illustrates the fourteenth embodiment of the present invention wherein present invention impeller 1 in a no exhaust through the hub system as shown is a multi-set impeller with three set of blades and hub inner section length within the limits of the present invention.

FIG. 90 illustrates the fourteenth embodiment of the present invention wherein present invention impeller 1 as shown is a multi-set configuration present invention impeller 1 with three set of blades with hub 2 inner section 22 length 23 as shown is about fifty-eight present the hub 2 maximum length 24 but the present invention impeller 1 inner section 22 length 23 maybe modified to between sixty and forty percent the maximum length 24 of said hub 2. The difference of the large diameter LD and the small diameter SD as shown is about thirty percent but the small diameter SD includes diameter of between fifty percent and ninety percent the diameter of the large diameter LD wherein the large diameter LD is at the second end or adjacent to the second end 5 of the present invention impeller 1 and with small diameter SD is at the first end 4 or adjacent to the first end 5 of the said impeller. The inside diameter ID of the hub 2 at the second end 5 or adjacent to the second end 5 is between ninety-five percent and sixty percent the large diameter LD of the hub 2.

FIG. 91 shows the section view on line I-I' in FIG. 90. FIG. 91 shows further details of the hub 2 wherein the hub 2 of the multi-set configuration impeller with large diameter LD at the second end or adjacent to the second end 5 of the present invention impeller and with small diameter SD at the first end 4 or adjacent to the first end 5 of the said impeller. The difference of the large diameter LD and the small diameter SD as shown is about thirty percent but the small diameter SD includes diameter of between fifty percent and ninety percent the diameter of the large diameter LD wherein the large diameter LD is at the second end 5 or adjacent to the second end 5 of the present invention impeller 1 and the small diameter SD at the first end 4 or adjacent to the first end 4 of the said impeller. The inside diameter ID of the hub 2 at the second end 5 or adjacent to the second end 5 is between ninety-five percent and sixty percent the large diameter LD of the hub 2. FIG. 91 further shows another modification of the impeller hub 2 as shown with curved hub 2E wherein curved hub 2E are of annular surfaces.

FIG. 92 shows the possible locations of blade 6 line 16' of section A in relation to the first boundary plane 17 of said tilted plane 13 or the second boundary plane 18 of said tilted plane 13, the blade line of section B, and the tilted plane 13 as seen along the tilted plane 13 which as shown as a line because the viewer is looking along the tilted plane 13. The tilted plane 13 shown is vertical but as explained earlier the tilted plane 13 angle is twenty degrees or seventy-eight degrees or between twenty degrees and seventy-eight degrees from the first vertical plane 14. The first boundary plane 17 is rotated to an angle 3AA which is twenty-five percent the predetermined value or actual value of tilted plane 13 angle TA in the direction of the third plane B3 while the second boundary plane 18 is rotated to an angle 4AA which is twenty-five percent the said predetermined or actual value of the tilted plane 13 angle TA in the direction of the fourth plane B4. The maximum angle of rotation of the first boundary plane 17 or the second boundary plane 18 is twenty-five percent the value of the predetermined angle TA of the tilted plane 13 from the vertical plane (14) (not shown). The axis of rotation of the first boundary plane 17 and the second boundary 18 is the blade 6 line 16 of section B. The predetermined value of the tilted plane 13 with angle TA and the actual value of the tilted plane 13 angle TA are to be the same.

FIG. 93 illustrates the present invention impeller 1 with thin slice of said impeller, cut by two vertical plane which are closely adjacent and parallel to the first vertical plane 14, as viewed from the second end 5 of the impeller showing the projected intersection PI of the hub 2 and the high pressure face 12 projected line 12X and the hub 2 projected radius 2X which is used to determine the projected intersection of the blending surfaces of the hub 2 and the high pressure face 12. The projected surface of the high pressure face 12 is the trend of the high pressure face 12 between twenty and fifty percent the blade 6 radial length LB from the hub 2 external side surface 2' and the hub 2 projected radius 2X is the average distance of the hub 2 external side surface 2' adjacent to the blade 6. The present invention impeller 1 as shown is connected to the rim 91 but includes present invention impeller 1 without the rim 91. The rim 91 is designed to make the blade 6 more structurally stable.

Figure 94:
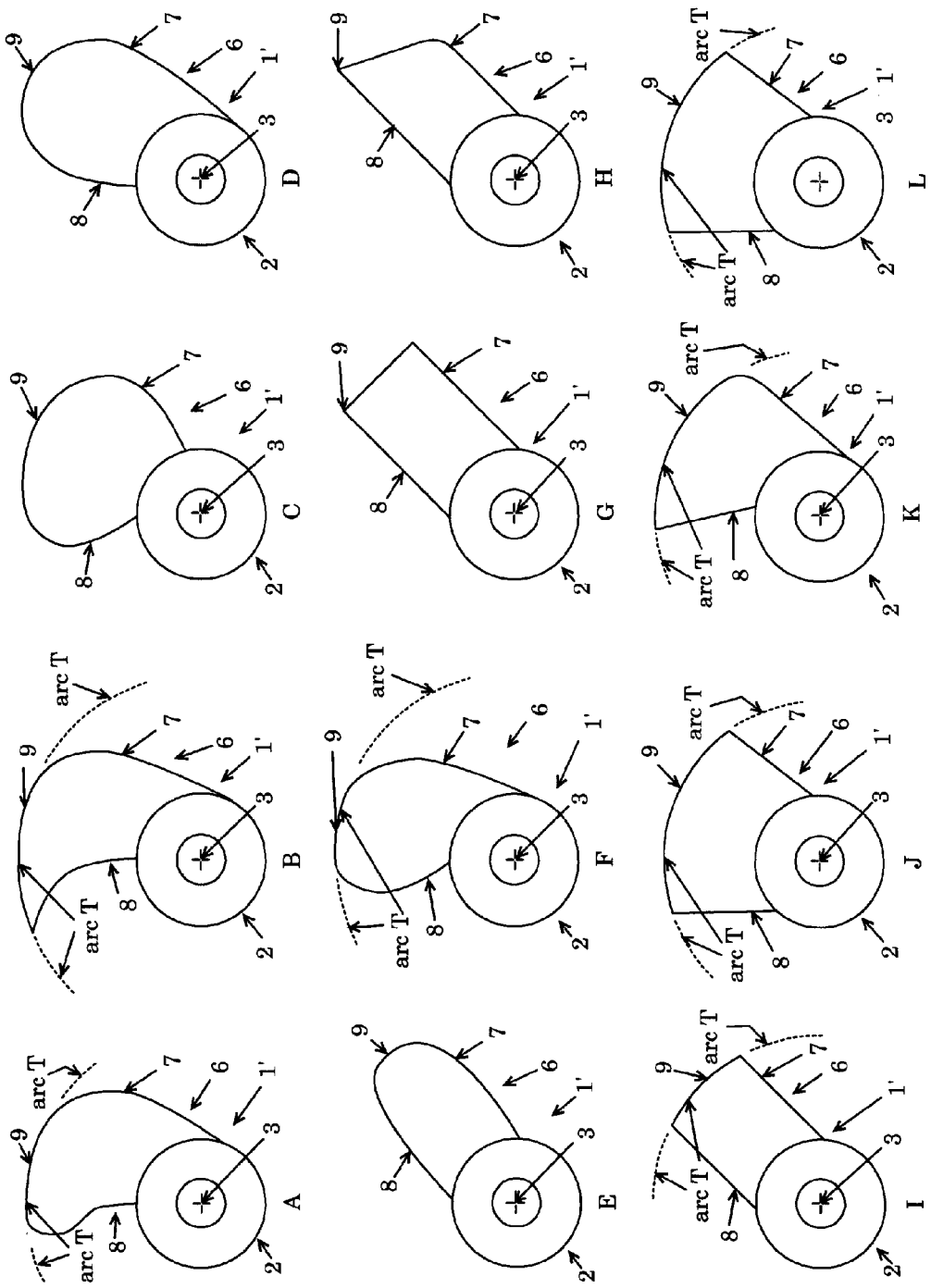
FIG. 94 shows the second end view or first end view of a few prior art propeller with prior art second end or first end view blade shapes.

FIG. 94 shows the second end or first view end of some prior art propeller 1' or impeller with prior art shapes or public domain shapes of the blade 6 of the said prior art impeller or propeller as seen from the second end or first end of the impeller or propeller which maybe adapted for the present invention impeller or propeller but not shown are other end view shapes of the blade from other Patents. In FIG. 94 also shows the blade 6 with leading edge 7, trailing edge 8, tip 9 or tip 9 midpoint of the said prior art propeller or impeller 1. The said tip 9 when wide (as opposed to a point) substantially on a radial arc T, said radial arc T center lies on the longitudinal axis 3 of the hub 2. In FIGS. 94A, 94B, 94F, 94I, 94J, 94K, and 94L shows the wide tip 9 substantially lies on radial arc T and but the said tip 9 maybe tagged as a point as shown in FIG. 94C, 94D 94E, 94G, 94H.

The present invention limits are within well defined boundaries and only a very small portion of an large collection of published and unpublished criterion in the design of a blade of an impeller which may include one or more of the abundant lines, planes and shapes or other features of a blade which maybe related to a blade or other part of the impeller and maybe around or intersecting the blade at any angle or intersecting the various sections of the blade in different places, radial or non-radial, and may not or may involve the tilted plane but could be other phenomenal approach not known at this time and besides the present invention is just one or few of the very large selection of approaches in the blade design of an impeller.

The longitudinal axis (3) of the present invention impeller (1) is the same one line as the longitudinal axis (3) of the hub (2) and the said same one line is the longitudinal axis (3) of the impeller shaft (80).

The present invention impeller (1) are mostly illustrated horizontally for explanatory purposes so comparison to any impeller which maybe positioned vertically in actual service are to be examined with the impeller longitudinal axis horizontal. The present invention impeller (1) therefore includes impeller in the tilted plane configuration and in the specific deviation from the tilted plane configuration which are positioned horizontally, vertically or with an angle from the vertical line or horizontal line in actual service.

Partial compilation of sample data showed below for blade orientation in the present invention wherein the limits of the present invention vary as the tilted plane (13) angles.

For chosen value or predetermined value of the tilted plane angle TA =thirty degrees In the tilted plane configuration: the blade 6 line 16 of section B=thirty degrees and the blade 6 line 16' angle A of section A=thirty degrees In the specific deviation from the tilted plane configuration: blade 6 line 16 angle B of section B=thirty degrees, and the blade 6 line 16' angle A of section A which is not equal to thirty degrees the blade 6 line 16' of section A either intersects the tilted plane 13 or off the tilted plane 13 with angle A of section A of the same blade 6 is between thirty-seven and a half degrees and thirty degrees or between thirty degrees and twenty two and a half degrees wherein the blade 6 line 16' of section A is within the first boundary plane 17 of said tilted plane and the second boundary plane 18 of said tilted plane wherein thirty-seven and a half degrees is twenty-five percent more the value of tilted plane 13 angle TA and twenty-two and a half degrees is twenty-five percent less the value of tilted plane 13 angle TA. The first boundary plane 17 in this case is rotated from the tilted plane 13 in the direction of the third plane B3 by seven and a half degrees or twenty-five percent of thirty degrees and the second boundary plane 18 in this case is rotated in the direction of the fourth plane B4 by twenty-five percent of thirty degrees which is equal to seven and a half degrees and for blade 6 line 16' angle A of section A equal to thirty degrees the blade 6 line 16' of section A is off the tilted plane 13 within the first boundary plane 17 of said tilted plane 13 and the second boundary plane 18 of said tilted plane 13 or on the first boundary plane 17 of the said tilted plane 13 or on the second boundary plane 18 of said tilted plane 13.

For chosen value or predetermined value of tilted plane angle TA=forty degrees

In the tilted plane configuration: the blade 6 line 16 angle B of section B=forty degrees and the blade 6 line 16' angle A of section A=forty degrees In the specific deviation from the tilted plane configuration: blade 6 line 16 angle B of section B=forty degrees, and the blade 6 line 16' angle A of section A which is not equal to forty degrees the blade 6 line 16' of section A either intersects the tilted plane 13 or off the tilted plane 13 with angle A of section A of the same blade 6 is between forty degrees and fifty degrees or between fifty degrees and thirty degrees wherein fifty degrees is twenty-five percent more the value of tilted plane 13 angle TA and thirty degrees is twenty-five percent less the value of tilted plane 13 angle TA and wherein the blade 6 line 16 of section A is within the first boundary plane 17 of said tilted plane 13 and the second boundary plane 18 of said tilted plane 13. The first boundary plane 17 in this case is rotated from the tilted plane 13 in the direction of the third plane B3 by ten degrees or twenty-five percent of forty degrees and the second boundary plane 18 in this case is rotated in the direction of the fourth plane B4 by twenty-five percent of forty degrees which is equal to ten degrees and for blade 6 line 16' of section A equal to forty degrees the blade 6 line 16' of section A is off the tilted plane 13 within the first boundary plane 17 of said tilted plane 13 and the second boundary plane 18 of said tilted plane 13 or on the first boundary plane 17 of said tilted plane 13 or on the second boundary plane 18 of said tilted plane 13.

The invention claimed is:

1. An impeller comprising:
   a hub with a horizontally oriented longitudinal axis, a first end, and a second end;
   a plurality of blades circumferentially arranged and attached to the hub, the blades extending outwardly from the hub, each of the blades having a root attached to the hub, a tip, a high pressure face, a low pressure face, a leading edge, and a trailing edge, said blades being either integral to the hub or detachable from the hub; and
   at least one of the blades oriented in relation to a tilted plane, the tilted plane rotated from a first vertical plane on a first axis of rotation wherein the first axis of rotation lies on the first vertical plane and the first axis of rotation is an intersection of the tilted plane and the first vertical plane, the first vertical plane perpendicularly intersecting the horizontally oriented longitudinal axis of the hub;
   wherein the tilted plane has a predetermined acute angle of between twenty degrees (20°) and seventy-eight degrees (78°) measured perpendicularly from the first vertical plane;
   wherein the blade has a first radial section cut by a first radial arc at about twenty percent (20%) of a radial length of the blade, and a second radial section cut by a second radial arc at about eighty percent (80%) of the radial length of the blade;
   wherein a center of the second radial arc and a center of the first radial arc lie on the horizontally oriented longitudinal axis of the hub;
   wherein the first section has a first blade line, the first blade line being a straight line connecting a leading edge and a trailing edge of the first section, the first blade line forming a first acute angle with the first vertical plane, measured perpendicularly from the first vertical plane, the first blade line having an angle equal to the predetermined acute angle;
   wherein the second section has a second blade line, the second blade line being a straight line connecting a leading edge and a trailing edge of the second section, the second blade line forming a second acute angle with the first vertical plane, measured perpendicularly from the first vertical plane, the second acute angle within twenty five percent (25%) of the predetermined acute angle;
   wherein the second blade line is located at one of the following locations:
   (i) between a first boundary plane of the tilted plane and a second boundary plane of said tilted plane,
   (ii) on the first boundary plane of the tilted plane, or
   (iii) on the second boundary plane of the tilted plane;
   wherein the first boundary plane and the second boundary plane share an axis of rotation, the axis of rotation being the first blade line;
   wherein the first boundary plane is rotated in a first direction and the second boundary plane is rotated in a direction opposite the first direction;
   wherein the first boundary plane and the second boundary plane are rotated from the tilted plane so that a first boundary plane acute angle from the tilted plane is about twenty-five percent (25%) of the predetermined acute angle of the tilted plane as measured from the tilted plane in the first direction, and
   wherein the second boundary plane acute angle is about twenty-five percent (25%) of the predetermined acute angle as measured from the tilted plane, and the second boundary plane of the tilted plane is rotated to the direction opposite the first direction.

2. The impeller according to claim 1 wherein the second acute angle is equal to the predetermined acute angle and the second blade line lies on the tilted plane.

3. The impeller according to claim 1 wherein the second acute angle is less than the predetermined acute angle, and the second blade line is between the tilted plane and the first boundary plane.

4. The impeller according to claim 1 wherein the second acute angle is less than the predetermined acute angle and the second blade line intersects the tilted plane.

5. The impeller according to claim 1 wherein the second acute angle is less than the predetermined acute angle, and the second blade line is off the tilted plane, and the second blade line is between the tilted plane and the second boundary plane.

6. The impeller according to claim 1 wherein the second acute angle is greater than the predetermined acute angle, and the second blade line is off the tilted plane, and the second blade line is between the tilted plane and the first boundary plane.

7. The impeller according to claim 1 wherein the second acute angle is greater than the predetermined acute angle, and the second blade line intersects the tilted plane.

8. The impeller according to claim 1 wherein the second acute angle is greater than the predetermined acute angle, and the second blade line is off the tilted plane, and the second blade line is between the tilted plane and the second boundary plane.

9. The impeller according to claim 1 wherein the second acute angle is equal to the predetermined acute angle, and the second blade line is off the tilted plane, and the second blade line is between the tilted plane and the first boundary plane.

10. The impeller according to claim 1 wherein the second acute angle is equal to the predetermined acute angle, and the second blade line is off the tilted plane and on the first boundary plane.

11. The impeller according to claim 1 wherein the second acute angle is equal to the predetermined acute angle, and the second blade line is off the tilted plane and between the tilted plane and the second boundary plane.

12. The impeller according to claim 1 wherein the second acute angle is equal to the predetermined acute angle, and the second blade line is off the tilted plane and on the second boundary plane.

13. The impeller according to claim 1 wherein the plurality of blades is on a blade assembly attached to the second end of the hub by a cap screw, and at least one blade of the blade assembly is welded to the hub.

14. The impeller according to claim 1 wherein the plurality of blades is on a blade assembly attached to the first end of the hub by a cap screw, at least one blade of the blade assembly welded to the hub.

15. An impeller according to claim 1 wherein the blades of the impeller have a wide tip connected to the rim.

16. An impeller according to claim 1 wherein the impeller is made of fibers and resins.

17. An impeller according to claim 1 wherein the impeller is made of metal.

18. The impeller according to claim 1 wherein the second acute angle is within fifteen (15%) percent of the predetermined acute angle.

19. The impeller according to claim 1 wherein the second acute angle is within five (5%) percent of the predetermined acute angle.

20. The impeller according to claim 1 wherein the impeller is adapted for use in a hydroelectric turbine.

21. The impeller according to claim 1 wherein the impeller is adapted for use in a weapon system.

22. The impeller according to claim 1 wherein the impeller is adapted for use in a mixing system.

23. The impeller according to claim 1 wherein the impeller is adapted for use in a pump.

24. The impeller according to claim 1 wherein the impeller is adapted for use in a compressor.

25. The impeller according to claim 1 wherein the impeller is adapted for use in a drone.

26. The impeller according to claim 1 wherein the impeller is adapted for use in a wind turbine.

27. The impeller according to claim 1 wherein the impeller is adapted for use in an air vehicle.

28. The impeller according to claim 1 wherein the plurality of blades are attached to the hub in a detachable manner.

29. The impeller according to claim 1 wherein the impeller is adapted for use in a watercraft.

30. The impeller according to claim 1 wherein the plurality of blades are attached integrally to the hub.

31. An impeller for adapted for an air vehicle comprising:
a hub with a horizontally oriented longitudinal axis, a first end, and a second end;
a plurality of blades circumferentially arranged and adjustably attached to the hub, the blades extending outwardly from the hub, each of the blades having a root attached to the hub, a tip, a high pressure face, a low pressure face, a leading edge, and a trailing edge; and
at least one of the blades oriented in relation to a tilted plane, the tilted plane rotated from a first vertical plane on a first axis of rotation wherein the first axis of rotation lies on the first vertical plane and the first axis of rotation is an intersection of the tilted plane and the first vertical plane, the first vertical plane perpendicularly intersecting the horizontally oriented longitudinal axis of the hub;
wherein the tilted plane has a predetermined acute angle of between twenty degrees (20°) and seventy-eight degrees (78°) measured perpendicularly from the first vertical plane;
wherein the blade has a first radial section cut by a first radial arc at about twenty percent (20%) of a radial length of the blade, and a second radial section cut by a second radial arc at about eighty percent (80%) of the radial length of the blade;
wherein a center of the second radial arc and a center of the first radial arc lie on the horizontally oriented longitudinal axis of the hub;
wherein the first section has a first blade line, the first blade line being a straight line connecting a leading edge and a trailing edge of the first section, the first blade line forming a first acute angle with the first vertical plane, measured perpendicularly from the first vertical plane, the first blade line having an angle equal to the predetermined acute angle;
wherein the second section has a second blade line, the second blade line being a straight line connecting a leading edge and a trailing edge of the second section, the second blade line forming a second acute angle with the first vertical plane, measured perpendicularly from the first vertical plane, the second acute angle within twenty five percent (25%) of the predetermined acute angle;
wherein the second blade line is located at one of the following locations:
(i) between a first boundary plane of the tilted plane and a second boundary plane of said tilted plane,
(ii) on the first boundary plane of the tilted plane, or
(iii) on the second boundary plane of the tilted plane;
wherein the first boundary plane and the second boundary plane share an axis of rotation, the axis of rotation being the first blade line;
wherein the first boundary plane is rotated in a first direction and the second boundary plane is rotated in a direction opposite the first direction;
wherein the first boundary plane and the second boundary plane are rotated from the tilted plane so that a first boundary plane acute angle from the tilted plane is about twenty-five percent (25%) of the predetermined acute angle of the tilted plane as measured from the tilted plane in the first direction, and
wherein the second boundary plane acute angle is about twenty-five percent (25%) of the predetermined acute angle as measured from the tilted plane, and the second boundary plane of the tilted plane is rotated to the direction opposite the first direction.

32. An impeller for adapted for a wind turbine comprising:
a hub with a horizontally oriented longitudinal axis, a first end, and a second end;
a plurality of blades circumferentially arranged and adjustably attached to the hub, the blades extending outwardly from the hub, each of the blades having a root attached to the hub, a tip, a high pressure face, a low pressure face, a leading edge, and a trailing edge; and
at least one of the blades oriented in relation to a tilted plane, the tilted plane rotated from a first vertical plane on a first axis of rotation wherein the first axis of rotation lies on the first vertical plane and the first axis of rotation is an intersection of the tilted plane and the first vertical plane, the first vertical plane perpendicularly intersecting the horizontally oriented longitudinal axis of the hub;

wherein the tilted plane has a predetermined acute angle of between twenty degrees (20°) and seventy-eight degrees (78°) measured perpendicularly from the first vertical plane;

wherein the blade has a first radial section cut by a first radial arc at about twenty percent (20%) of a radial length of the blade, and a second radial section cut by a second radial arc at about eighty percent (80%) of the radial length of the blade;

wherein a center of the second radial arc and a center of the first radial arc lie on the horizontally oriented longitudinal axis of the hub;

wherein the first section has a first blade line, the first blade line being a straight line connecting a leading edge and a trailing edge of the first section, the first blade line forming a first acute angle with the first vertical plane, measured perpendicularly from the first vertical plane, the first blade line having an angle equal to the predetermined acute angle;

wherein the second section has a second blade line, the second blade line being a straight line connecting a leading edge and a trailing edge of the second section, the second blade line forming a second acute angle with the first vertical plane, measured perpendicularly from the first vertical plane, the second acute angle within twenty five percent (25%) of the predetermined acute angle;

wherein the second blade line is located at one of the following locations:
(i) between a first boundary plane of the tilted plane and a second boundary plane of said tilted plane,
(ii) on the first boundary plane of the tilted plane, or
(iii) on the second boundary plane of the tilted plane;

wherein the first boundary plane and the second boundary plane share an axis of rotation, the axis of rotation being the first blade line;

wherein the first boundary plane is rotated in a first direction and the second boundary plane is rotated in a direction opposite the first direction;

wherein the first boundary plane and the second boundary plane are rotated from the tilted plane so that a first boundary plane acute angle from the tilted plane is about twenty-five percent (25%) of the predetermined acute angle of the tilted plane as measured from the tilted plane in the first direction, and wherein the second boundary plane acute angle is about twenty-five percent (25%) of the predetermined acute angle as measured from the tilted plane, and the second boundary plane of the tilted plane is rotated to the direction opposite the first direction.

* * * * *